United States Patent [19]

Hikida et al.

[11] Patent Number: 5,737,737
[45] Date of Patent: Apr. 7, 1998

[54] DATA MANAGEMENT METHOD AND APPARATUS

[75] Inventors: Yoshiro Hikida, Inagi; Yasufumi Takada; Naohiro Yoshikawa, both of Yokohama; Satoshi Watanabe, Tokyo, all of Japan

[73] Assignee: Canon Kabushiki Kaisha, Tokyo, Japan

[21] Appl. No.: 63,497

[22] Filed: May 19, 1993

[30] Foreign Application Priority Data

May 22, 1992 [JP] Japan ................... 4-131138

[51] Int. Cl.$^6$ ................................. G06F 17/30
[52] U.S. Cl. ................ 707/104; 707/3; 707/4; 707/102; 707/526; 345/348
[58] Field of Search ............... 364/200; 345/185, 345/348; 395/600, 161, 606, 159, 134; 707/3, 4, 102, 104, 526

[56] References Cited

U.S. PATENT DOCUMENTS

| | | | |
|---|---|---|---|
| 4,115,850 | 9/1978 | Houston et al. | 364/200 |
| 5,018,083 | 5/1991 | Watanabe et al. | 364/523 |
| 5,206,949 | 4/1993 | Cochran et al. | 395/600 |
| 5,297,249 | 3/1994 | Bernstein et al. | 395/156 |
| 5,301,270 | 4/1994 | Steinberg et al. | 395/161 |
| 5,321,423 | 6/1994 | Yoshizawa et al. | 345/185 |
| 5,333,256 | 7/1994 | Green et al. | 395/159 |
| 5,345,550 | 9/1994 | Bloomfield | 395/156 |
| 5,491,783 | 2/1996 | Douglas et al. | 395/159 |

OTHER PUBLICATIONS

Inside Macintosh, vols. I, II, and III, 1991, Addison–Wesley, Chapter 15, "Scrap Manager", p. I-453-p. I-464.

IBM Technical Disclosure Bulletin, vol. 33, No. 11, Apr. 1991, pp. 240-241, "Clipboard Format For Ascii Text With Attributes."

Primary Examiner—Thomas G. Black
Assistant Examiner—Cheryl R. Lewis
Attorney, Agent, or Firm—Fitzpatrick, Cella, Harper & Scinto

[57] ABSTRACT

CCP data as common data, which can be utilized by a plurality of users or applications, are stored in a CCP buffer in units of data types (format IDs). More specifically, the CCP buffer stores one CCP data per format ID. Upon reception of a request for CCP data from an application, the system analyzes this request to acquire the format ID of the CCP data requested by the application. The system searches CCP data having a format ID coinciding with the requested format ID from data management information of CCP data. The system passes the searched CCP data to the application, and ends processing. In this manner, CCP data can be stored in correspondence with a plurality of data types, and required CCP data can be easily selected by using its format ID. Therefore, operability with respect to common data can be improved, and work efficiency of users can be improved.

18 Claims, 72 Drawing Sheets

FIG. 14

| FORMAT ID | EXTENSION INDICATING LETTERS | ICON FILE NAME | LIBRARY ID |
|---|---|---|---|
| 012 | .etx | Eztext | 020 |
| 013 | .etb | Eztable | |
| 212 | .slk | Slk | |

FIG. 15

| APPLICATION ID | EXECUTION MODULE NAME | APPLICATION NAME | FILE ICON NAME | PROCESSING LIST ||| PROCESSING DATA NECESSITY |
|---|---|---|---|---|---|---|---|
| | | | | FORMAT ID | PROCESSING CODE | PROCESSING NAME | |
| 012 | ezps | DOCUMENT EDIT | Ezps | 012 | e | EDIT | |
| | | | | | p | PRINT | ○ |
| | | | | | c | CONVERT | ○ |
| | | | | 013 | s | CREATE FORMAT | |
| | | | | 212 | c | CONVERT TABLE ARRANGEMENT | ○ |
| 013 | eztab | SPREADSHEET | Eztab | 013 | c | CONVERT | ○ |
| | | | | | e | EDIT | |
| | | | | | p | PRINT | ○ |
| | | | | | g | GRAPH CREATE | ○ |
| | | | | 212 | c | CONVERT | ○ |

FIG. 16

| LIBRARY ID | LIBRARY BINDER NAME | LIBRARY NAME | OPEN COUNT |
|---|---|---|---|
| 020 | /usr/lib/form | FORM | 0 |

FIG. 17

| USER ID | USER INFORMATION | ROOM DIRECTORY OF USER | LIBRARY UPDATING MODE |
|---|---|---|---|
| 1001 | WATANABE | /usr/users/watanabe | ON |
| 1002 | SATO | /usr/users/sato | OFF |
| 1003 | TAKADA | /usr/users/takada | OFF |

FIG. 18

| OFFICE ID | HOST NAME | OFFICE NAME | DOMAIN | LIBRARY UPDATING MODE |
|---|---|---|---|---|
| 10001 | local | LOCAL | 68k | OFF |
| 10002 | center | CENTER | 68k | OFF |

FIG. 19

| GROUP ID | USER ID |
|---|---|
| 100001 | 1001, 1002, 1003 |
| 100002 | 1001 |

FIG. 20

| | | | 110 |
|---|---|---|---|
| OBJECT TYPE | | DATA | DATA |
| FILE NAME | | bunsho.etx | form.etx |
| FORMAT ID | | 012 | 012 |
| CREATOR ID | | 012 | 012 |
| KANJI NAME | | DOCUMENT | FORM |
| SIZE | | 2012 | 1208 |
| REGISTRATION DATE | | 91/01/21 09:12:08 | 91/03/03 13:00:04 |
| UPDATING DATE | | 91/03/30 11:52:50 | 91/03/03 13:00:04 |
| REFERENCE DATE | | 91/04/02 15:55:24 | 91/04/02 16:01:18 |
| OWNER USER ID | | 1001 | 1001 |
| OWNER GROUP ID | | 100001 | 100001 |
| REFERENCE USER ID | | 1001 | 1002 |
| UPDATING USER ID | | 1001 | 1001 |
| ACCESS LEVEL | REFERENCE | OWNER | OK | OK |
| | | GROUP | OK | OK |
| | | OTHERS | OK | NG |
| | UPDATING | OWNER | OK | OK |
| | | GROUP | OK | NG |
| | | OTHERS | OK | NG |
| DOMAIN | | 68k | 68k |
| DISCLOSURE TARGET USER ID | | OFF | OFF |
| DISCLOSURE TARGET GROUP ID | | OFF | OFF |
| DISCLOSURE COPY LIMITATION | | 0 | OFF |
| DISCLOSURE PERIOD | | 91/04/30 00:00:00 | OFF |
| DATA DISCARD TIME LIMIT | | 91/04/30 23:59:59 | OFF |
| TAG REFERENCE TARGET | | OFF | OFF |

F I G. 21

| FILE NAME | USER ID | ACCESS LEVEL | DATE |
|---|---|---|---|
| /tanaka/bunsho | 1001 | REFERENCE | 91/04/02 15:55:24 |

141  142  143  144  140

F I G. 22

| SEARCH ORDER 1 | SEARCH ORDER 2 |
|---|---|
| USER ID : 1001 | OFFICE ID : 100001 |

| | 160 |
|---|---|
| FILE NAME | cut_buffer |
| FORMAT ID | 012 |
| SIZE | 2012 |
| OWNER USER ID | 1001 |
| OWNER GROUP ID | 100001 |

| SYSTEM | OPERATION | GENERATION | | | HELP |
|---|---|---|---|---|---|
| [WATANABE] SEARCH RESULT DETAIL | | | | | |
| NAME | TYPE | CREATION DATE | UPDATING DATE | COMMENT | |
| BINDER 0 | BINDER | 91.1.1 | 91.12.1 | OKUBO'S REFERENCE | |
| BINDER 1 | BINDER | 91.2.1 | 91.12.2 | SAIGO'S REFERENCE | |
| BINDER 2 | BINDER | 91.3.1 | 91.12.3 | KIDO'S REFERENCE | |

G120

DATA MANAGEMENT METHOD AND APPARATUS

BACKGROUND OF THE INVENTION

The present invention relates to a data management method and apparatus for managing data and the like created by, e.g., application software programs.

Conventionally, a data management apparatus formed by one or a plurality of computer systems having one or a plurality of users is known. In such a data management apparatus, data created by a certain application or a portion of such data can be copied or moved inside the application program or to at least one application different from the certain application. Common data to be temporarily stored, which data is created for such processing, and a location for storing the common data are managed using concepts called CCP data and a CCP buffer. Note that CCP is an abbreviation of Cut, Copy, and Paste. CCP data stored in the CCP buffer is not generally disclosed to a user, and the CCP buffer includes only one buffer corresponding to a unique data type, i.e., a document. Therefore, when such CCP data is utilized, since this unique data is utilized, an operation or processing for selecting data is unnecessary.

In contrast to this, a common data management method based on concepts called clip data and a clipboard is known. A plurality of data can be registered as clip data to the clipboard regardless of data types, e.g., documents, graphics, and the like. In a conventional data management apparatus for a computer system, when a user wants to refer to clip data created by an application, all created and temporarily stored data are disclosed to the user, and the user himself or herself selects necessary data from all the disclosure data.

However, in the prior art, when the CCP buffer is called from an application, the one and only CCP buffer is specified, and a user can refer to the data stored in the buffer. However, since the data type is fixed, versatility is poor, and contribution to improvement of work efficiency is low. When a user uses clip data, he or she must refer to a list of clip data including apparently unnecessary data every time he or she executes an operation for calling temporarily stored data. For this reason, as the number of stored data (i.e., clip data) is increased, the operation for calling the temporarily stored data becomes troublesome, and work efficiency is impaired.

SUMMARY OF THE INVENTION

The present invention has been made in consideration of the above-mentioned problems, and has as its first object to provide a data management method and apparatus, which can improve operability for common data, and can improve work efficiency of a user who uses the apparatus.

It is the second object of the present invention to provide a data management apparatus and method utilized by a plurality of users, which can provide a work environment suitable to provide a given user access to a data space of another user.

A data management apparatus for achieving the first object comprises, e.g., the following arrangement.

More specifically, a data management apparatus for managing data or the like created by an application program or the like, comprises:

storage means for storing common data commonly utilized by a plurality of applications distinguishably on the basis of the data types; and transfer means for transferring the common data stored in the storage means to the corresponding application by designating the data type when data is utilized.

A data management apparatus for achieving the second object comprises, e.g., the following arrangement.

More specifically, a data management apparatus comprises:

first data spaces accessed by individual users;

a second data space including a data space which can be accessed by a plurality of users, and the first data spaces respectively possessed by the plurality of users;

first access means for performing a display for accessing the second data space, and accessing the second data space via the display; and second access means for, when the first access means accesses the second data space, performing a display for accessing at least one of the first data spaces included in the second data space, and accessing the first data space possessed by another user via the display.

With the above-mentioned arrangement for achieving the first object, common data are stored in units of data types. When the common data are used by, e.g., an application, the data type of common data to be used is designated, thus obtaining desired common data.

With the above-mentioned arrangement for achieving the second object, when a given user accesses the data space of another user, the second data space is accessed from the first data space of the given user, and the data space of the other user is accessed via the second data space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 shows a data information table of data created by an application;

FIG. 15 shows an application information table;

FIG. 16 shows a library information table;

FIG. 17 shows a user information table;

FIG. 18 shows an office information table;

FIG. 19 shows a group information table;

FIG. 20 shows an object management information table;

FIG. 21 shows an open object management information table;

FIG. 22 shows library search order information;

FIG. 64 shows a CCP data management information table;

FIG. 71 is a view showing a display state of a search result detail window;

DETAILED DESCRIPTION OF THE PREFERRED EMBODIMENTS

Preferred embodiments of the present invention will now be described in detail in accordance with the accompanying drawings.

<Description of Apparatus>

Figure 1:
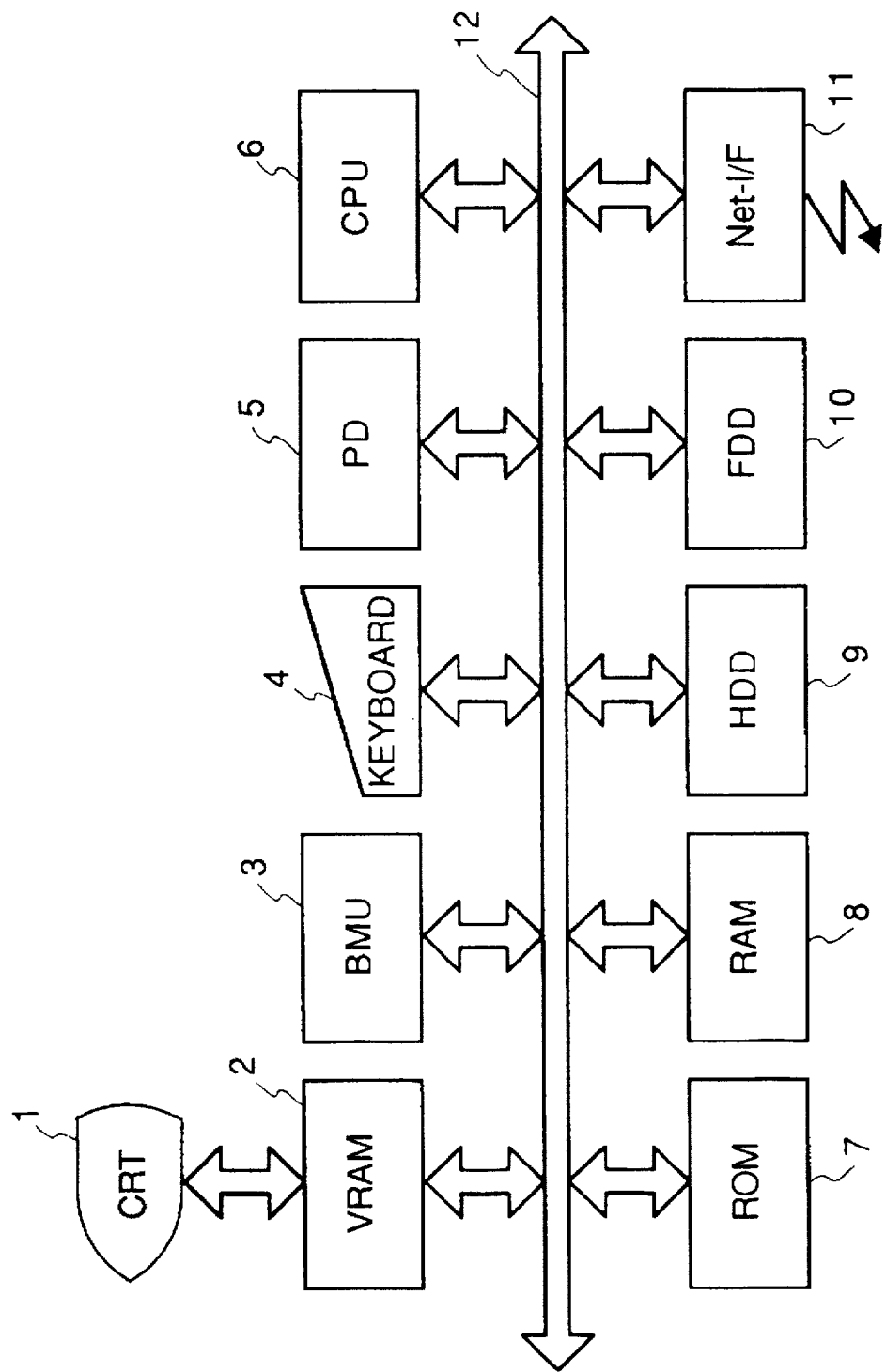
FIG. 1 is a block diagram showing a schematic arrangement of a data processing apparatus according to an embodiment of the present invention.

FIG. 1 is a block diagram showing a data processing apparatus according to an embodiment of the present invention. In FIG. 1, reference numeral 1 denotes a CRT for displaying information of data which is being processed by an application program, various message menus, and the like. Reference numeral 2 denotes a video RAM (to be referred to as a VRAM hereinafter) for developing an image to be displayed on the screen of the CRT 1. Reference numeral 3 denotes a bit management unit (to be referred to as a BMU hereinafter) for controlling data transfer between memories or between a memory and a device; 4, a keyboard having various keys for executing processing such as document edit processing; and 5, a pointing device (mouse) used for pointing, e.g., an icon displayed on the screen. Reference numeral 6 denotes a CPU for controlling the entire apparatus.

Reference numeral 7 denotes a ROM storing operation processing sequences of the CPU 6. Note that the ROM 7 pre-stores application programs associated with data processing, an error processing program, and programs associated with flow charts shown in FIG. 26 and the like (to be described later). Reference numeral 8 denotes a RAM used as a work area upon execution of various programs described above by the CPU 6, and a temporary saving area in error processing. Furthermore, the RAM 8 comprises an area for storing tables of various kinds of information such as data information 50, application information 60, and the like (to be described later). Reference numeral 9 denotes a hard disk drive (to be abbreviated to an HDD hereinafter); and 10, a floppy disk drive (to be abbreviated to an FDD hereinafter). These disks are used for storing application programs, data, libraries, and the like.

Reference numeral 11 denotes a network interface (to be abbreviated to a Net-I/F hereinafter) for executing data control and diagnosis on a network so as to execute data transfer with another document processing apparatus via the network. Reference numeral 12 denotes an I/O bus (including an address bus, a data bus, and a control bus) for connecting the above-mentioned units.

<Concept of Desktop Management System>

Figure 3:
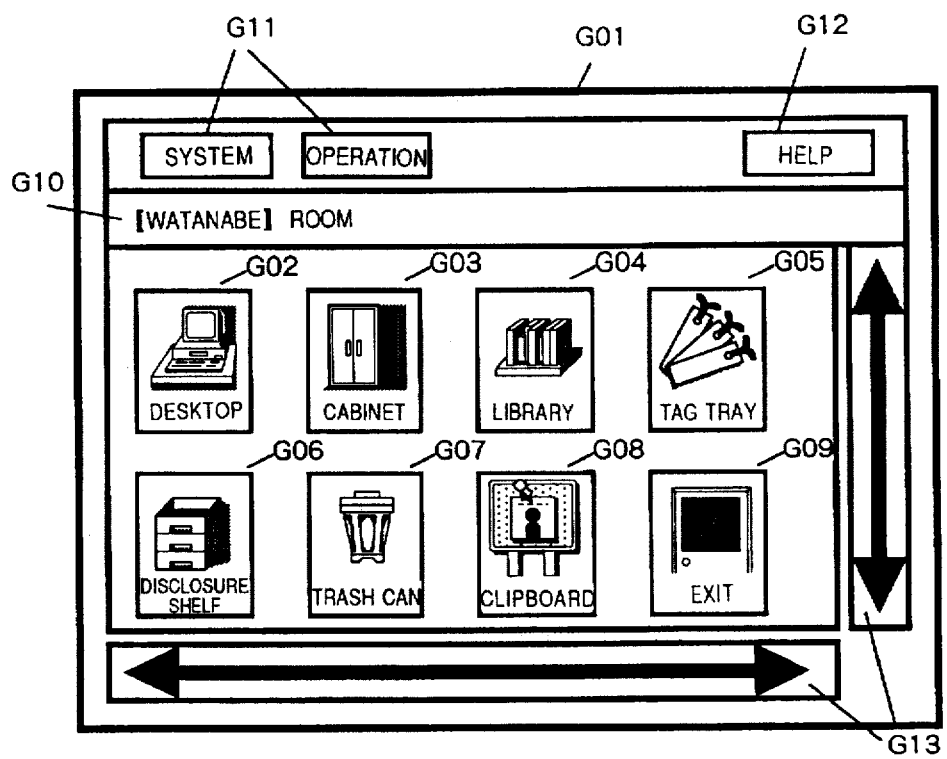
FIG. 3 is a view showing a display state of a room window.

In this embodiment, a program called a "desktop management system" has the following functions. More specifically, the desktop management system manages application programs for processing data, and manages data processed by these application programs. Also, the desktop management system provides an environment for processing the data to a user, executes an application program, and executes processing for supplying data to the executed application program. FIG. 3 shows a display example in an actual desktop management system. As shown in FIG. 3, a plurality Of windows constituted by a window system are displayed on the display screen, and data are processed by input means such as the keyboard 4, the pointing device 5, and the like.

Figure 2:
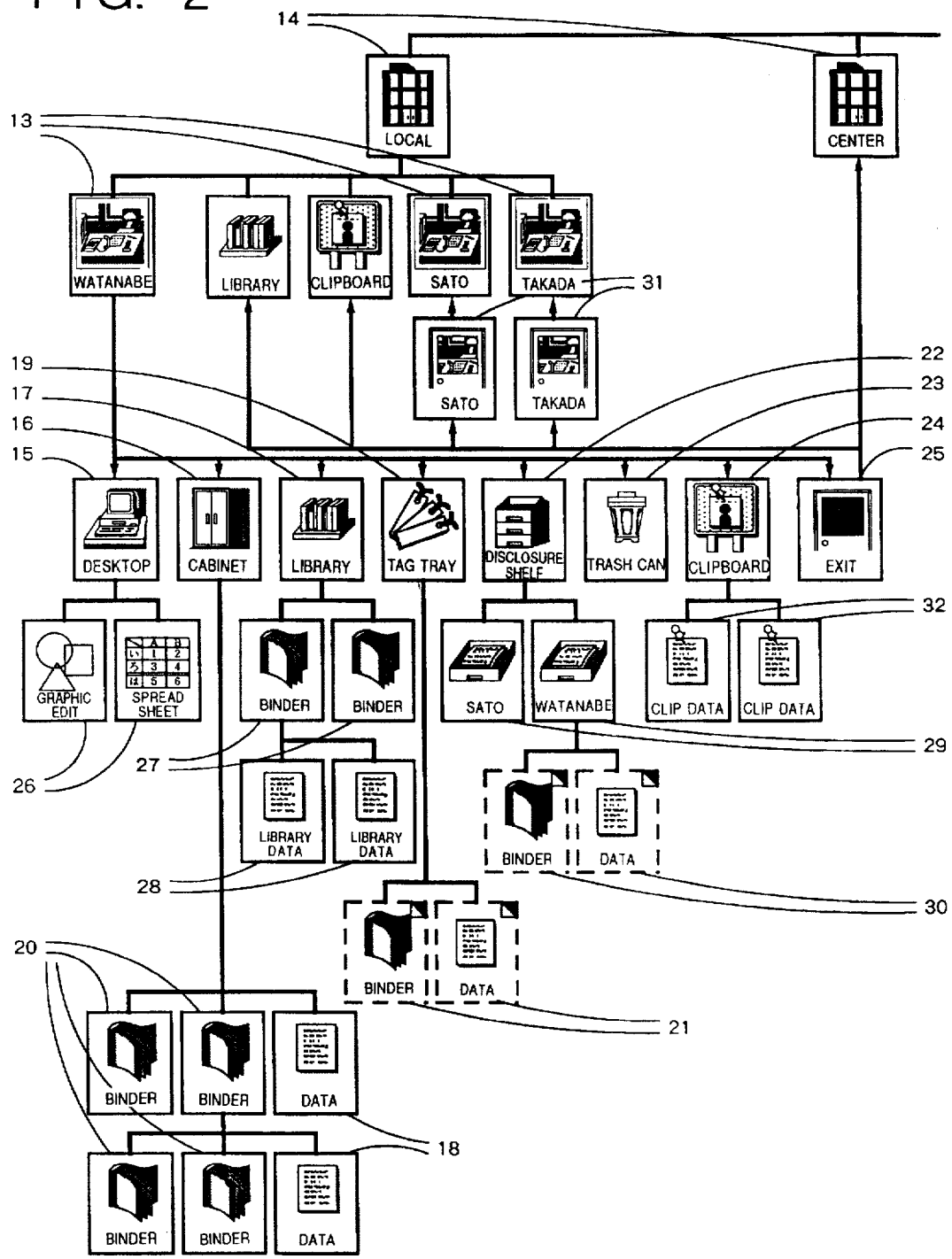
FIG. 2 is a view showing the concept of a user's work environment in a desktop management system.

Various concepts in the desktop management system will be described below. FIG. 2 shows rooms and offices as the concepts of user's work environments in the desktop management system.

Reference numeral 13 denotes a room, which is a concept representing a space for providing an environment possessed by a single user. Reference numeral 14 denotes an office, which is a concept representing a space constituted by a set of rooms 13 included therein. These concepts are formed by imitating an office in an actual society, with rooms as work environments of individuals who work in the office. For example, a physical file system of a single computer is defined as one office 14, and a plurality of offices 14 are coupled through the network. A plurality of rooms 13 are included in each office 14. Functions for providing a work environment included in each room 13 will be described in the following paragraphs of an operation object. A single user has his or her own room 13 in a proper office 14, and receives a service of the desktop management system in the room 13. The user can start an application program or process data by operating an operation object (to be described later). The user can make an access to the room 13 of another user in the office 14 to which his or her own room 13 belongs or to a room 13 in another office 14. The user can perform the same operations as those in his or her own room 13 within a range allowed by a disclosure operation (to be described later). Furthermore, the user can perform operations for moving and copying data, and the like across a plurality of rooms 13.

The operation object (object) provides a means with which a user accesses the desktop management system, and represents data or a set of data expressed as icons on a window, functions presented by the desktop management system, and the like. Objects presented by a user interface will be described below with reference to FIG. 2 and corresponding drawings.

FIG. 3 shows a display example of a room window G01 representing the user's room 13 realized on the window system. Objects present in the room window G01 will be described below with reference to FIG. 3.

A desktop 15 indicated by a desktop object G02 is an object representing a function of managing application programs as one function of the desktop management system. Upon execution of an open operation of the desktop object G02, a window (FIG. 4) including intra-desktop objects (to be described later) is displayed.

A cabinet 16 indicated by a cabinet object G03 is an object indicating an entry in a top hierarchical level of data created by application programs managed based on the hierarchical structure. Upon execution of an open operation of the cabinet object G03, a window (FIG. 5) including intra-cabinet objects (to be described later) is displayed.

A library 17 indicated by a library object G04 is an object indicating an entry of a location where library data as common auxiliary data which is referred to when an application program processes data is stored. Upon execution of an open operation of the library object G04, a window (FIG. 6) including intra-library objects (to be described later) is displayed.

A tag tray 19 indicated by a tag tray object G05 is an object representing a virtual entry for accessing a binder 20 or data 18 (to be described later) without following the hierarchical structure of cabinets. A tag 21 is an object stored as an intra-tag tray object. Upon execution of an open operation of the tag tray object G05, a window (FIG. 8) including intra-tag tray objects (to be described later) is displayed.

A disclosure shelf 22 indicated by a disclosure shelf object G06 is an object for realizing an operation for permitting another user to refer to or update data 18 or a binder 20 in the cabinet 16 in the room 13 of a given user (to be referred to as a disclosure operation hereinafter), and holding the information. Upon execution of an open operation of the disclosure shelf object G06, a window (FIG. 9) including intra-disclosure shelf objects is displayed.

A trash can 23 indicated by a trash can object G07 is an object for managing a data discard operation.

A clipboard 24 indicated by a clipboard object G08 is an object for providing a function of exchanging all or part of data 18 processed by a certain application 26 with the application or another application 26.

An exit 25 indicated by an exit object G09 is an object representing an access means to a room 13 of another user or another office 14. Upon execution of an open operation of the exit object G09, a window (FIG. 11) including intra-exit objects (to be described later) is displayed.

Displayed items other than the operation objects in the room window G01 will be described below. Reference numeral G10 denotes a title for displaying a user's name and a title of the displayed window; G11, an operation button for instructing an operation in the window; G12, a help button used for displaying help contents as guidance of operations; and G13, a scroll bar for scrolling and displaying icons located outside the window.

Figure 4:
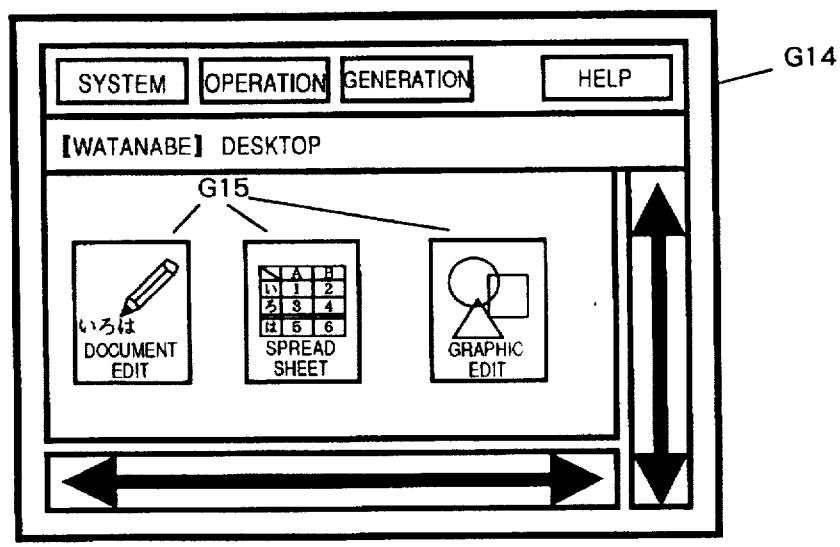
FIG. 4 is a view showing a display state of a desktop window.

FIG. 4 shows a desktop window G14 displayed when the desktop object G02 is opened. Operation objects in the desktop window G14 will be described below with reference to FIG. 4. Applications 26 (document edit, spreadsheet, and graphic edit in this case) indicated by application objects G15 are objects for operating (starting) the corresponding application programs. An operation of each application object G15 will be described later.

Figure 5:
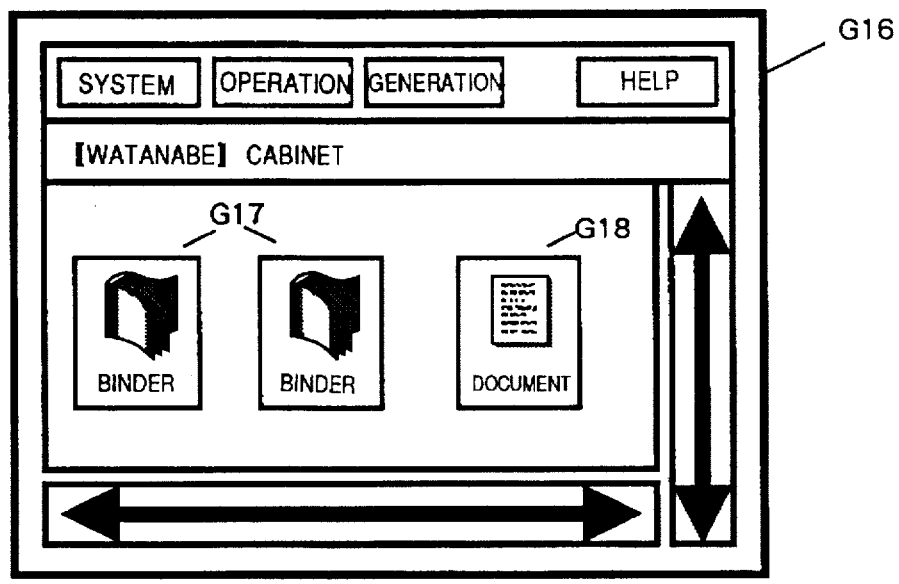
FIG. 5 is a view showing a display state of a cabinet window.

FIG. 5 shows a cabinet window G16 displayed when the cabinet object G03 is opened. Operation objects in the cabinet window G16 will be described below with reference to FIG. 5. A binder 20 indicated by a binder object G17 is an object indicating a node under the cabinet 16 for managing data in a hierarchical structure. This object can be arbitrarily created under the hierarchical levels of the cabinet 16 and the binder 20. Upon execution of an open operation of the binder object G17, a window including binders 20 and data 18 present in the binder 20 is displayed. Data 18 indicated by a data object G18 is an object representing data 18 created by the application 26. The data object 18 is used for operating the data 18 and for starting an application program for processing the corresponding data 18. Objects in the binder 20 are the same as those in the above-mentioned cabinet object.

Figure 6:
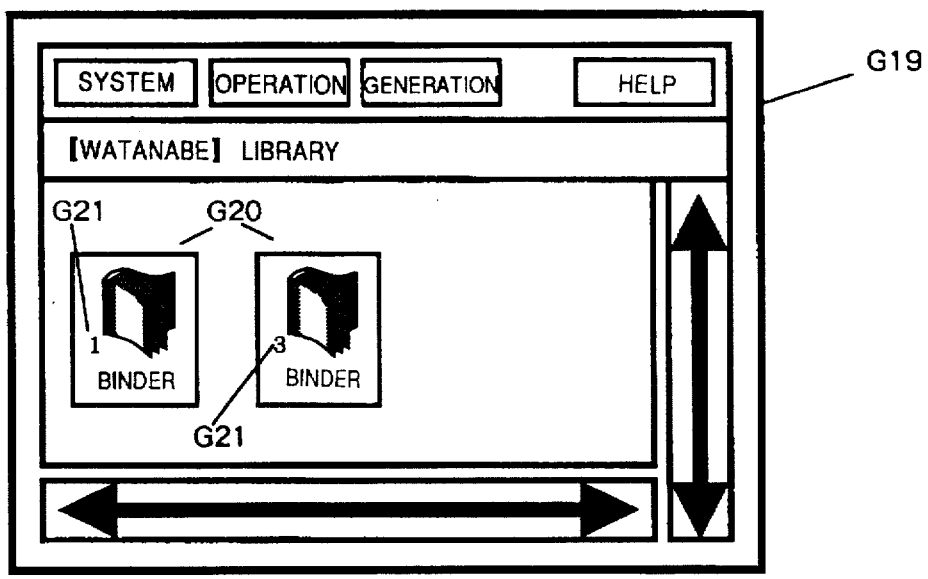
FIG. 6 is a view showing a display state of a library window.

FIG. 6 shows a library window G19 when the library object G04 is opened. Operation objects in the library window G19 will be described below with reference to FIG. 6. A library binder 27 indicated by a library binder object G20 is an object for storing library data 28 managed as a library in units of data types. Reference numeral G21 denotes a numerical value representing the number of times of referring operations of the library data 28 in the library binder 27 by an application program. Upon execution of an open operation of the library binder object G20, a window including library data 28 in the opened library binder 27 is displayed.

Figure 7:
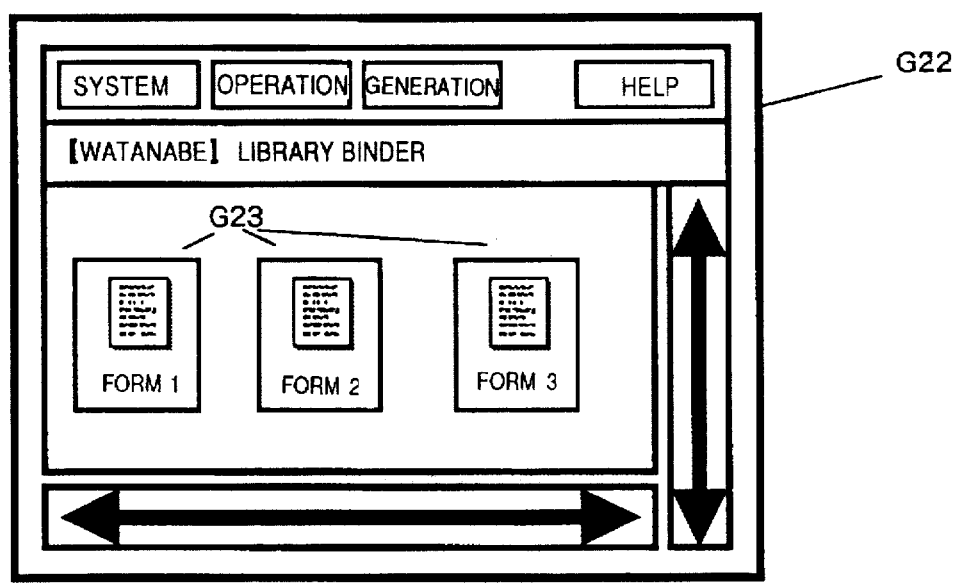
FIG. 7 is a view showing a display state of a library binder window.

FIG. 7 shows a library binder window G22 displayed when the library binder object G20 is opened. Operation objects in the library binder window G22 will be described below with reference to FIG. 7. Library data 28 indicated by a library data object G23 is one particularly managed as the above-mentioned library of the data 18 created by the applications. The library data 28 having the same data format are stored in a single library binder 27.

Figure 8:
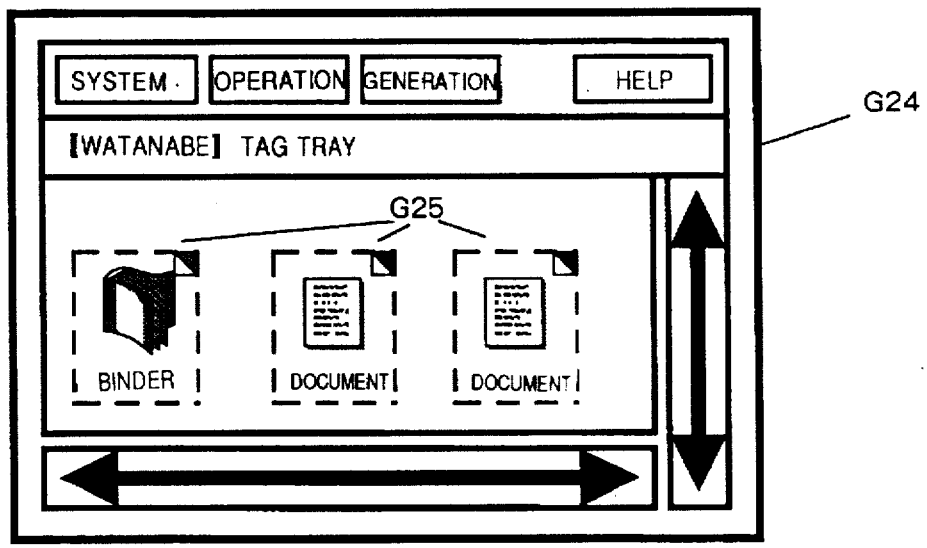
FIG. 8 is a view showing a display state of a tag tray window.

FIG. 8 shows a tag tray window G24 displayed when the tag tray object G05 is opened. Operation objects in the tag tray window G24 will be described below with reference to FIG. 8. The tag 21 indicated by a tag object G25 is a virtually displayed object for accessing intra-cabinet objects (the binder 20 or data 18) without following the hierarchical structure of the cabinets. The same operation as that for a real object (the binder 20 or data 18) indicated by a given tag 21 can be performed for the tag 21.

Figure 9:
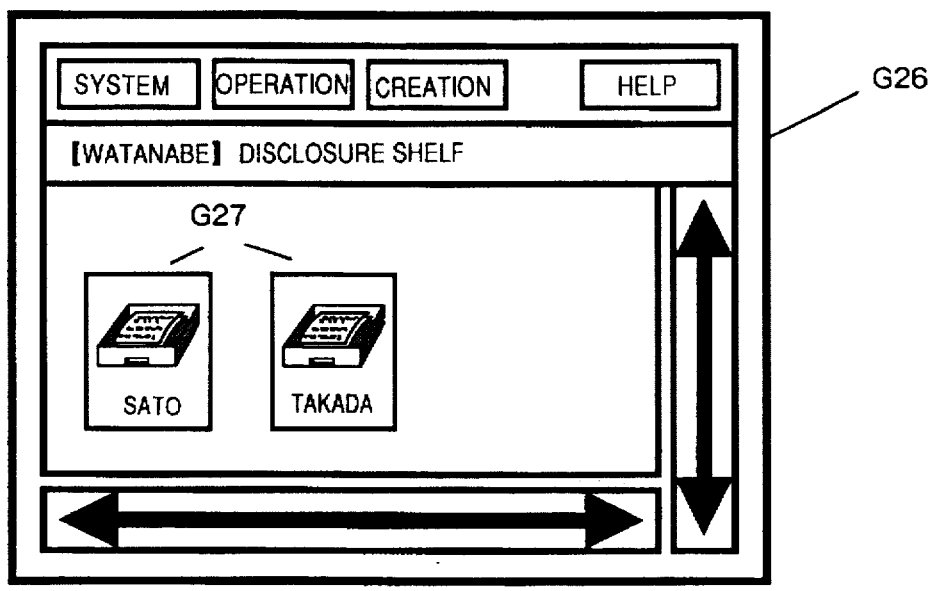
FIG. 9 is a view showing a display state of a disclosure shelf window.

FIG. 9 shows a disclosure shelf window G26 displayed when the disclosure shelf object G06 is opened. Operation objects in the disclosure shelf window G26 will be described below with reference to FIG. 9. A disclosure tray 29 indicated by a disclosure tray object G27 is an object created in correspondence with another user or a set of users (to be referred to as a user group hereinafter) as a disclosure target when a user performs a disclosure operation. Upon execution of an open operation of the disclosure tray object G27, a window including disclosure objects 30 is displayed.

Figure 10:
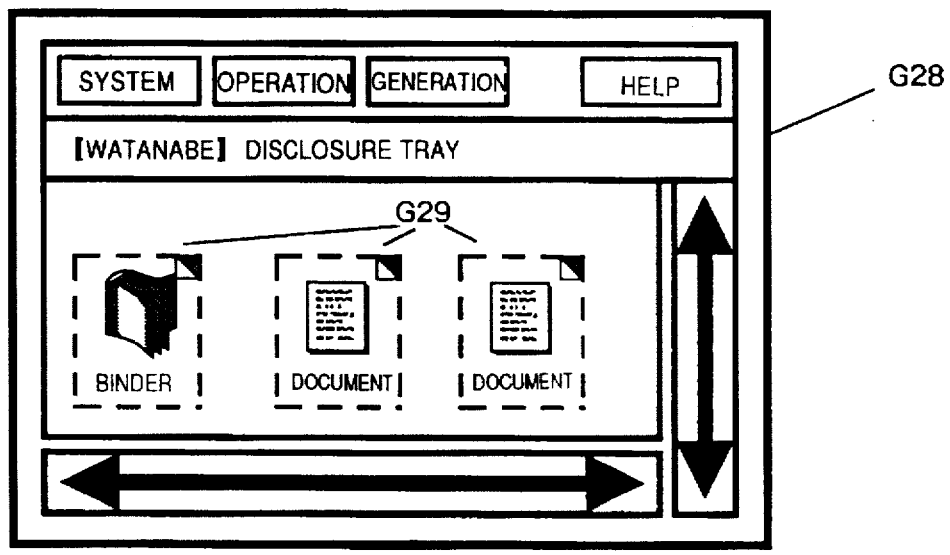
FIG. 10 is a view showing a display state of a disclosure tray window.

FIG. 10 is a disclosure tray window G28 displayed when the disclosure tray object G27 is opened. Operation objects in the disclosure tray window G28 will be described below with reference to FIG. 10. Disclosure objects G29 virtually display objects of the cabinet 16, the binder 20, and the data 18 of a user who executed the disclosure operation. Depending on attributes of the disclosure tray 29 including the disclosure objects G29, a user or a user group as a disclosure target of the disclosure objects G29 is determined. The disclosure operation will be described later.

Figure 61:
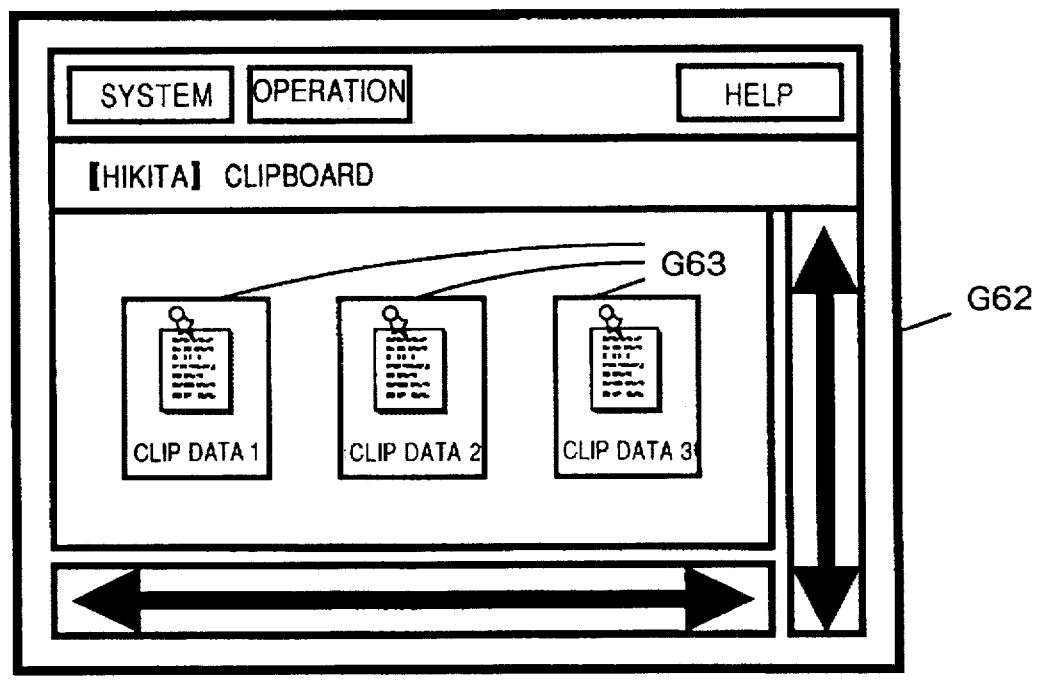
FIG. 61 is a view showing a display state of a clipboard window.

FIG. 61 shows a clipboard window G62 displayed when the clipboard object G08 is opened. The clipboard window G62 includes clip data objects G63 as operation objects indicating clip data 32. The clip data 32 includes all or part of the data 18 created by a certain application 26 and a format ID of the application 26. The clip data 32 created by the application 26 is stored in the clipboard 24 in the room 13 of the corresponding user, and is displayed as the clip data object G63 in the clipboard window G62. An operation of the clipboard 24 will be described later.

Figure 11:
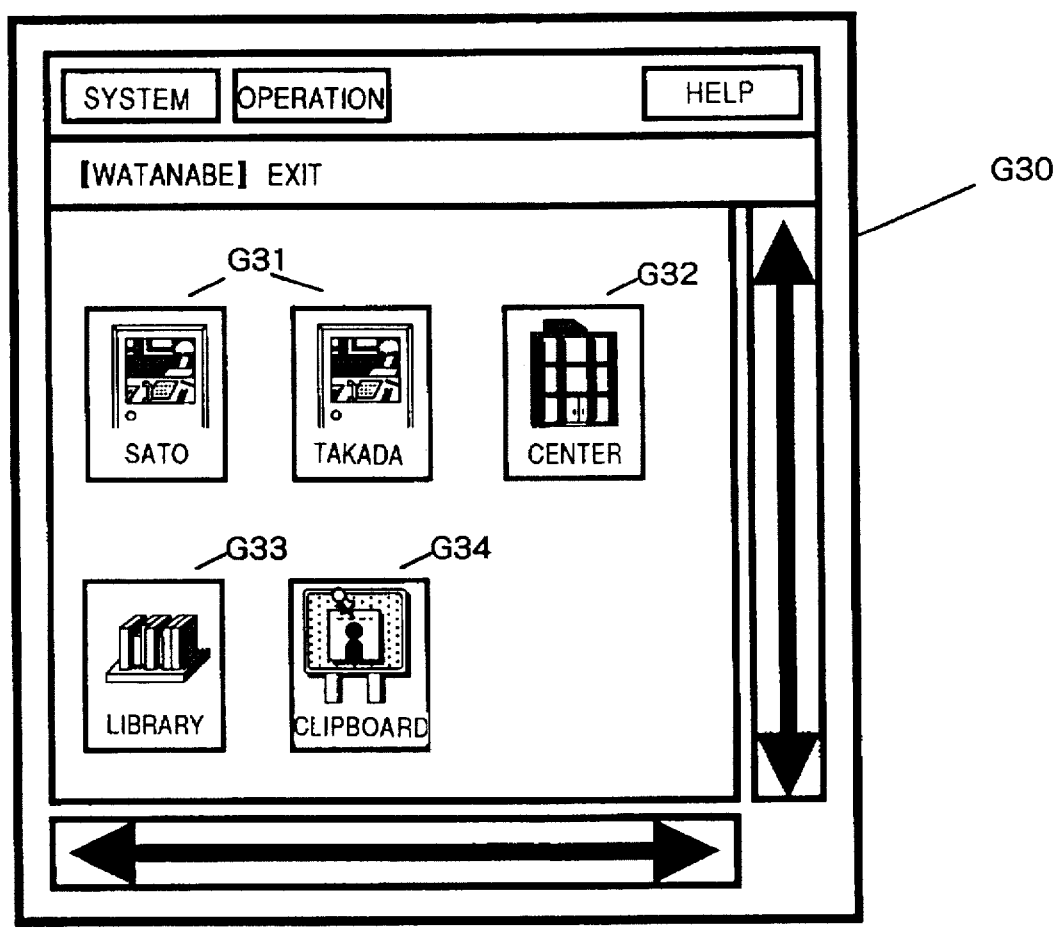
FIG. 11 is a view showing a display state of an exit window.
Figure 13:
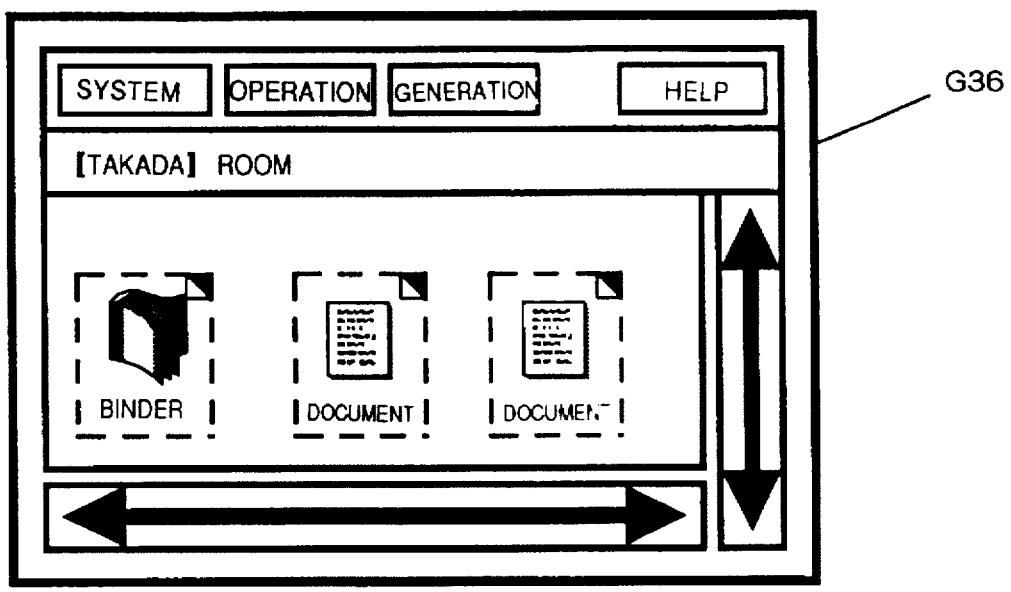
FIG. 13 is a view showing a display state of a room window.

FIG. 11 shows an exit window G30 displayed when the exit object G09 is opened. Operation objects in the exit window G30 will be described below with reference to FIG. 11. Each door object G31 is an object representing an entrance to another user's room included in the office to which a user of interest belongs. A user's name is displayed on the door object G31 indicating a door 31, and when the door object G31 is opened, a window of the other user's room 13 indicated by the door 31 is displayed. FIG. 13 shows this state. Then, objects indicating the cabinet 16, the binder 20, and the data 18 that the user of the opened room 13 performed the disclosure operation to the user of interest or a user group including the user of interest are displayed. When the user of interest operates the disclosure objects, he or she can access data of the user of the opened room 13. An office object G32 is an object representing an entrance to another office. An office name is displayed on the office object G32, and upon execution of an open operation of the office object G32, door objects G31 representing entries to rooms included in the opened office are displayed. The operation to these door objects G31 is the same as that for the above-mentioned door 31. A library object G33 is a library managed by the office to which the user of interest belongs. The operation and content of the library object G33 are the same as that described above with reference to FIG. 6.

<Information for Desktop Management System>

Management information necessary for operating the desktop management system will be described below.

FIG. 14 shows a table of data information 50. The data information 50 is information for registering and managing the formats and types of data 18 created by applications 26 managed by the desktop 15, and includes the following items for each data format. Reference numeral 51 denotes a data format ID, which is a serial number for each data format. Reference numeral 52 denotes an extension indicating letters to be attached to the end of a file name when a file of data 18 of the corresponding data format is created. Reference numeral 53 denotes an icon file name, which represents a file name storing icon data used when the data 18 is displayed in the binder 20. Reference numeral 54 denotes a library ID (to be described later) as an ID of library data when data of the corresponding data format can also be managed as library data. Note that a plurality of library IDs can be registered.

FIG. 15 shows a table of application information 60. The application information 60 is information associated with the applications 26 managed by the desktop 15, and objects of the applications 26 are displayed based on this information in a window of the desktop 15 (to be described later). The application information 60 includes the following information for each registered application 26. Reference numeral 61 denotes an application ID, which is a serial number for each application program. Reference numeral 62 denotes an execution module name, which represents the name of a program used when the application 26 is executed. Reference numeral 63 denotes an application name, which is displayed as the name of the object of the corresponding application 26. Reference numeral 64 denotes an icon file name, which represents a file name storing icon data used when an icon of the corresponding application 26 is displayed. Reference numeral 65 denotes a processing list, which indicates a format ID 51 indicating the data format of data 18 which can be processed by the corresponding application program, and also indicates a correspondence between a processing code representing processing which can be executed in each data format and a name for displaying the processing. Reference numeral 66 denotes a head entry of the processing list in units of format IDs 61 of the processing list 65, which entry represents default processing of the corresponding application 26. More specifically, the head entry 66 indicates a processing content of the corresponding application 26 when the application 26 is started without designating data 18 as an object to be processed, and includes the format ID and its processing list. Reference numeral 67 denotes processing data necessity information, which represents whether or not data 18 as an object to be processed is required upon executing of processing described in the processing list. If the processing data necessity information 67 is "o", it indicates that the data 18 is necessary; if the information is "x", it indicates that the data 18 is unnecessary; and if the information is blank, the necessity of the data 18 can be ignored.

FIG. 16 shows a table of library information 70. The library information 70 is information about library data 28 to be managed by the desktop management system. The library binders 27 are displayed in the window of the library 17 (to be described later) on the basis of this library information. Each registered library binder 27 includes the following information. Reference numeral 71 denotes a library ID, which is the serial number in units of library binders 27. Reference numeral 72 denotes a library binder name, which indicates the position (directory) of the corresponding library binder 27 in the hierarchical file system that stores the library data 28. Reference numeral 73 denotes a library name, in which the name of a library as a set of data having the same data format is registered. Reference numeral 74 denotes an open count, which represents the number of open times so far of library data 28 in the corresponding library binder 27.

FIG. 17 shows a table of user information 80. The user information 80 is information for managing users of a system operated by one desktop management system, and includes the following information in units of users. Reference numeral 81 denotes a user ID, which is the serial number in units of users. Reference numeral 82 denotes user information, which represents arbitrary information associated with a corresponding user such as the name of the corresponding user, and the like. Reference numeral 83 denotes a room directory, which represents the position (path of the directory) of the room 13 of the corresponding user. Reference numeral 84 denotes an updating mode of library data 28 in the room 13 of the corresponding user. This library updating mode will be described later.

FIG. 18 shows a table of office information 90. The office information 90 is information for managing offices 14 operated by another desktop management system connected through, e.g., a network, and includes the following information in units of offices 14. Reference numeral 91 denotes an office ID, which is the serial number in units of offices 14.

Reference numeral 92 denotes a host name, which represents the name of a host where the corresponding office 14 is present. Reference numeral 93 denotes an office name, which represents the name of the corresponding office 14 present in the host. Reference numeral 94 denotes a domain, which represents the domain of the host to which the corresponding office 14 belongs. The domain means a set of computers having the same architecture. Among desktop management systems, which operate on computers belonging to the same domain, data transfer can be executed without executing any special conversion of data created by application programs. Reference numeral 95 denotes a library updating mode, which represents an updating mode of library data 28 in the corresponding office.

FIG. 19 shows a table of group information 100. The group information 100 is information for managing groups as units each grouping one or a plurality of users so as to represent a range of users for limiting reference and updating of data 18, and includes the following information in units of groups. Reference numeral 101 denotes a group ID, which is the serial number in units of groups. Reference numeral 102 denotes a user ID, which represents user IDs of users belonging to the corresponding group.

<Cabinet Management Information>

FIG. 20 shows a table of object management information 110. The object management information 110 is a file for managing information of each object included in the binder 20, and is present in the cabinet 16 (including the library 17 and the trash can 23) and in units of binders 20 included therein. One object management information 110 is present for each office 14 so as to manage the library data 28 of the corresponding office 14. The data management information 110 includes the following items for each data.

Reference numeral 111 denotes an object type, which indicates the type of object (the binder 20, data 18, disclosure shelf 22, disclosure tray 29, tag tray 19, tag 21, library binder 27, or library data 28). Reference numeral 112 denotes a file name, which represents a file or directory name as the content of the object. Reference numeral 113 denotes a format ID. When the object is data or library data, the format ID 113 indicates the format ID 51 of the data. When the object is a library binder in the library 17, the format ID 113 indicates its library ID. Reference numeral 114 denotes a creator ID. When the object is data, the creator ID 114 indicates the application ID 61 of the application 26 which created the data. Reference numeral 115 denotes a kanji name of the object. Reference numeral 116 denotes a size. When the object is data, the size 116 indicates the size of the data in units of bytes; when data consists of a plurality of files (fragments; to be described later), it indicates the total size of the data.

Reference numeral 117 denotes a registration date, which indicates the creation date of a new object. Reference numeral 118 denotes an updating date, which indicates the latest updating date of the object. Reference numeral 119 denotes a reference date, which represents the latest reference date of the object. Reference numeral 120 denotes an owner user ID, which represents the user ID 81 of the owner of the object. Reference numeral 121 denotes an owner group ID, which represents the group ID 101 of the owner of the object. Reference numeral 122 denotes a reference user ID, which represents the user ID 81 of a user who referred to the object latest. Reference numeral 123 denotes an updating user ID, which represents the user ID 81 of a user who updated the object latest. Reference numeral 124 denotes an access level, which sets to enable/disable the reference and updating operations of the object while classifying users into three types, i.e., a user as the owner of data, a user of a group to which the data owner belongs, and other users.

Reference numeral 125 denotes a domain. When the object is data, the domain 125 represents the domain of the office 14 where the data was created/updated. Reference numeral 126 denotes a disclosure target user ID. When the object is a disclosure tray 29 which is disclosed to other users, the disclosure target user ID 126 indicates the user ID 81 of a target user of the disclosure tray, i.e., a user as a disclosure target. Reference numeral 127 denotes a disclosure target group ID. When the object is a disclosure tray 29 which is disclosed to other groups, the disclosure target group ID indicates the group ID 101 of a target group of the disclosure tray, i.e., a group as a disclosure target. Reference numeral 128 denotes a disclosure copy limitation. When the object is a disclosure object 30, the disclosure copy limitation 128 represents a setting content for limiting a copy operation of the object with respect to a disclosure target user. Reference numeral 129 denotes a disclosure period. When the object is a disclosure object 30, the disclosure period 129 represents a term through which the disclosure operation of the disclosure object 30 is valid. Reference numeral 130 denotes a data discard time limit. When the object is data placed in the trash can 23, the data discard time limit 130 represents a term to automatically discard the data in the trash can 23 after the term expires. Reference numeral 131 denotes a tag reference target. When the object is a tag 21, the tag reference target 131 indicates a location of an operation object (substance) indicated by the tag 21.

FIG. 21 shows a table of open object management information 140. The open object management information 140 is information for managing the states of the currently opened binder 20 and data 18 in the room 13 of each user, and one information is present for each room 13. The open object management information 140 includes the following items for each object. Reference numeral 141 denotes a file name, which represents the file name of the corresponding object. Reference numeral 142 denotes a user ID, which represents the user ID 81 of a user who opens the corresponding object. Reference numeral 143 denotes an access level, which is a flag indicating whether the corresponding object is opened at the access level 124, which enables only a reference operation, or at the access level 124, which enables an updating operation. Reference numeral 144 denotes a date at which the corresponding object is opened.

FIG. 22 shows library search order information 150. The library search order information 150 is information representing the order of the libraries 17 upon searching of the library data 28, and one information is present for each room 13.

<Opening Binder>

Figure 23:
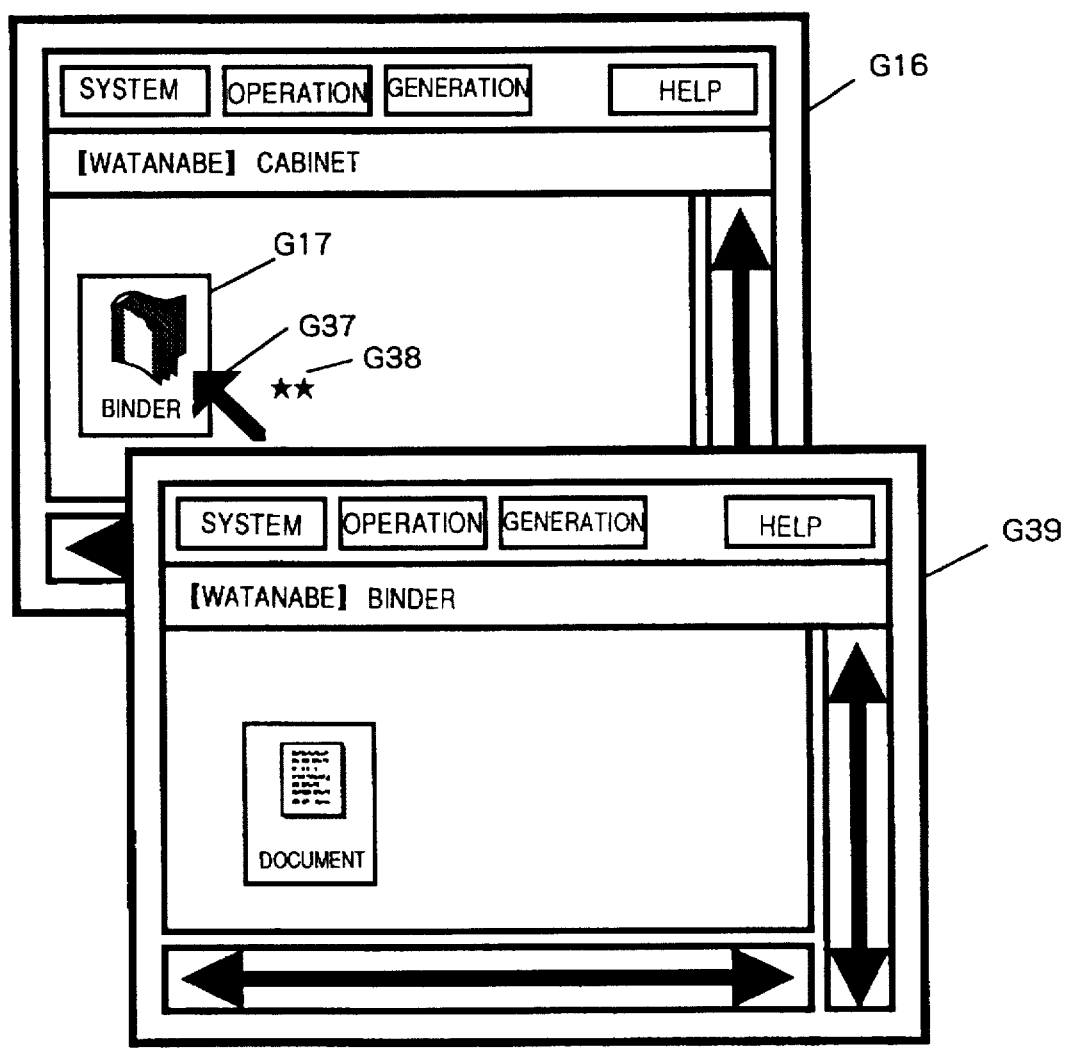
FIG. 23 is a view showing an operation for opening a binder on the cabinet window.

FIG. 23 is a view showing an operation for opening a binder 20 in the cabinet 16 on the cabinet window. In FIG. 23, reference numeral G37 denotes a cursor indicating the position, on the screen, of the pointing device 5. Reference numeral G38 denotes a mark representing a button operation of the pointing device 5 for the purpose of explaining an operation. A mark "★" expresses a 1-click operation of the button of the mouse; a mark "★★" expresses a 2-click operation of the button of the mouse.; a mark "☆" expresses continuous depression of the button of the mouse; and a mark "☆☆" expresses release of the button of the mouse.

The open operation of the binder 20 is realized by moving the cursor G37 to an icon of the binder object G17 in the cabinet window G16, and 2-clicking the button of the mouse ("★★"). With this open operation, a binder window G39 which displays the content of the binder 20 appears. This open operation is common to all operation objects.

Figure 24:
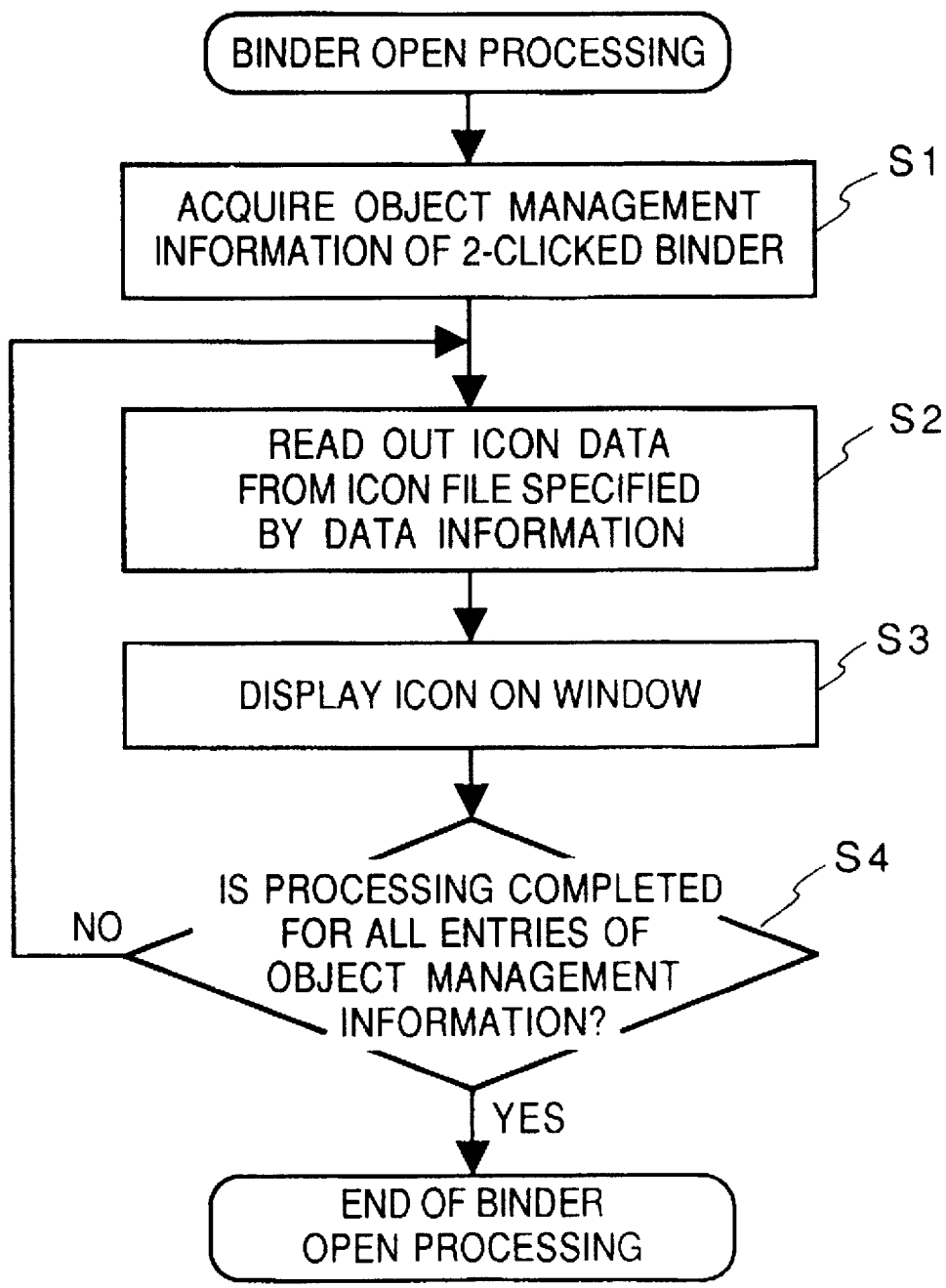
FIG. 24 is a flow chart showing an open processing sequence by the binder open operation.

The open processing of the binder 20 will be described below with reference to the flow chart shown in FIG. 24. In step S1, object management information 110 of a binder 20 indicated by the 2-clicked binder object G17 is acquired. In step S2, an icon file is read out on the basis of a format ID 113 and data information 50 registered in the object management information 110 acquired in step S1. In step S3, the binder window G39 is generated, and icons are displayed on the binder window G39 on the basis of the icon file read out in step S2. It is then checked in step S4 if the above-mentioned processing is executed for all entries of the object management information 110. If YES in step S4, this processing is ended; otherwise, the flow returns to step S2 to repeat the above-mentioned processing. This processing is common to the cabinet 16, the disclosure shelf 22, the tag tray 19, and the library binder 27. Open processing of the desktop 15, the exit 25, and the library 17 will be described later.

<Copying Data>

Figure 25:
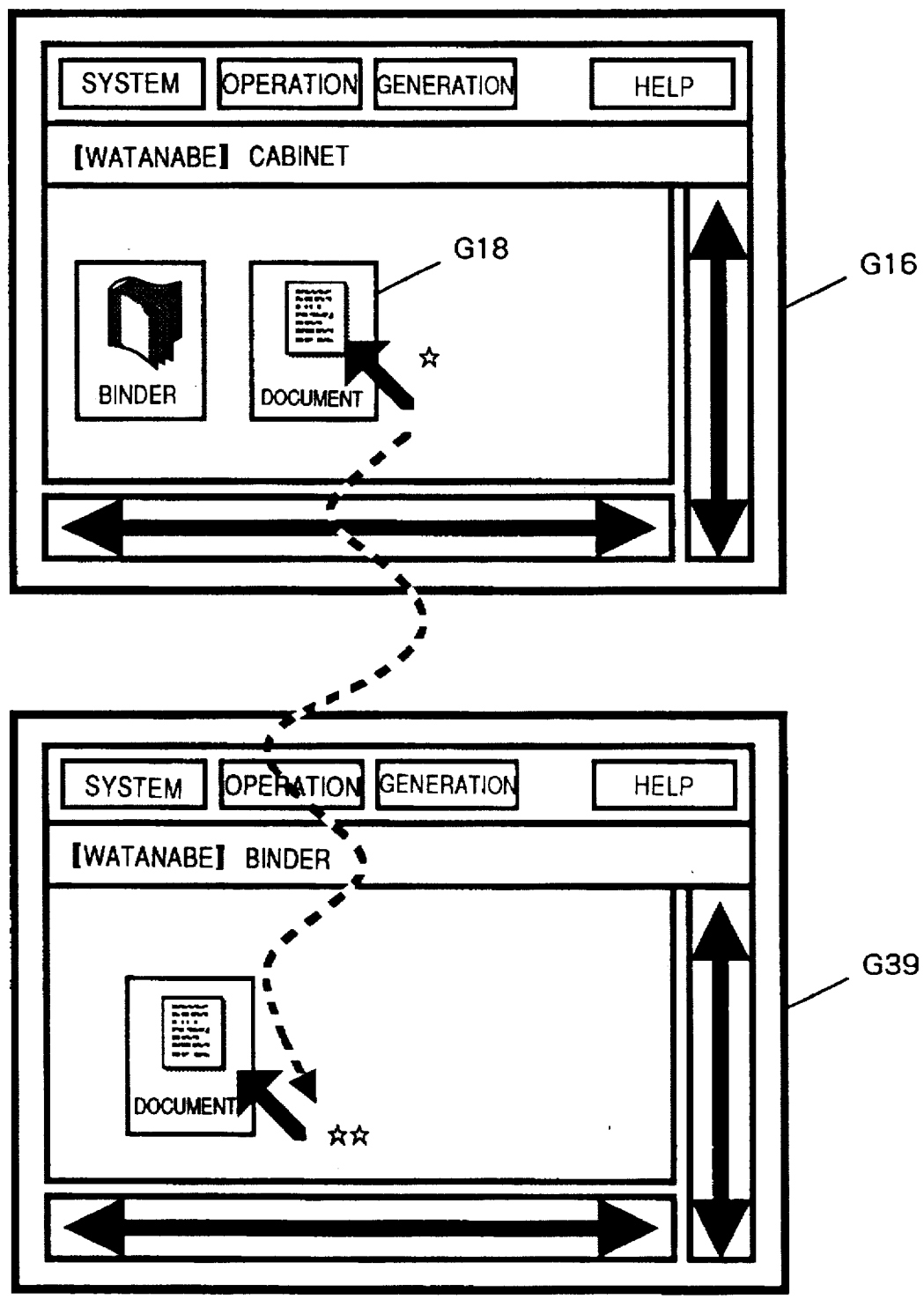
FIG. 25 is a view for explaining a data copy operation between different cabinets or binders.

FIG. 25 is a view showing a copy operation of data 18 between cabinets 16 or binders 20. In the copy operation of data 18, the cursor G37 is moved to an icon of a data object G18 as a required copy source. Then, while continuously depressing the button of the mouse ("☆"), the cursor G37 is moved to the binder window G39 as a required copy destination, and the button of the mouse is released ("☆☆"). Such an operation is called a drag/drop operation. In FIG. 25, the copy destination is the binder window G39. However, the same operation is performed if the copy destination is the cabinet window G16.

Figure 26:
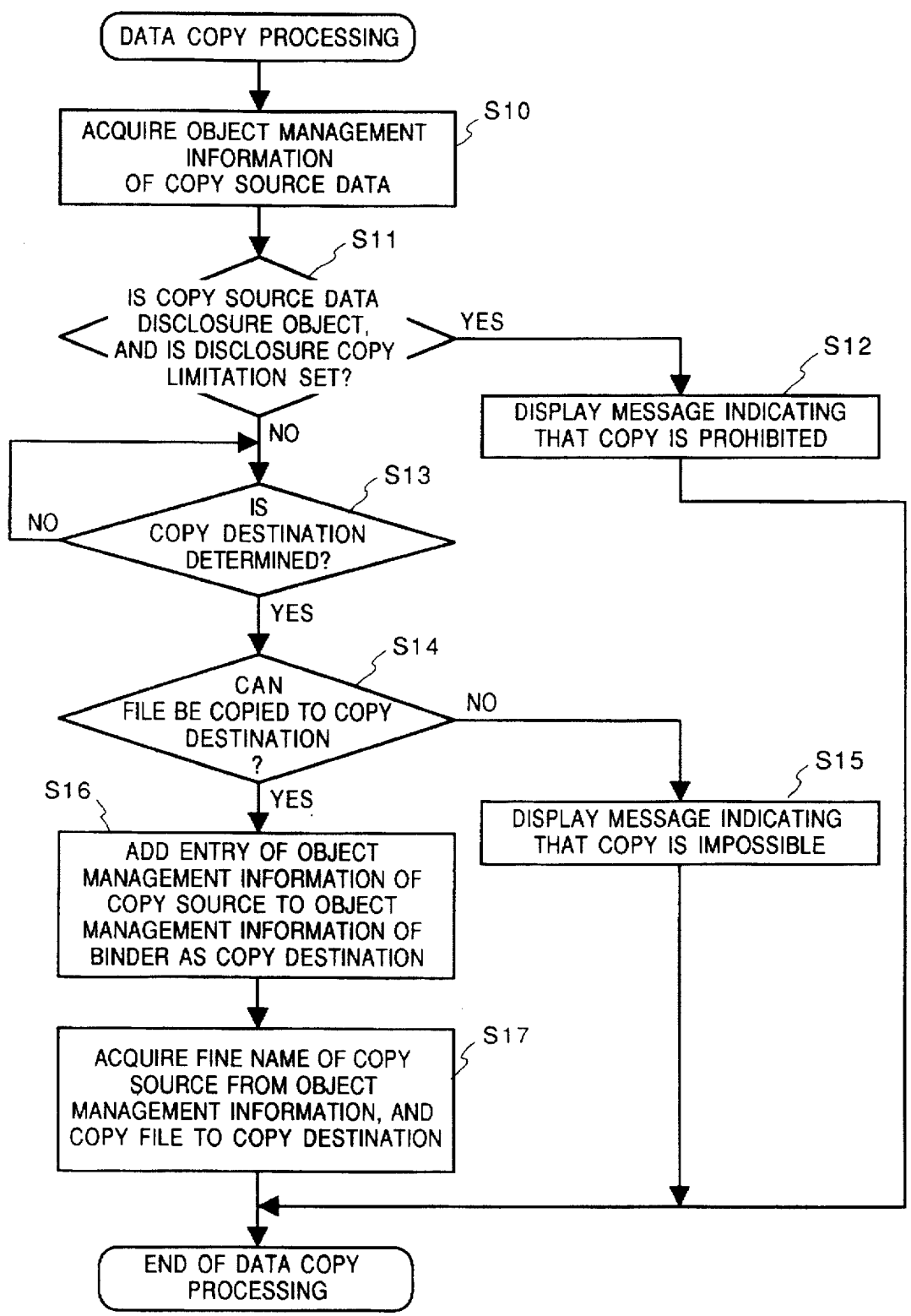
FIG. 26 is a flow chart showing a data copy processing sequence.

The copy processing method of data 18 in a cabinet will be described below with reference to the flow chart shown in FIG. 26. In step S10, when the button of the mouse is depressed at a position on the icon of the copy source, object management information 110 of data 18 is acquired from a binder 20 including the data 18 as the copy source. If it is determined based on the acquired object management information 110 in step S11 that the copy source data 18 is a disclosure object 30 and a disclosure copy limitation 128 is set, a message indicating that the copy operation of the data is prohibited is displayed in step S12, and the processing is interrupted. In step S13, if the button of the mouse is released at a copy destination, the copy destination is determined. In step S14, the disk capacity is checked to determine if the copy operation of the file can be performed. If NO in step S14, an error display is performed in step S15, and the processing is interrupted. However, if YES in step S14, the entry of the object management information 110 acquired in step S10 is added to object management information 110 of a binder 20 as the copy destination in step S16. In step S17, the file name of the copy source is acquired from the object management information, and the file is copied to the copy destination. In this manner, when the file as the content of the data 18 is copied in step S17, data copy processing is ended.

<Starting Application>

When a user operates an object indicated by an application 26 or data 18 managed by the desktop management system, the corresponding application is started. An application is started by passing an execution module name 62 of the application, a file name 112 and a format ID 51 of the data 18 to be successively processed, and a character string indicating a processing method in the processing list 65 to the application. When a desktop object G02 in the room window G01 (FIG. 3) is 2-clicked, the desktop window G14 is opened, as shown in FIG. 4, and application objects G15 representing already registered applications 26 are displayed. The open processing of the desktop 15 is achieved by acquiring application information 60, reading out an icon file, and displaying an icon on the window.

When data 18 is opened by an application, the entry of the opened data 18 is added to open object management information 140 in the room including the data 18. When the data 18 is closed by the application, the entry of the opened data 18 is deleted from the open object management information 140. The start processing of an application in the desktop management system will be described below with reference to the drawings in units of user's operations.

(1) Start by Open Operation of Application Object (A)

Figure 27:
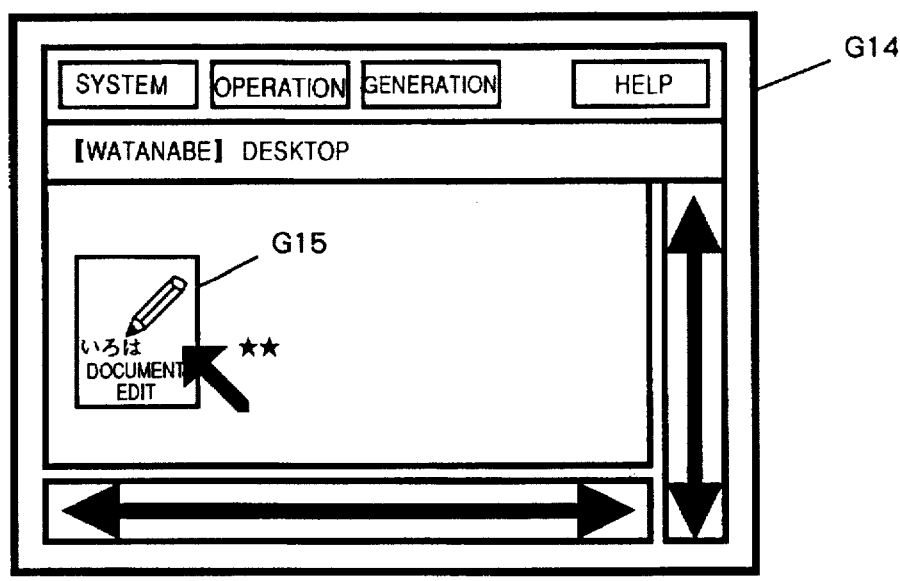
FIG. 27 is a view for explaining an application start operation.
Figure 28:
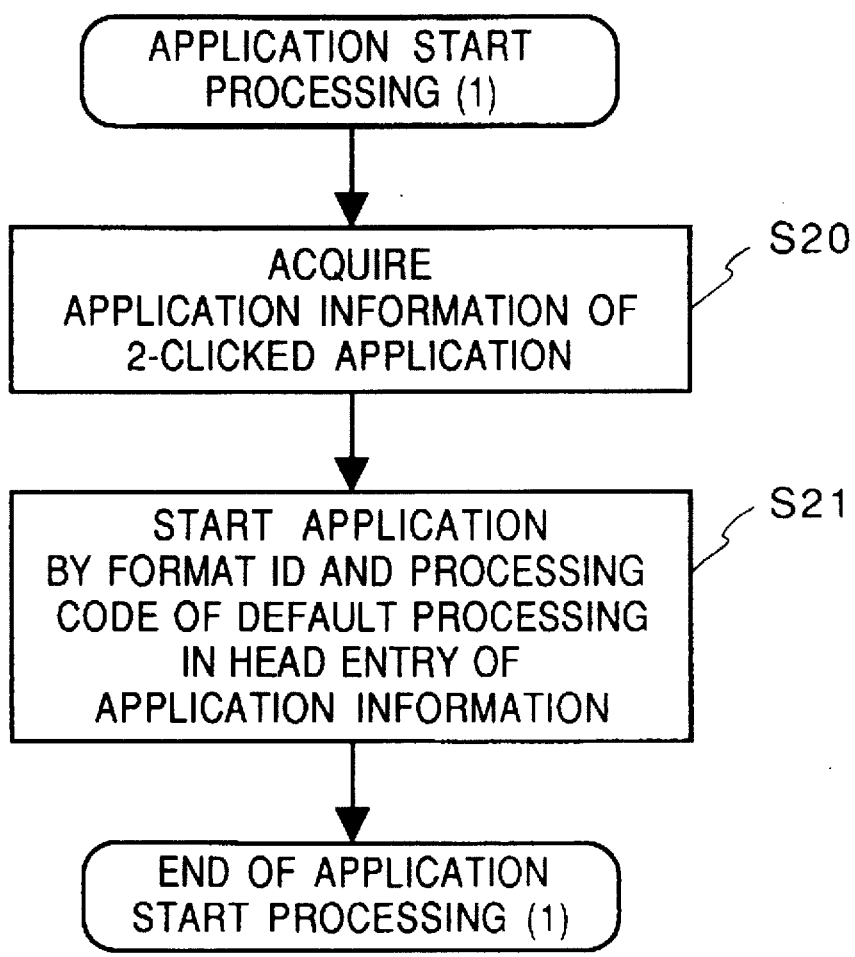
FIG. 28 is a flow chart showing an application start processing sequence.

In FIG. 27, the cursor G37 is moved to a position on an application object G15 in the desktop window G14, and the button of the mouse is 2-clicked. This operation will be described below with reference to the flow chart shown in FIG. 28. In step S20, application information 60 of an application 26 indicated by the 2-clicked application object is acquired. In step S21, a format ID 51 in the head entry of the application information 60 and a processing code of default processing 66 are passed to the application to start the application program.

(2) Start by Open Operation of Application Object (B)

Figure 29:
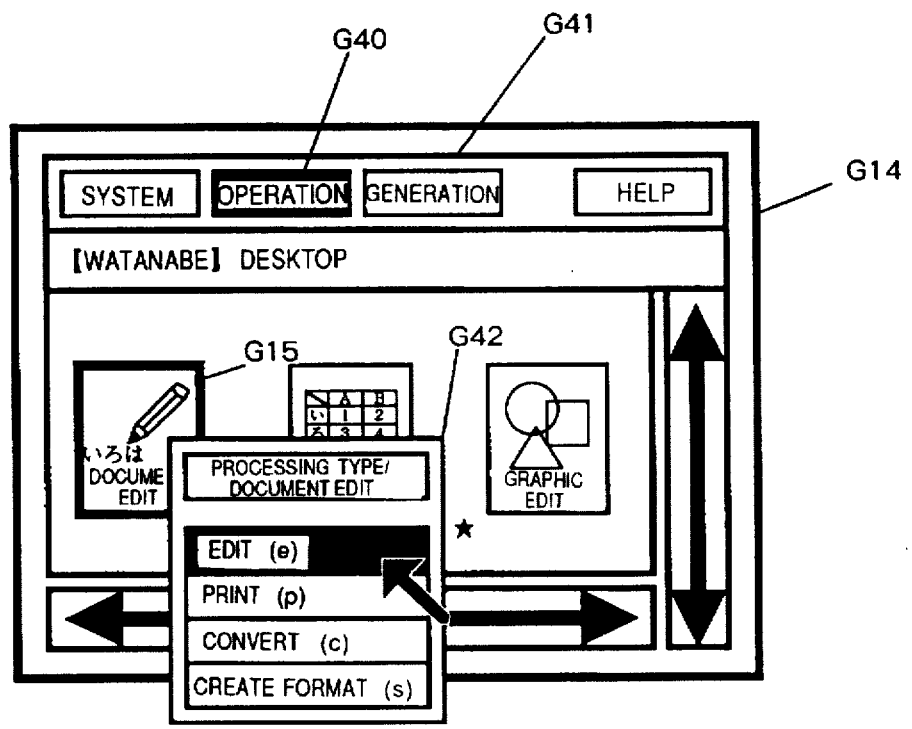
FIG. 29 is a view for explaining an application start operation.

When an "operation" button G40 in a menu list G41 in FIG. 29 is selected by 1-clicking the button of the mouse, the display state of the "operation" button G40 is reversed. In this state, when an application object G15 in the desktop window G14 is selected by 1-clicking the button of the mouse, the outer appearance of the application object G15 changes (e.g., the icon frame is displayed by bold lines) to clearly show that the application object G15 is selected, and at the same time, an "operation" menu G42 is displayed. Processing to be executed by an application 26 indicated by the selected application object G15 is selected from the displayed "operation" menu G42.

Figure 30:
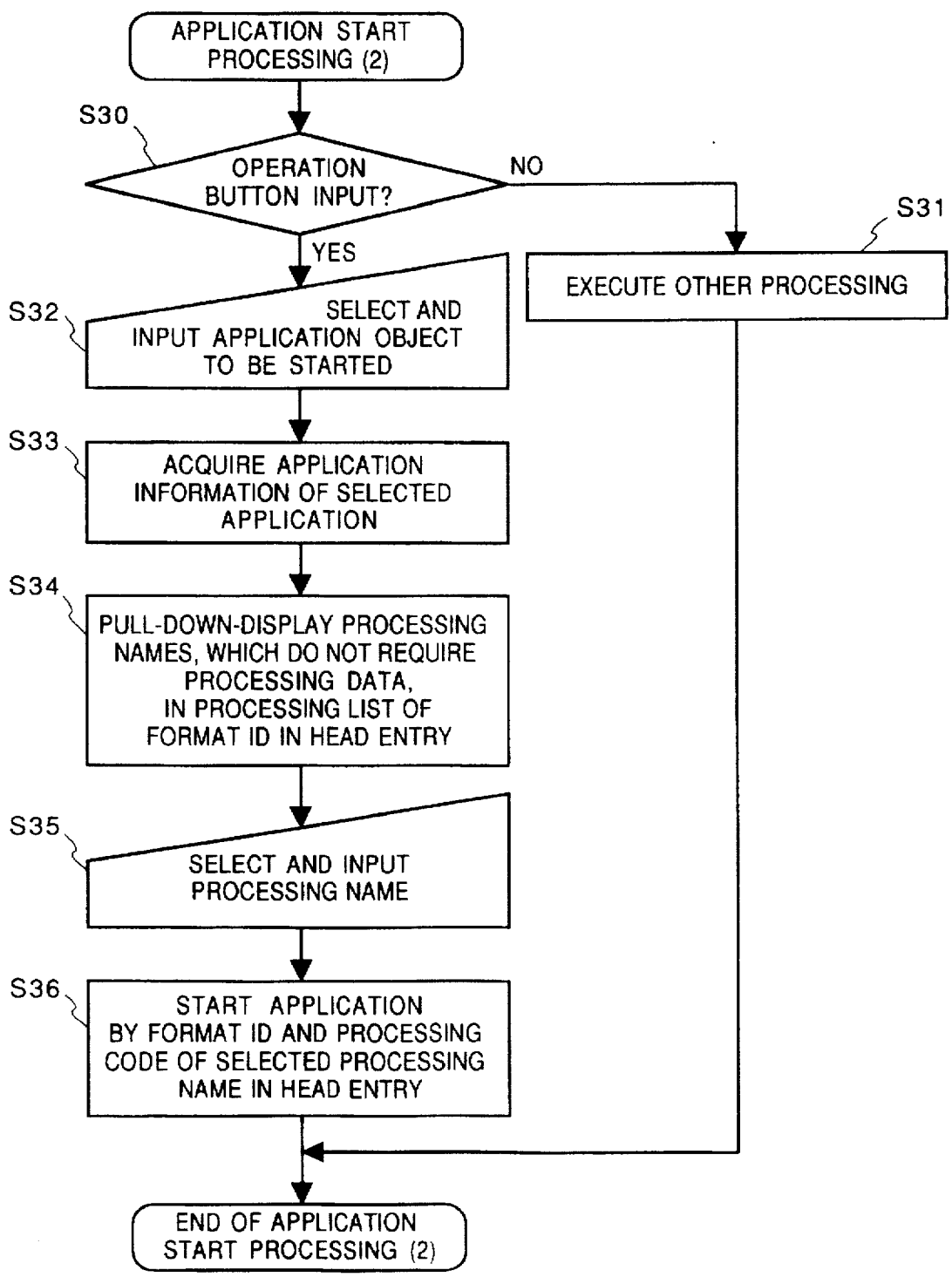
FIG. 30 is a flow chart showing an application start processing sequence.

The processing sequence in the above-mentioned open operation will be described below with reference to the flow chart shown in FIG. 30. If it is determined in step S30 that the "operation" button G40 is not selected, other processing is executed in step S31. However, if it is determined in step S30 that the "operation" button G40 is selected, the flow advances to step S32. After an application object G15 is selected in step S32, application information 60 of an application 26 selected in step S32 is acquired in step S33. In step S34, a format ID 51 in the head entry of the application information 60 acquired in step S33 is selected as a default. The processing names in the processing list 65 of the selected format ID 51 are displayed on the "operation" menu G42. At this time, a function such as a print function which requires already created data is not displayed on the "operation" menu G42. Functions to be displayed are determined by checking processing data necessity information 67. More specifically, in step S34, the processing names, which do not require processing data, in the processing list of the format ID in the head entry of the application information are pull-down-displayed. When one of the items of the "operation" menu G42 is selected in step S35, the flow advances to step S36, and an application program indicated by the application object G15 already selected in step S32 is started according to the format ID 51 already selected as the default, and a processing code corresponding to the selected item.

(3) Start by Drag/Drop Operation of Application Object

Figure 31:
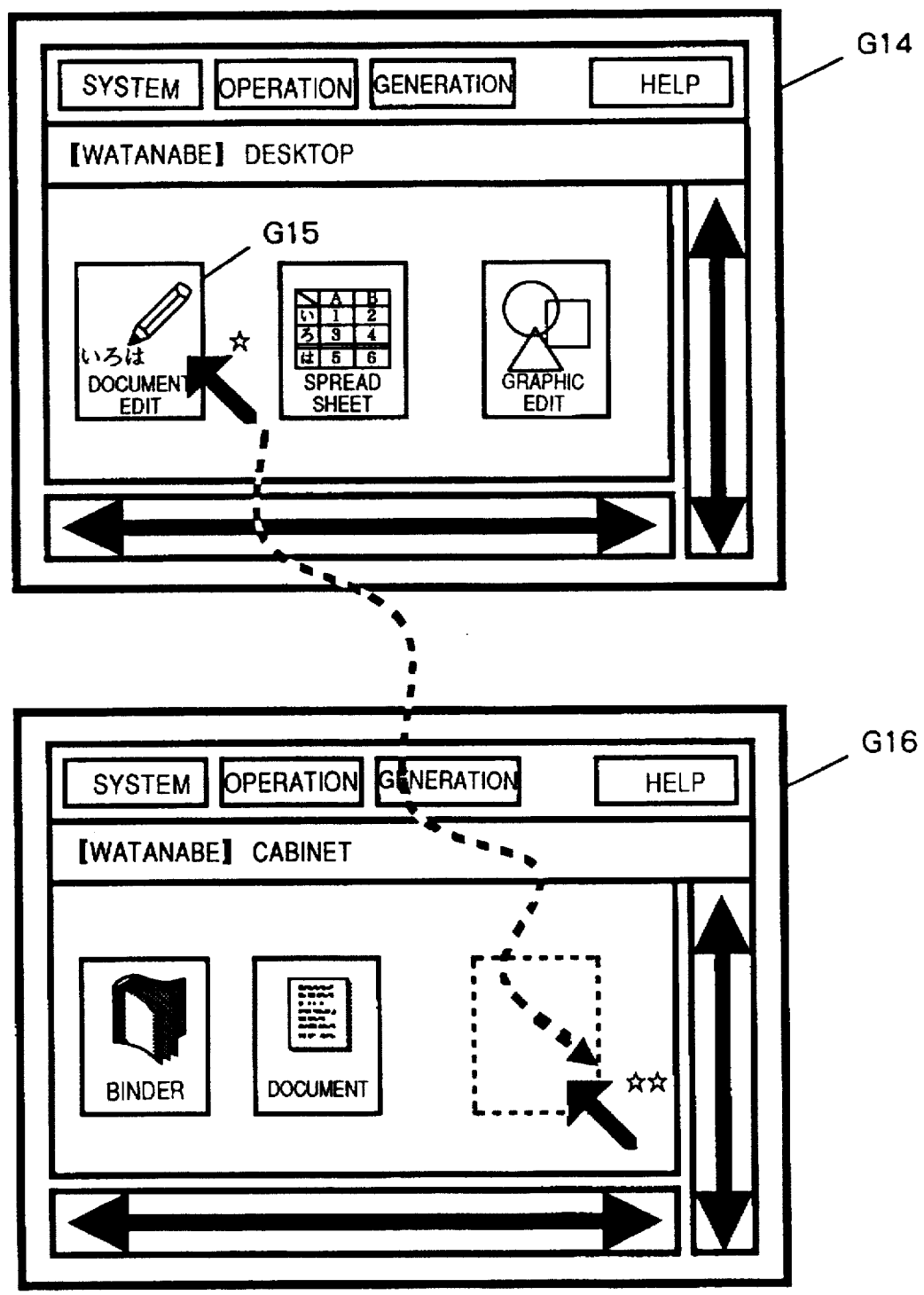
FIG. 31 is a view for explaining an application start operation by a drag/drop operation.

In FIG. 31, an application object G15 in the desktop window G14 is dragged and is dropped in the cabinet (binder) window G16 (G39). The processing sequence is the same as the open processing sequence (1) described above. More specifically, application information 60 of the application 26 indicated by the dragged/dropped application object G15 is acquired. An application program is started by passing a format ID 51 in the head entry of the application information 60 and a processing code in the processing list of the default processing 66 to the application.

(4) Start by Open Operation of Data Object

Figure 32:
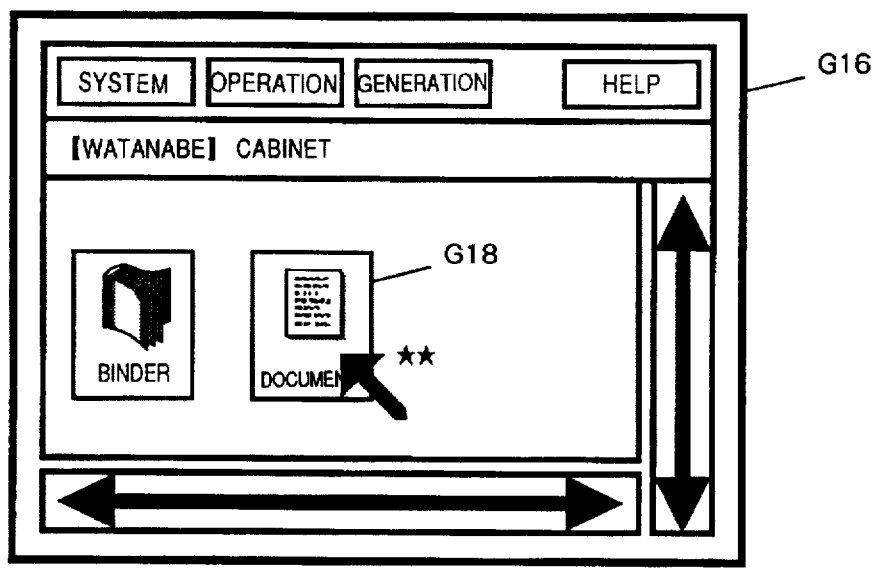
FIG. 32 is a view for explaining an application start operation by a data object open operation.
Figure 33:
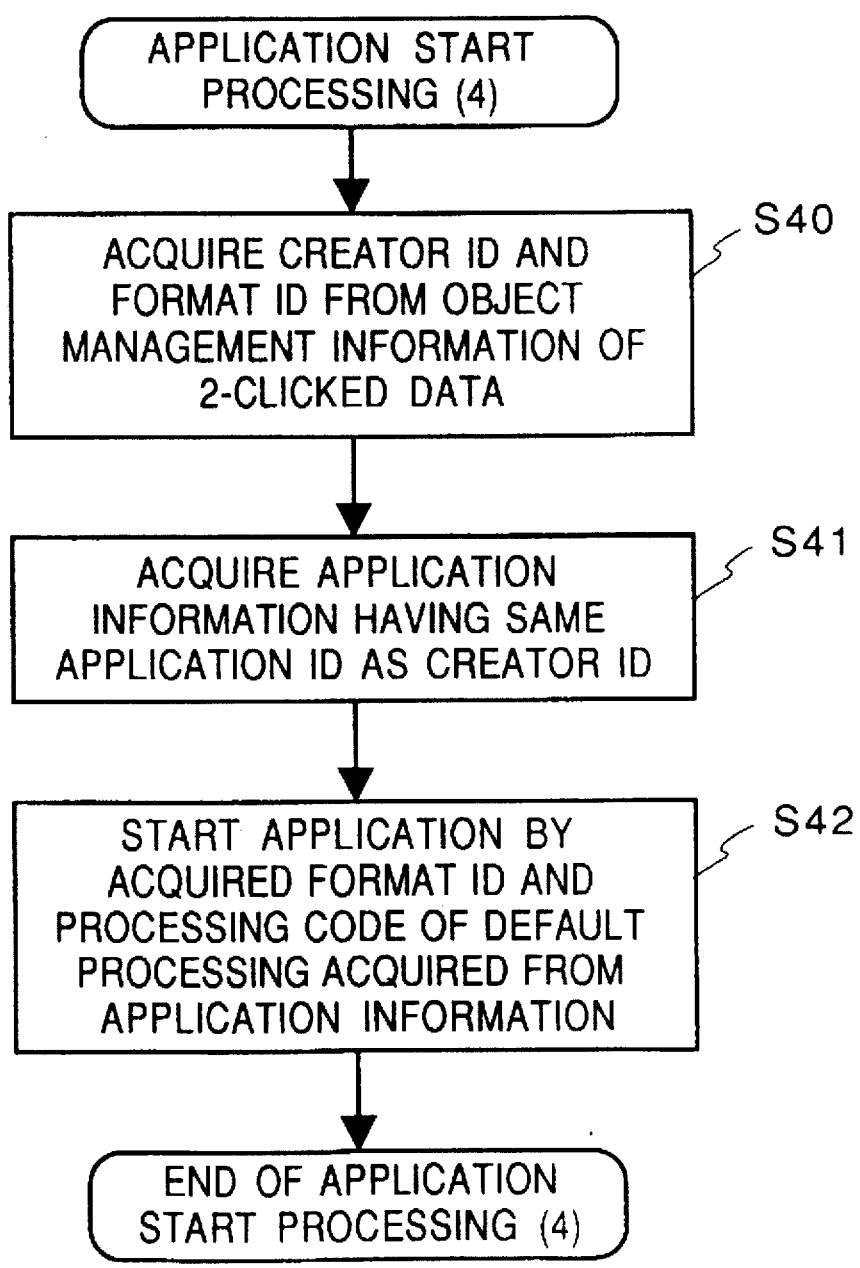
FIG. 33 is a flow chart showing an application start processing sequence by the data object open operation.

In FIG. 32, a data object G18 in the cabinet (binder) window G16 (G39) is 2-clicked to start an application. This sequence will be described below with reference to the flow chart shown in FIG. 33. In step S40, a creator ID 114 and its data format ID 51 are acquired from object management information 110 of data 18 indicated by the 2-clicked data object G18. In step S41, an entry of the application information 60 having the application ID 61, which coincides with the creator ID 114 acquired in step S40, is acquired. In step S42, a processing list in the application information 60 is specified by the format ID acquired in step S40 and the application information acquired in step S41. A processing code of the default processing 66, having the format ID 51, in the processing list is extracted. An application program is started according to the extracted processing code and the file name 112.

(5) Start by Open Operation of Data Object

Figure 34:
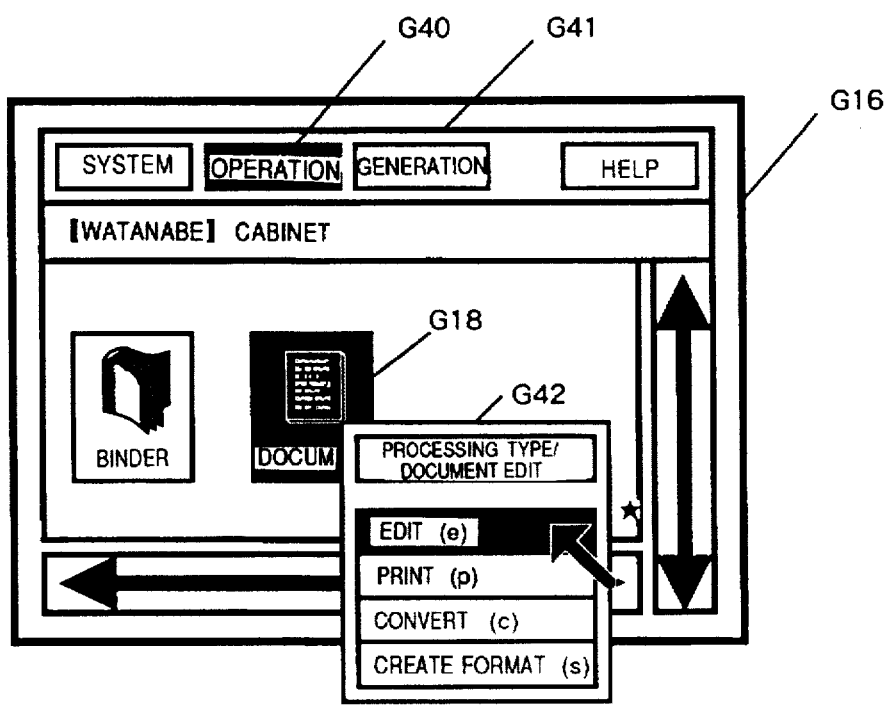
FIG. 34 is a view for explaining an application start operation by a data object open operation.

In FIG. 34, when the "operation" button G40 is selected from the menu list G41 by 1-clicking the button of the mouse, the display state of the "operation" button G40 is reversed. In this state, when a data object G18 in the cabinet (binder) window G16 (G39) is selected by 1-clicking the button of the mouse, the outer appearance of the selected data object 18 changes (e.g., reversal display of the icon) so as to clearly show that the data object G18 is selected, and at the same time, the "operation" menu G42 is displayed. Processing to be executed for data 18 indicated by the selected data object G18 is selected from the displayed "operation" menu G42.

Figure 35:
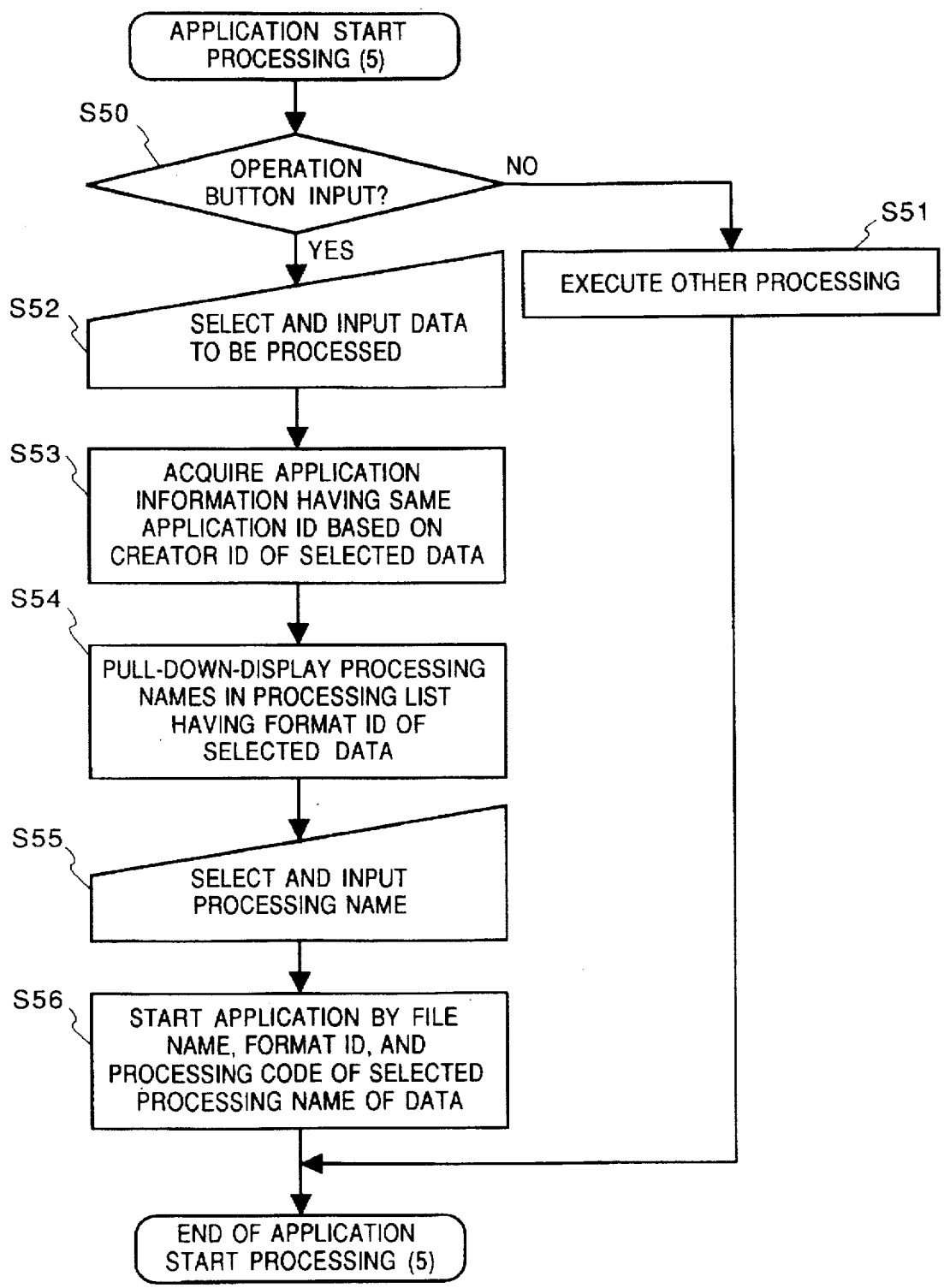
FIG. 35 is a flow chart showing an application start processing sequence by the data object open operation.

The application open processing with the above-mentioned operation will be described below with reference to the flow chart shown in FIG. 35. When the "operation" button G40 on the window is not selected, other processing is executed in step S51, and this processing is ended. When the "operation" button G40 is selected, the flow advances to step S52. When a data object G18 is selected in step S52, its display state is reversed. In step S53, a format ID 51 and a creator ID 114 of data 18 indicated by the selected data object G18 are acquired from object management information 110. An entry having the same application ID 61 as the creator ID 114 is acquired from application information 60. In step S54, the processing names of the processing list 65, corresponding to the format ID 51 acquired in step S53, are pull-down-displayed as the "operation" menu G42 on the basis of the entry of the application information 60 acquired in step S53.

When one of the items in the "operation" menu G42 is selected in step S55, the flow advances to step S56, and an application program is started on the basis of the file name 112 of the data 18, the already acquired format ID 51, a processing code corresponding to the item selected from the "operation" menu G42, and the execution module name 62 of the application information 60 acquired in step S53.

(6) Start by Dragging/dropping Data Object on Application Object

Figure 36:
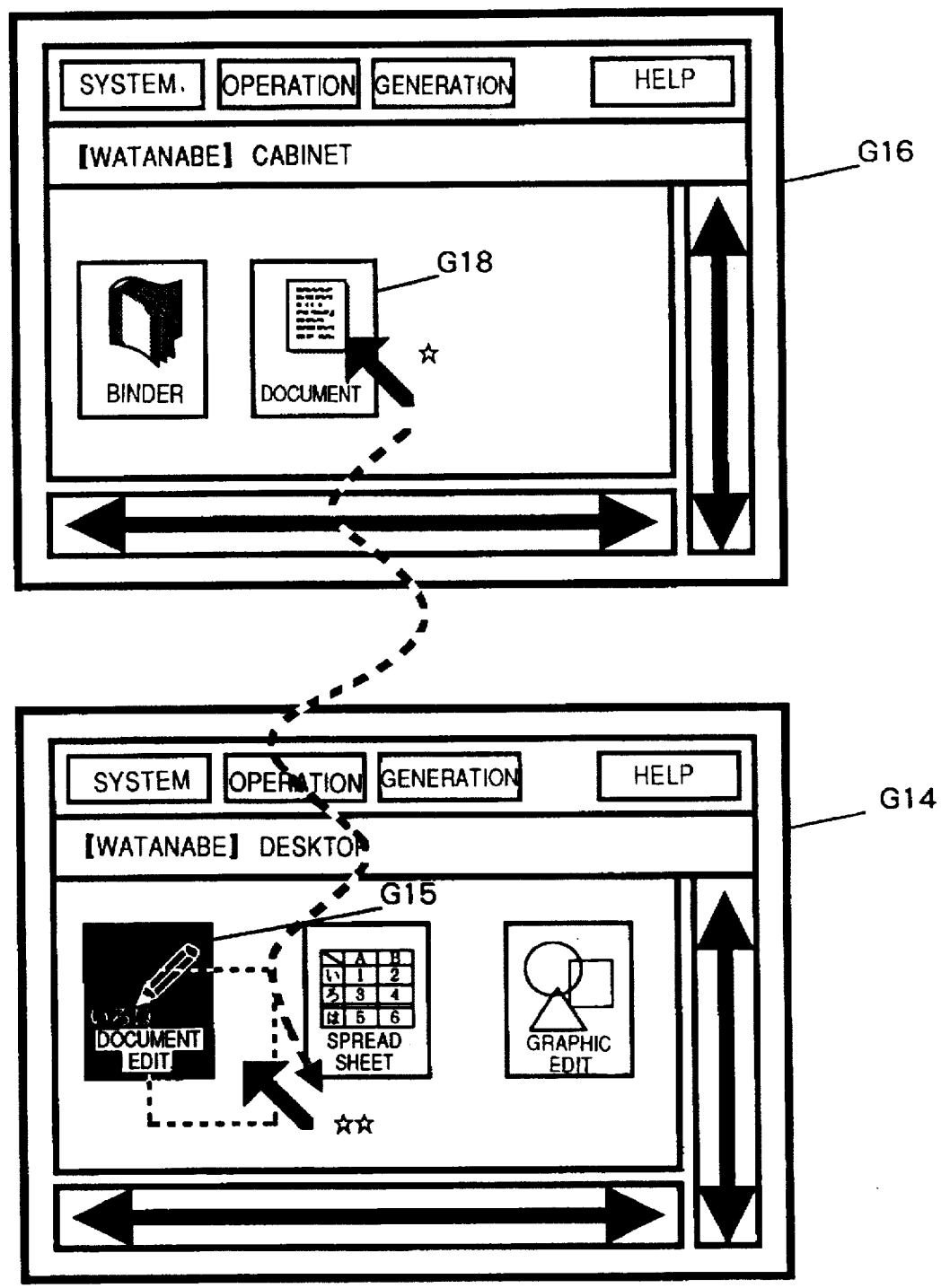
FIG. 36 is a view for explaining an operation for starting an application by dragging and dropping a data object onto an application object.

In FIG. 36, one data object G18 in the cabinet (binder) window G16 (G39) is dragged and is dropped on the application object G15 in the desktop window G14, thereby starting the dropped application program.

Figure 37:
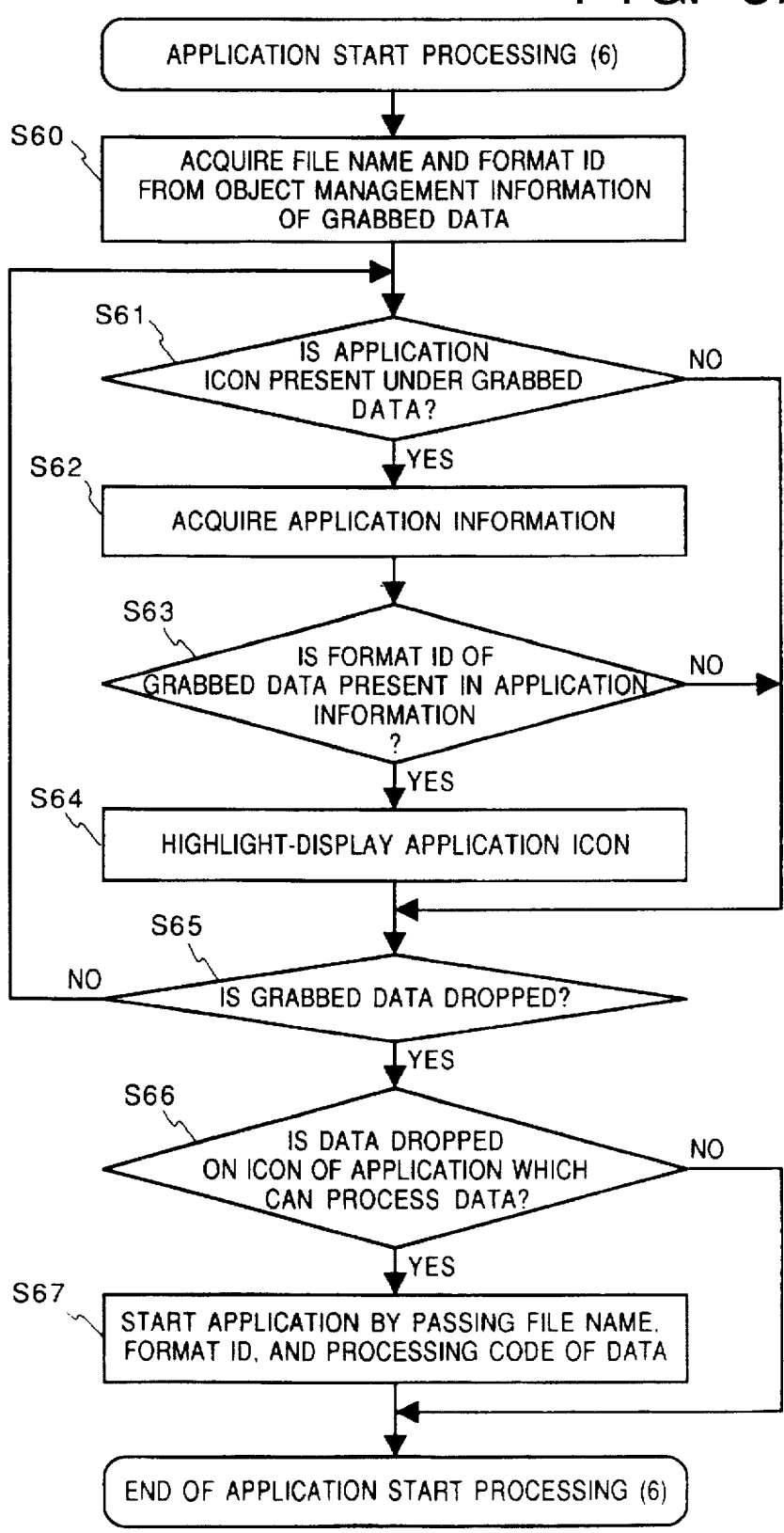
FIG. 37 is a flow chart showing a processing sequence executed when an application is started by dragging and dropping a data object onto an application object.

The processing sequence with the above-mentioned start operation will be described below with reference to the flow chart shown in FIG. 37. When a data object G18 is dragged, a file name 112 and a format ID 51 of data 18 indicated by the dragged data object G18 are acquired from object management information 110 in step S60. In step S61, it is checked if the dragged data object G18 is located on an application object G15 in the desktop window G14. If YES in step S61, the flow advances to step S62; otherwise, the flow jumps to step S65.

In step S62, application information 60 of the application 26 located under the grabbed data is acquired. In step S63, it is checked if the application 26 can process the format ID 51 of the data 18 indicated by the dragged data object G18. If YES in step S63, the flow advances to step S64; otherwise, the flow jumps to step S65. Whether or not the application can process the format ID is determined by checking if the format ID of the grabbed data is present in the application information. In step S64, by changing the display method of the application object. G15 (e.g., reversing the display state of the icon of the object G15), it is informed to a user that the application 26 can process the data 18 indicated by the dragged data object G18. It is checked in step S65 if the dragged data object G18 is dropped. If YES in step S65, the flow advances to step S66; otherwise, the flow returns to step S61 to repeat the above-mentioned processing.

It is checked in step S66 if the data object G18 is dropped on the application object G15 of the application 26, which can process the data 18. If YES in step S66, the flow advances to step S67. In step S67, a processing code of the default processing 66 in the processing list having the format ID 51 corresponding to the application ID 61 is acquired from the application information 60 acquired in step S62. An application program is started by passing the format ID 51, the processing code, and the file name 112 of the data 18 to the application 26 indicated by the execution module name 62 of the application information 60 to the application.

As has been described above with reference to FIG. 15, when data 18 of a certain data format can be processed by a plurality of applications 26 or when a certain application 26 can process a plurality of data 18 of different data formats, this desktop management system manages the relationship between the data 18 and the applications which can process the data 18. For this reason, it is effective to inform, to an operating user, an application object G15 on which the selected or dragged data object G18 can be dropped, i.e., an application 26 which can process the corresponding data 18. As a means for realizing this information, the following guidance functions are provided.

(6.1) Connection Guidance Using Lines

Figure 39:
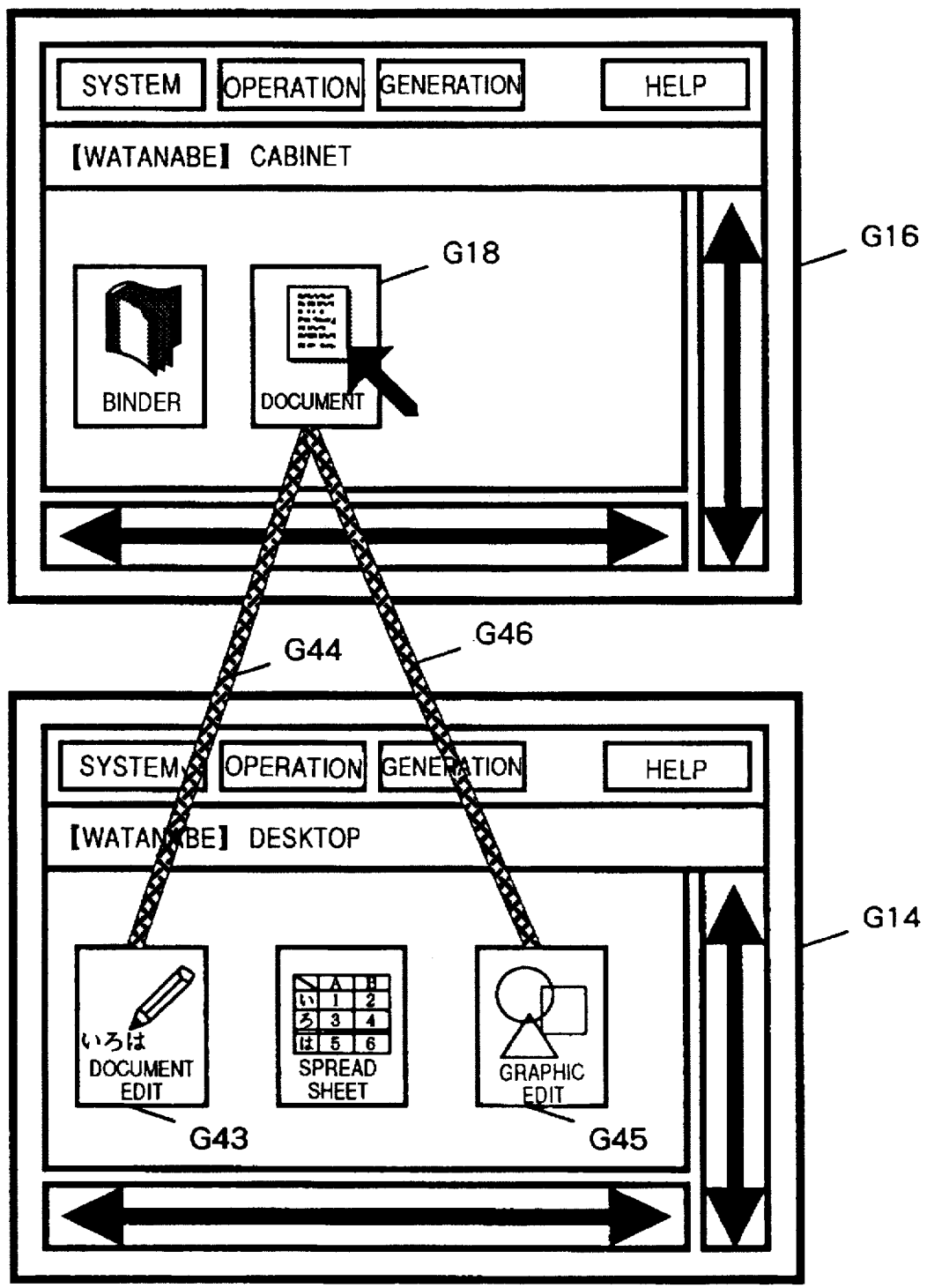
FIG. 39 is a view showing a display example for clearly expressing a data object and an application which can process the data object by connecting them by a line.

As shown in FIG. 39, when one data object G18 in the cabinet window G16 (or the binder window G39) is grabbed, the grabbed data object G18 and application objects G15, which can process the grabbed data object G18, are presented by connecting them by lines.

Figure 40:
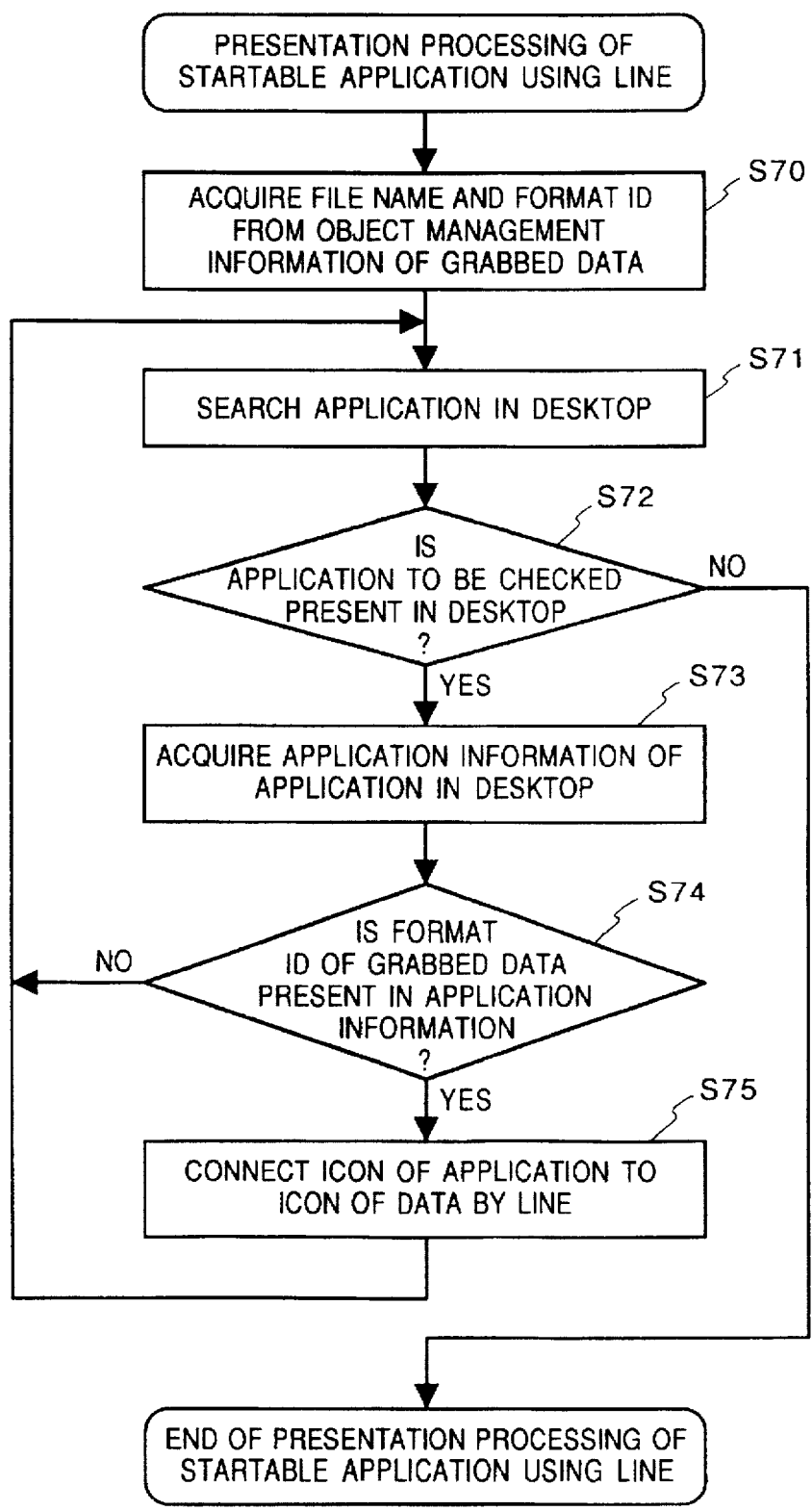
FIG. 40 is a flow chart showing a processing sequence for clearly expressing a data object and an application which can process the data object by connecting them by a line.

The processing for realizing the connection guidance function using lines will be described below with reference to the flow chart shown in FIG. 40. When a data object G18 is grabbed, a file name 112 and a format ID 51 of data 18 corresponding to the grabbed data object G18 are acquired from data management information 110 in step S70. In step S71, an application 26 in the desktop 15 is searched. If it is determined in step S72 that no application 26 to be checked remains, this processing is ended; otherwise, the flow advances to step S73.

In step S73, application information 60 of the searched application 26 is acquired. In step S74, it is checked if the application 26 can process the format ID 51 of the data 18 indicated by the grabbed data object G18. More specifically, it is checked if an application object G43 in the desktop window G14 can process the grabbed data object G18. If NO in step S74, the flow returns to step S71; otherwise, the data object G18 is connected to the application object G43 by a line G44 (see FIG. 39) in step S75. In this manner, by displaying the line, it is informed to a user that the application 26 indicated by the application object G43 can process the data 18 indicated by the grabbed data object G18.

In this manner, upon completion of the presentation processing in step S75 for the single application 26 searched in step S71, the control returns to step S71. If it is determined in step S72 that applications 26 to be checked still remain, the processing in steps S73 to S75 is repeated for the remaining applications 26 in the desktop 15. As described above, when the processing is ended based on the determination result in step S72, as shown in, e.g., FIG. 39, the data object G18 grabbed in the cabinet window G16 is connected to the application objects G43 and G45 of the applications 26, which can process the corresponding data, by the lines G44 and G46.

(6.2) Connection Guidance Using Highlight Display

Figure 41:
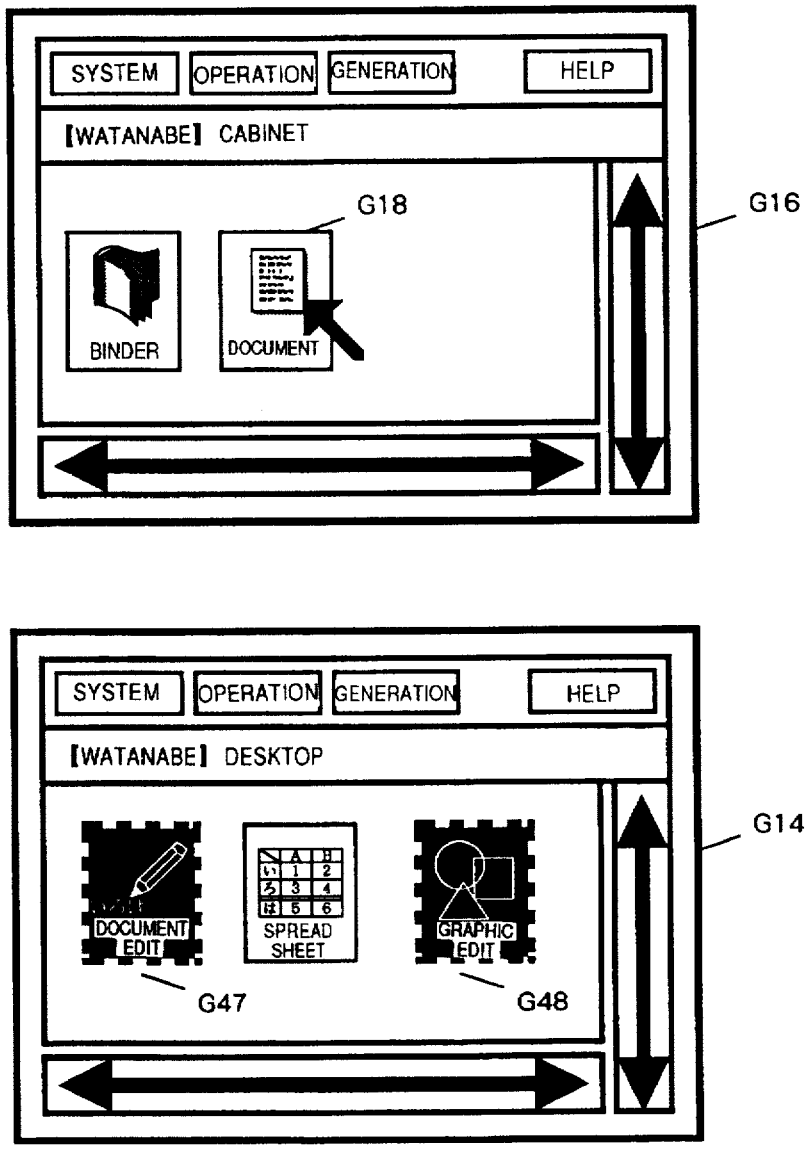
FIG. 41 is a view showing a display example for clearly expressing a data object and an application which can process the data object by a highlight display.

As shown in FIG. 41, when one data object G18 in the cabinet window G16 or the binder window G39 is grabbed, application objects G15, which can process the grabbed data object G18, in the desktop window G14 are presented by changing their display states, e.g., by highlight-displaying the corresponding application objects.

Figure 42:
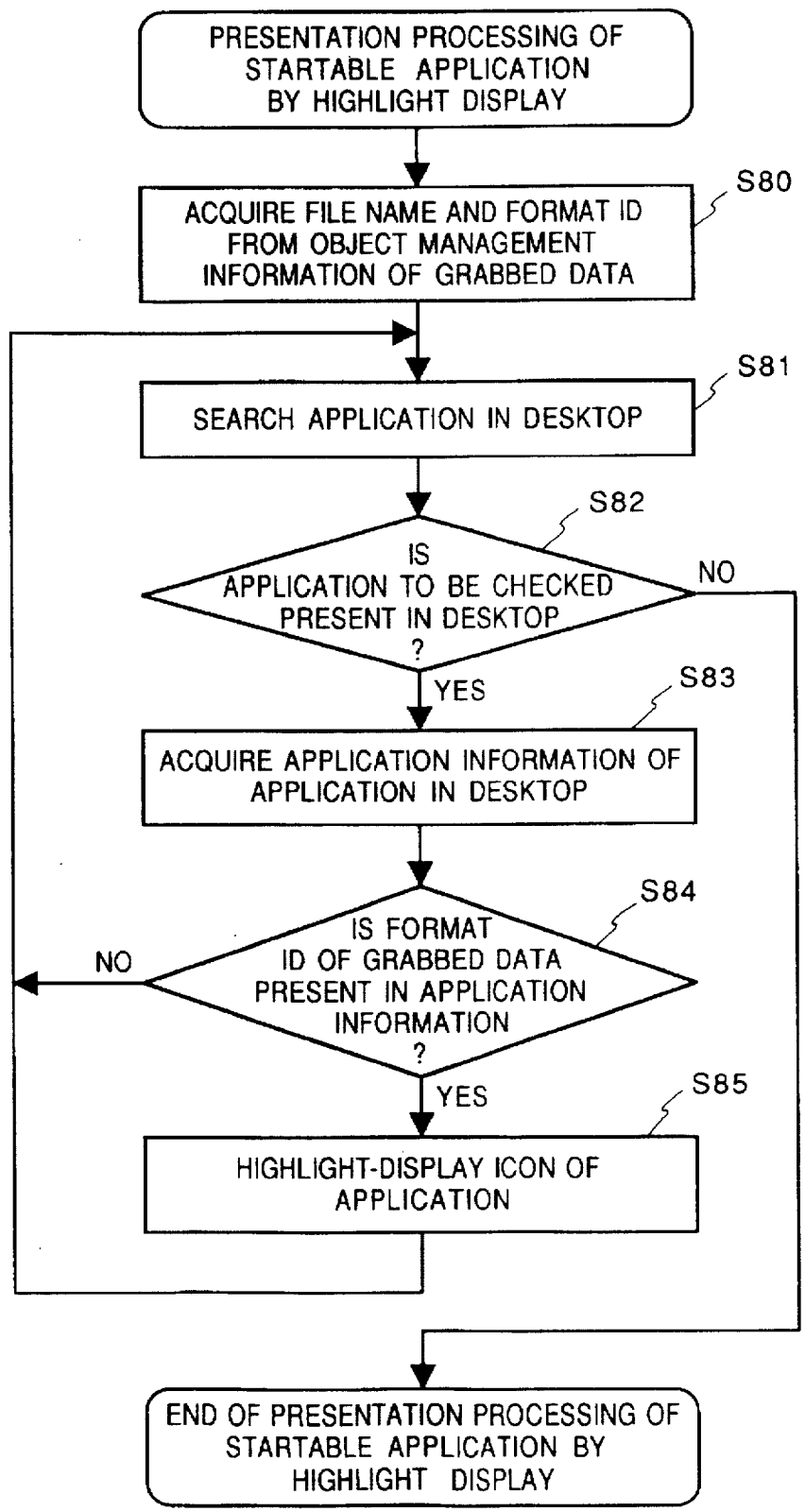
FIG. 42 is a flow chart showing a processing sequence for clearly expressing a data object and an application which can process the data object by a highlight display.

The processing sequence of the connection guidance function using a highlight display will be described below with reference to the flow chart shown in FIG. 42. When a data object G18 is grabbed, a file name 112 and a format ID 51 are acquired from object management information 110 corresponding to data 18 indicated by the grabbed data object G18 in step S80. In step S81, an application 26 in the desktop 15 is searched. It is checked in step S82 if an application 26 to be checked remains. If NO in step S82, the presentation processing of an application which can process the grabbed data is ended. However, if YES in step S82, the flow advances to step S83.

In step S83, application information 60 of the searched application 26 is acquired. In step S84, it is checked if the application 26 can process the format ID 51 of the data 18 indicated by the grabbed data object G18. More specifically, whether or not an application object G47 in the desktop window G14 can process the data object G18 is determined by checking if the format ID of the grabbed data is present in the application information. If NO in step S84, the flow returns to step S81. However, if YES in step S84, the flow advances to step S85, and the application object G47 is highlight-displayed, as shown in FIG. 41. In this manner, it is informed to a user that the application 26 indicated by the application object G47 can process the data 18 indicated by the dragged data object G18.

Upon completion of the presentation processing in step S85 for the single application 26 searched in step S81, the control returns to step S81. If it is determined in step S82 that applications 26 to be checked still remain, the processing in steps S83 to S85 is repeated for the remaining applications 26 in the desktop 15. When all the applications are checked, and the processing is ended based on the determination result in step S82, the application objects G47 and G48 representing the applications 26, which can process the data object G18 grabbed in the cabinet window G16, are highlight-displayed, as shown in, e.g., FIG. 41.

(6.3) Guidance by Attraction

Figure 43:
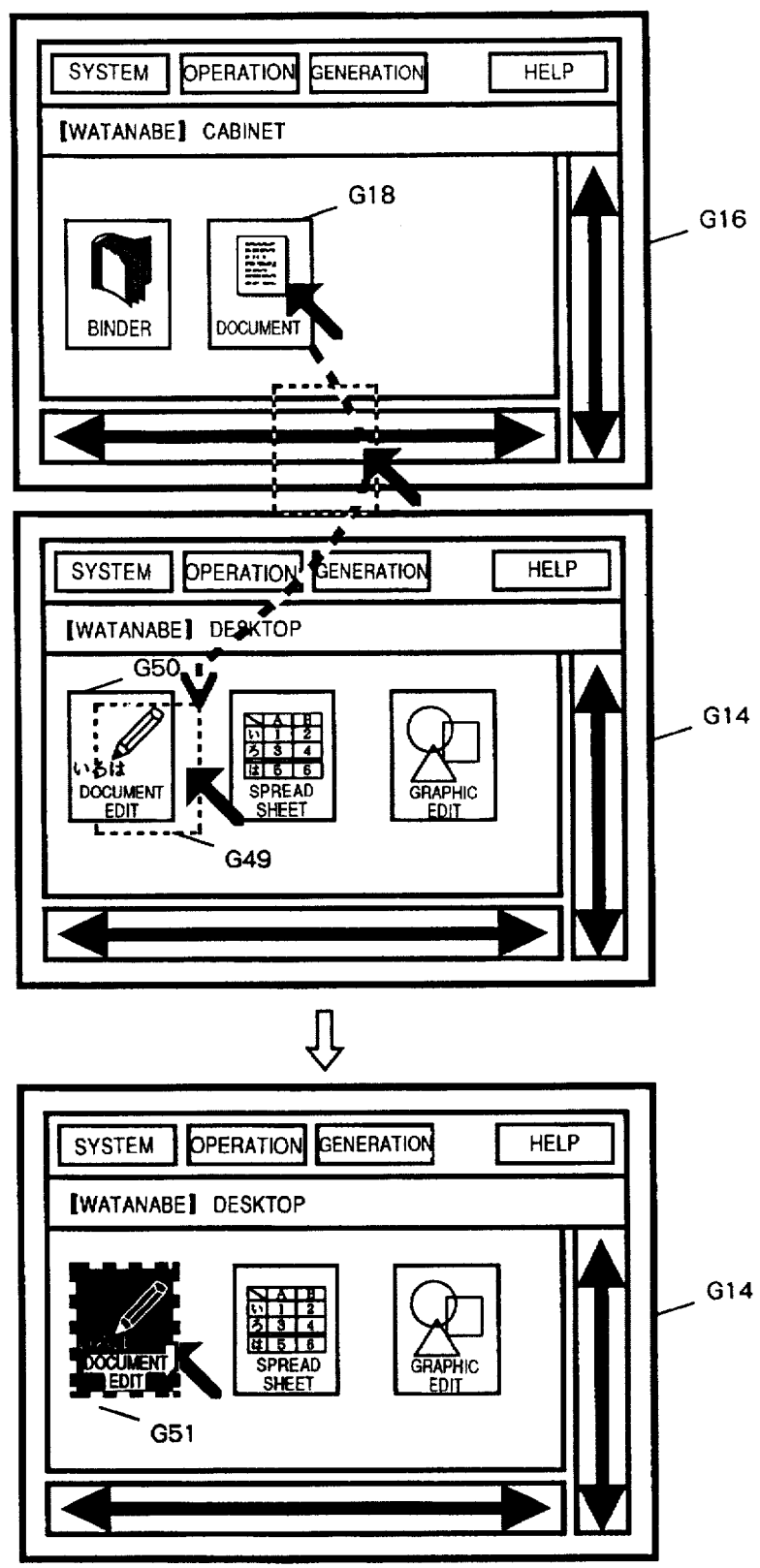
FIG. 43 is a view showing an example for giving guidance about a data object and an application which can process the data object by means of an attraction.

In FIG. 43, One data object G18 in the cabinet window G16 or the binder window G39 is dragged and moved. When the dragged data object G18 reaches a position separated by a predetermined distance from an application object G15, which can process the dragged data object, in the desktop window G14, the desktop management system automatically corrects the display position of the dragged data object G18 to a position on the application object G15, and displays the dragged data object at the corrected position.

Figure 44:
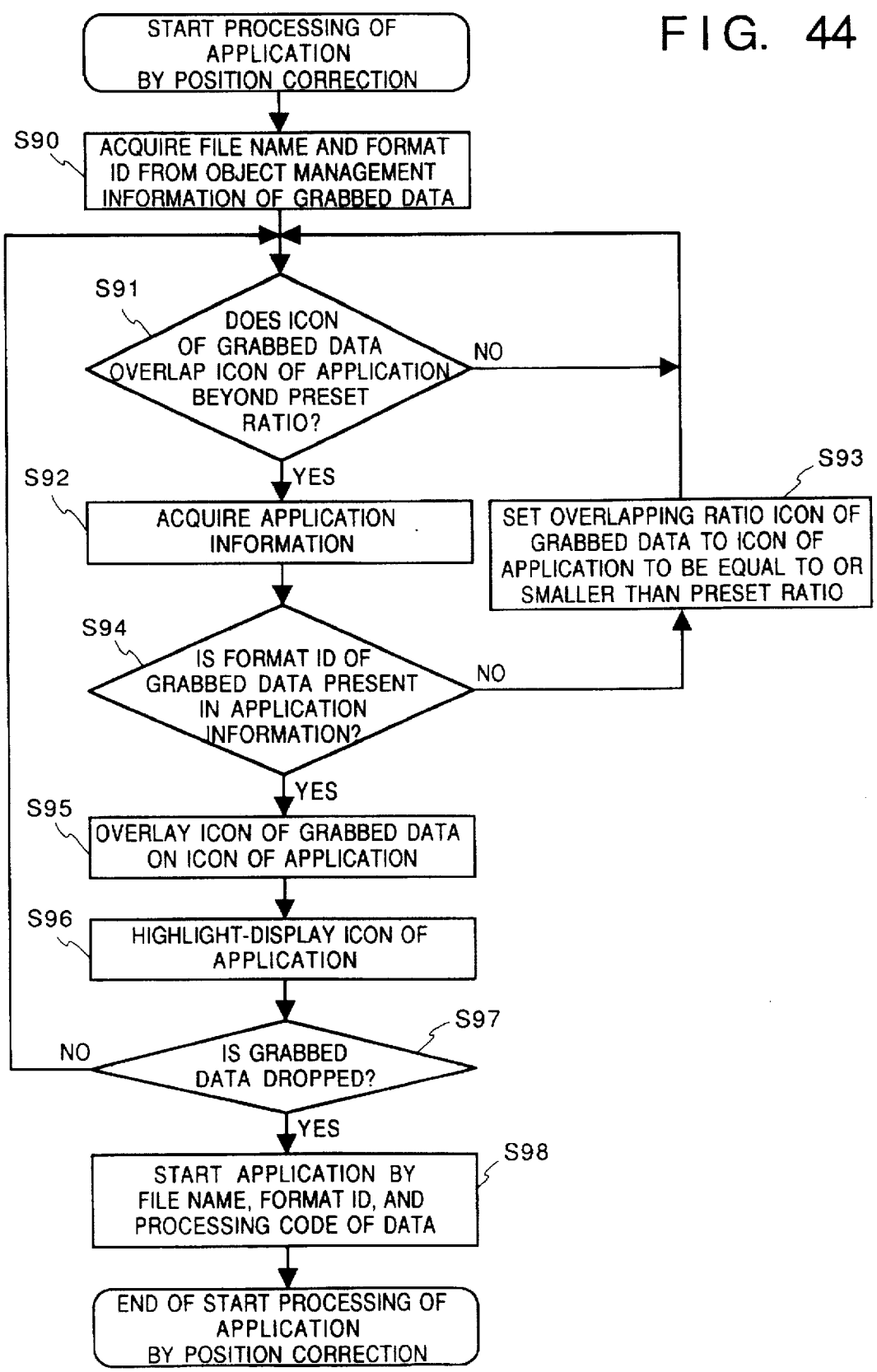
FIG. 44 is a flow chart showing a processing sequence for giving guidance about a data object and an application which can process the data object by means of an attraction.

This processing will be described below with reference to the flow chart shown in FIG. 44. When a data object G18 is grabbed, a file name 112 and a format ID 51 are acquired from object management information 110 of data 18 indicated by the data object G18 in step S90. In step S91, it is checked if an overlapping area between an icon G49 of the dragged data object G18 and an application object G50 reaches a predetermined ratio of a display area of the icon G49. More specifically, it is checked in step S91 if the overlapping area of the icon G49 of the dragged data object G18 and an icon of the application object G50 reaches the predetermined area of the display area of the icon G49 of the dragged data object G18. If NO in step S91, the control returns to step S91. However, if YES in step S91, the flow advances to step S92.

In step S92, application information 60 of an application 26 indicated by the application object G50 is acquired. In step S94, whether or not the application 26 indicated by the application object G50 can process the format ID 51 of the data 18 indicated by the dragged data object G49 is determined by checking if the format ID of the grabbed data is present in the application information. If YES in step S94, the flow advances to step S95. In step S95, the display position of the grabbed data object G49 is corrected, so that the data object G49 and the application object G50 completely overlap each other, as indicated by G51 in FIG. 43. At the same time, the application object G50 is highlight-displayed. With this processing, since a user feels as if the dragged data object G49 were attracted to the application object G50 by an attraction, he or she can determine that the application 26 indicated by the application object G50 can process the data 18 indicated by the dragged data object G49.

After step S96, it is checked in step S97 if the dragged data object G49 is dropped on the application object G50. If NO in step S97, the control returns to step S91. However, if YES in step S97, the flow advances to step S98 to acquire a processing code of the default processing of the format ID 51 corresponding to the application ID 61 from the application information 60 acquired in step S92. Then, the application 26 is started by passing the format ID 51, the processing code, and the file name 112 of the data 18 indicated by the data object G18 to the application 26 indicated by the application object to the application.

(6.4) Guidance by Counterattraction

Figure 45:
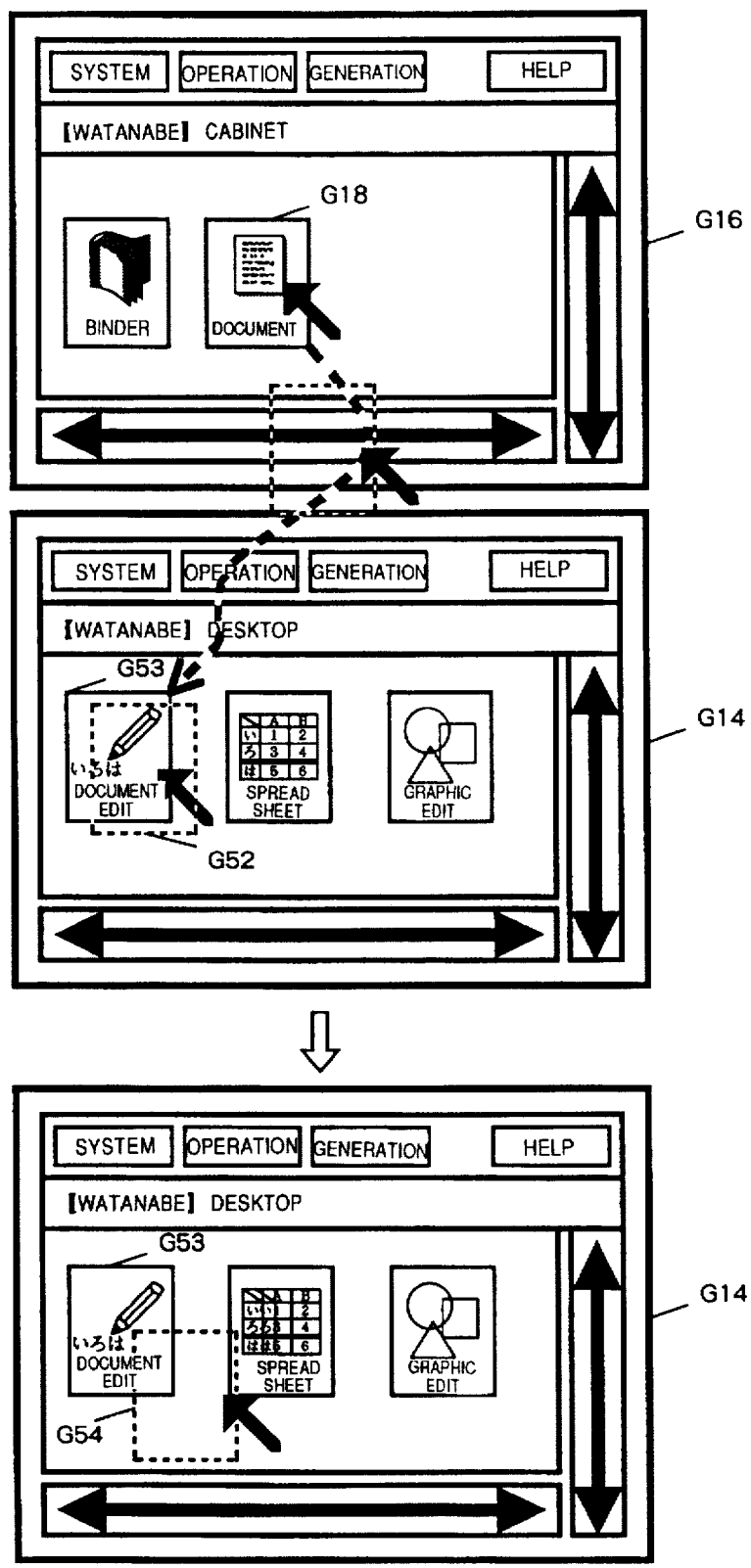
FIG. 45 is a view showing an example for giving guidance about a data object and an application which can process the data object by means of a counterattraction.

In FIG. 45, one data object G18 in the cabinet window G16 or the binder window G39 is dragged and moved. When the dragged data object G18 reaches a position separated by a predetermined distance from an application object G15, which cannot process the dragged data object, in the desktop window G14, the desktop management system automatically corrects the display position of the dragged data object G18, and displays the dragged data object at the corrected display position.

The above-mentioned processing will be described below with reference to the flow chart shown in FIG. 44. When a data object G18 is grabbed, a file name 112 and a format ID 51 are acquired from data management information 110 of data 18 indicated by the grabbed data object G18 in step S90. In step S91, it is checked if an overlapping area between an icon G53 of the dragged data object G18 and an icon of an application object G52 reaches a predetermined ratio of the display area of the icon G53. If NO in step S91, the control returns to step S91. However, if YES in step S91, the flow advances to step S92.

In step S92, application information 60 of an application 26 indicated by the application object G52 is acquired. It is then checked in step S94 if the application 26 indicated by the application object G52 can process the format ID 51 of the data 18 indicated by the dragged data object G53. If YES in step S94, the start processing of the application 26 is executed in the same processing sequence as in the above-mentioned function (6.3). On the other hand, if NO in step S94, the flow advances to step S93. In step S93, the display position of the dragged data object G53 is corrected to decrease or eliminate the overlapping area between the data object G53 and the application object G52, as indicated by G54 in FIG. 45. With this processing, a user feels as if the dragged data object G53 were separated from the application object G52 by a counterattraction, and can determine that the application 26 indicated by the application object G52 cannot process the data 18 indicated by the dragged data object G53.

Figure 38:
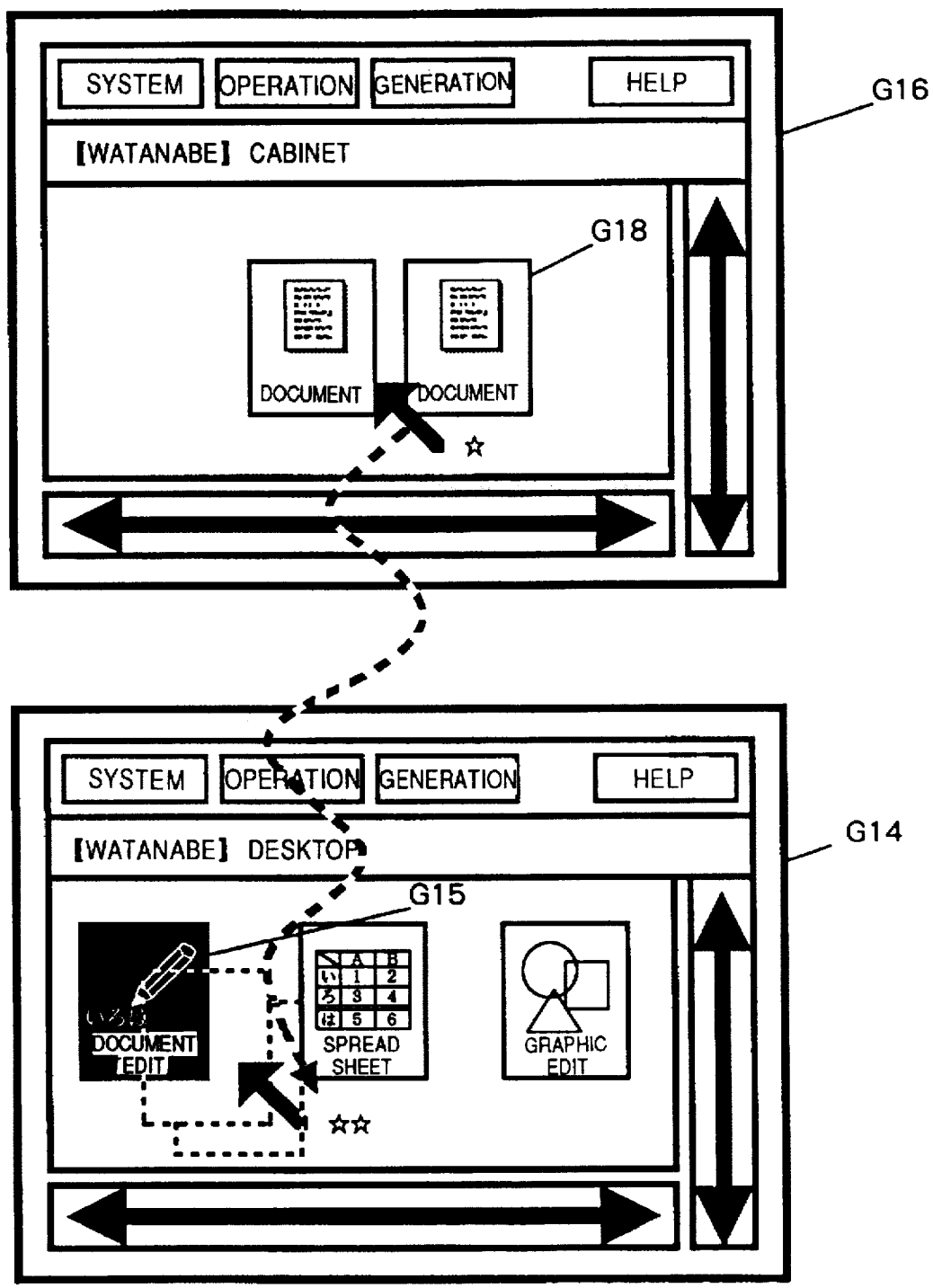
FIG. 38 is a view showing an operation for starting an application by dragging and dropping a plurality of data objects onto an application object.

(7) Start by Dragging/dropping a Plurality of Data Objects on Application Object In FIG. 38, a plurality of data objects G18 in the cabinet (binder) window G16 (G39) are dragged, and are dropped on an application object G15 in the desktop window G14.

In the processing sequence in this case, format IDs 51 of the dragged data objects G18 are acquired. When the dragged data objects G18 are located on an application object G15 in the desktop window G14, application information 60 is searched to check if an application 26 indicated by the application object G15 can process the format IDs 51 of all the dragged data objects G18. If the application can process these format IDs, a message indicating this is informed to a user by changing a display method of the icon of the application object G15 (e.g., highlight-displaying the icon).

When the plurality of dragged data objects G18 are dropped on the highlight-displayed application object G15, the application information 60 is searched based on the application ID 61 of the application 26 indicated by the application object G15 and the format IDs 51 of the data 18 indicated by the data objects. With this search operation, the execution module name 62 corresponding to the application ID 61, and a processing code of the default processing 66 of each format ID 51 are acquired. The application 26 is started by passing the format IDs 51, the processing codes, and the file names 112 of the plurality of data 18 to the application.

<Disclosure Operation>

Normally, a user is not permitted to refer to or update a cabinet 16, a binder 20, and data 18 in a room 13 of another user. An operation with which a user permits another user to refer to or update his or her own cabinet 16, binder 20, and data 18 is called a "disclosure operation". A cabinet 16, binder 20, and data 18 to which the "disclosure operation" is to be performed or has already been performed are called disclosure objects 30.

Figure 46:
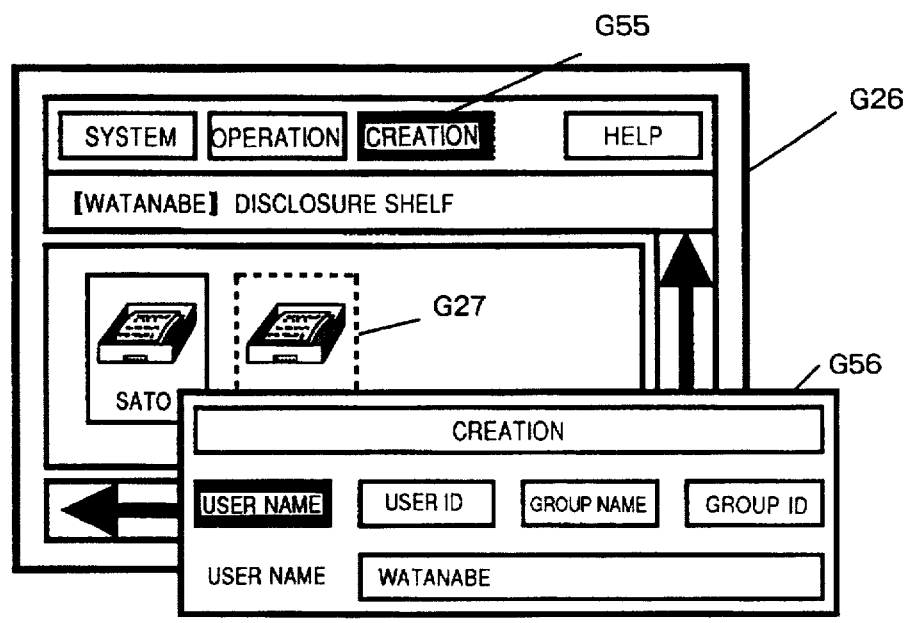
FIG. 46 is a view for explaining a method of creating a new disclosure tray object.

Operations and processing for executing the "disclosure operation" will be described below. With disclosure tray creation processing, a disclosure tray 29 is created on a disclosure shelf 22 in units of users or groups as disclosure targets. The method of creating a disclosure tray will be described below. In FIG. 46, when a creation button G55 on the disclosure shelf window G26 is selected, the display state of the creation button G55 is reversed, and a window (inquiry/input window G56) for inquiring and inputting a disclosure target is displayed. When a name or user ID 81 of a user as a disclosure target or a name or group ID 101 of a group is input to the inquiry/input window G56, a disclosure tray object G27 indicating a new disclosure tray 29 is created and displayed in the disclosure shelf window G26.

An operation for setting the data 18 or the binder 20 as a disclosure object (disclosure operation processing) will be described below. When a disclosure tray object G27 of a user or group is opened, the disclosure tray window G28 is displayed. In this state, a data object G18 or binder object G17 to be disclosed is dragged and dropped on the disclosure tray window G28 in the same manner as the copy operation of data 18 between binders 20. With this operation, the dropped disclosure object G29 is displayed on the disclosure tray window G28, thus showing that the disclosure operation is performed.

Figure 47:
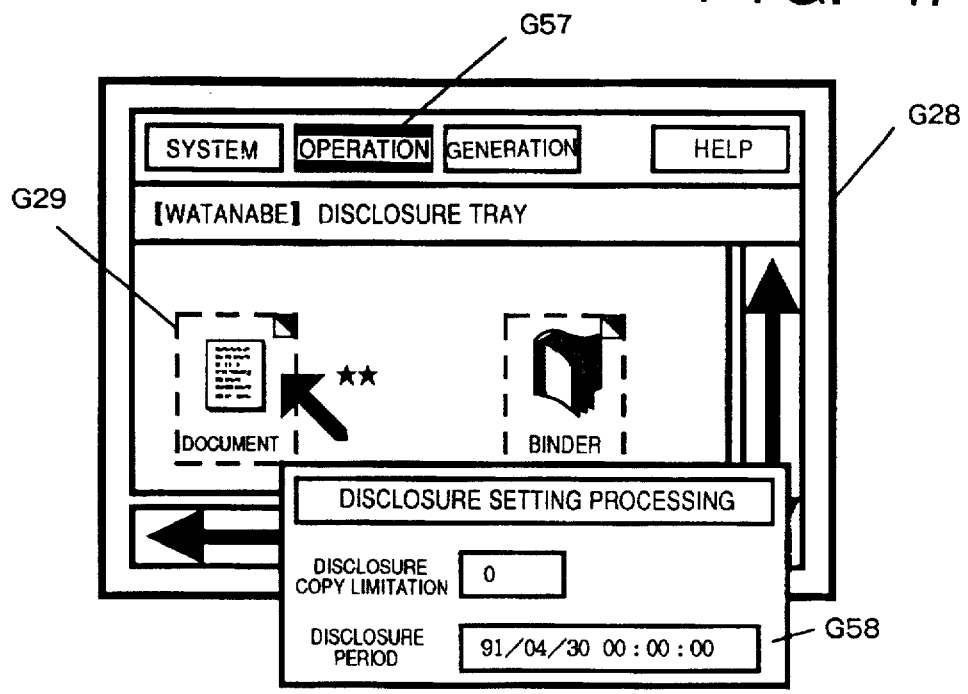
FIG. 47 is a view for explaining a disclosure setting operation on a disclosure tray window.

With a disclosure setting operation, limitation on a copy operation of the disclosed object by another user and a disclosure period of the disclosed object can be set. The setting operation will be described below with reference to FIG. 47. In FIG. 47, an operation button G57 of the disclosure tray window G28 is depressed, and thereafter, a disclosure object G29 to be subjected to the setting operation is 1-clicked. With this operation, a window (inquiry/input window G58) for inquiring and inputting data associated with the disclosure setting operation is displayed. When setting items displayed on the inquiry/input window G58 are input, the setting operation is completed. When the setting operation has already been made, the preset contents are displayed in the columns of the setting items of displayed inquiry/input window G58.

Figure 48:
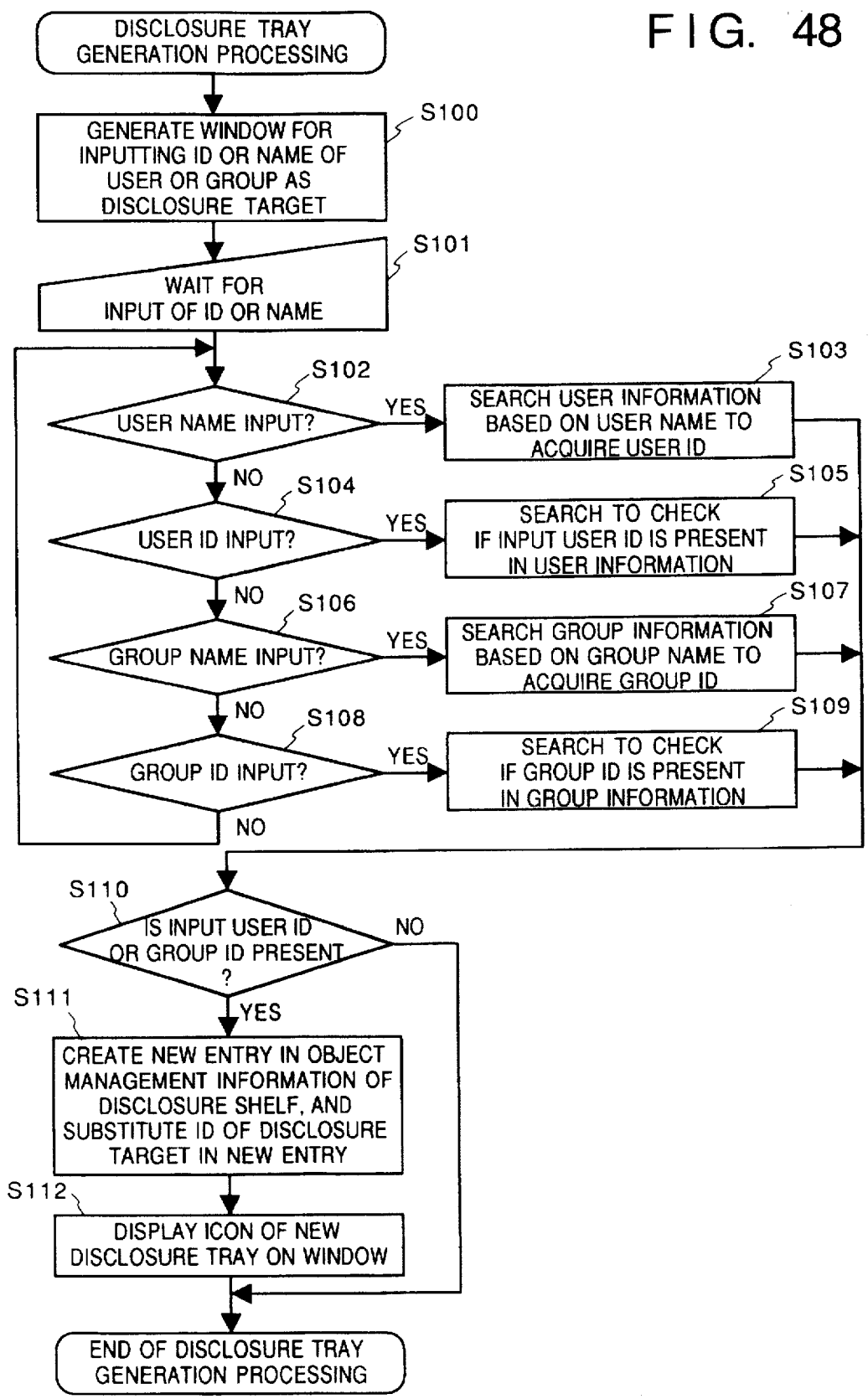
FIG. 48 is a flow chart showing a disclosure tray creation processing sequence.
Figure 49:
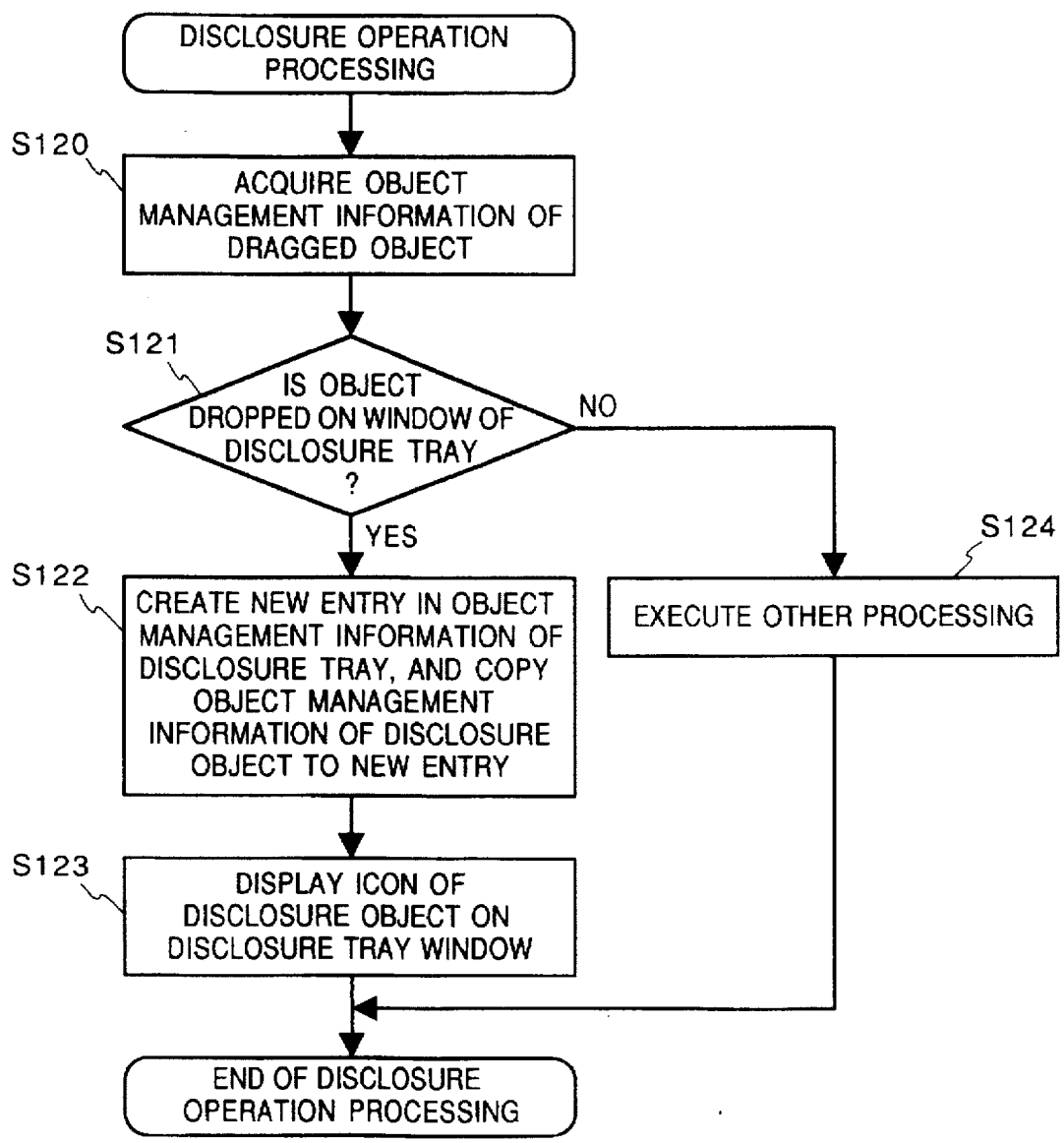
FIG. 49 is a flow chart showing a disclosure operation processing sequence.
Figure 50:
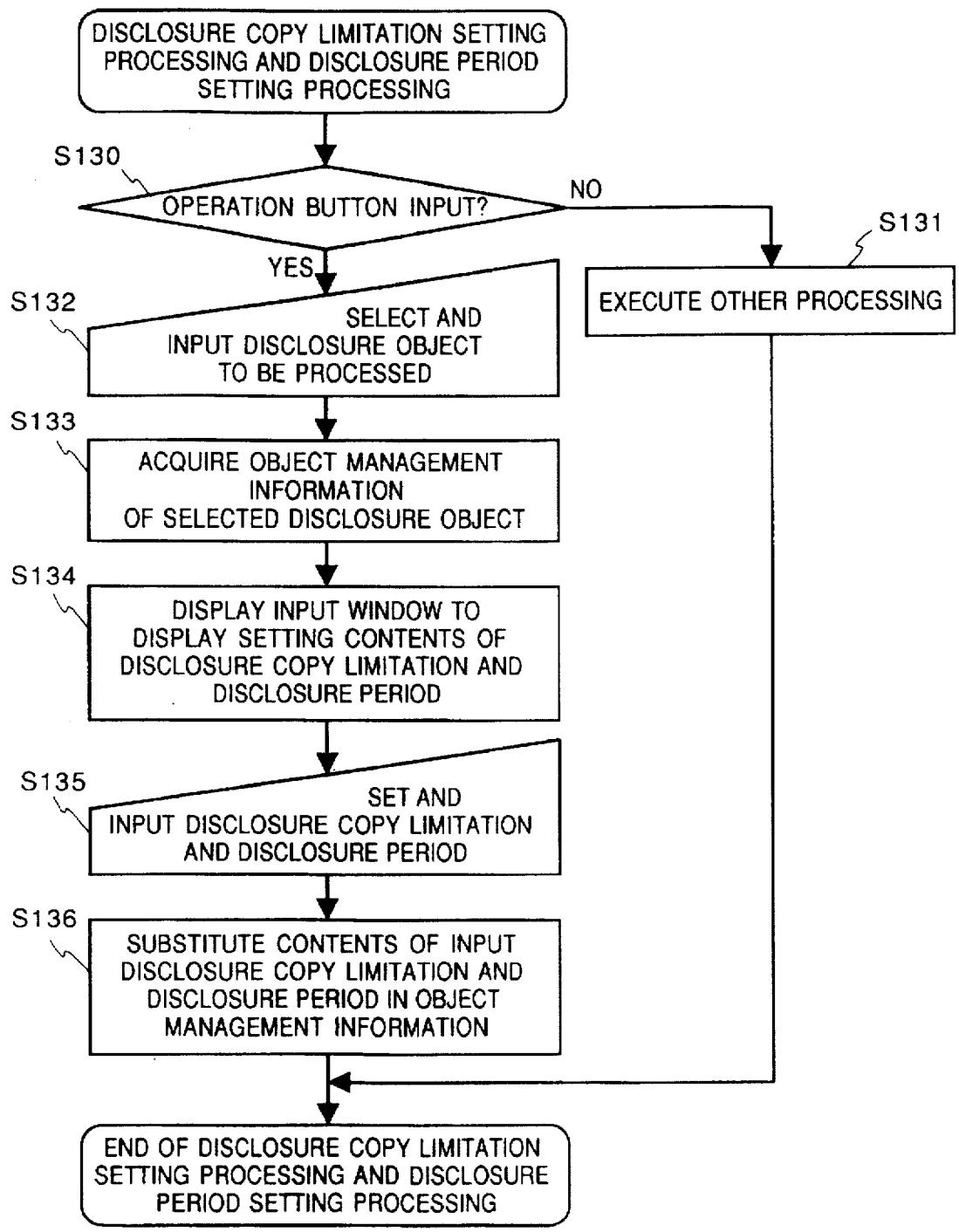
FIG. 50 is a flow chart showing a disclosure setting processing sequence.

The above-mentioned processing operations (disclosure tray creation processing, disclosure operation processing, and disclosure setting processing) will be described in more detail below with reference to the flow charts shown in FIGS. 48 to 50.

The creation processing of a disclosure tray 29 in the desktop management system will be described below with reference to FIG. 46 and the flow chart of FIG. 48. When the creation button G55 on the disclosure shelf window G26 is selected, the inquiry/input window G56 for inputting a disclosure target is generated in step S100. In step S101, the control waits for input of a name or ID by a user. If it is determined in step S102 that a user name is input, user information 80 is searched in step S103 to acquire the corresponding user ID 81. If it is determined in step S104 that a user ID 81 is input, user information 80 is searched in step S105 to check if the input user ID 81 is present. If it is determined in step S106 that a group name is input, group information 100 is searched in step S107 to acquire the corresponding group ID 101. If it is determined in step S108 that a group ID 101 is input, group information 101 is searched in step S109 to check if the input group ID 101 is present.

If it is determined in step S110 that the input user ID 81 or group ID 101 is present, the flow advances to step S111. In step S111, an entry of a new disclosure tray 29 is generated in object management information 110 in the disclosure shelf 22. The user ID 81 or group ID 101 acquired in the above-mentioned processing is substituted in a disclosure target user ID 126 or disclosure target group ID 127. Subsequently, in step S112, a disclosure tray object G27 indicating the generated disclosure tray 29 is displayed on the disclosure shelf window G26, and the processing is ended. If it is determined in step S110 that the input user ID 81 or group ID 101 is not present, this processing is interrupted.

The "disclosure operation" processing in the desktop management system will be described below with reference to FIG. 47 and the flow chart shown in FIG. 49. When an object to be disclosed is dragged, the object management information 110 of the dragged object is acquired in step S120. In step S121, it is checked if the dragged object is dropped on the disclosure tray window G28. If YES in step S121, the flow advances to step S122. In step S122, an entry of a new disclosure object 30 is generated in the object management information 110 of the disclosure tray 29 represented by the disclosure tray window G28, and the object management information 110 already acquired in step S120 is substituted in the generated entry. In step S123, an icon of the dragged/dropped object is displayed as the disclosure object G29 on the disclosure tray window G28, thus ending this processing.

The disclosure copy limitation setting processing and the disclosure period setting processing for the disclosure object 30 in the desktop management system will be described below with reference to FIG. 47 and the flow chart of FIG. 50. In step S130, it is checked if the operation button G57 on the disclosure tray window G28 is selected. If NO in step S130, the flow advances to step S131 to execute other processing. However, if YES in step S130, the flow advances to step S132. If it is determined in step S132 that an input for selecting the disclosure object G29 is detected, the object management information 110 of the disclosure object G29 selected in step S132 is acquired in step S133. In step S134, the inquiry/input window G58 is generated and displayed. At this time, the contents of the disclosure copy limitation 128 and the disclosure period 129 already registered in the object management information 110 acquired in step S133 are displayed in the input columns of the inquiry/input window G58. In step S135, the control waits for input of the disclosure copy limitation and the disclosure period. If these data are input, the input contents of the disclosure copy limitation 128 and the disclosure period 129 are registered in the object management information 110, acquired in step S133, in step S136. The object management information 110 for which the setting operation has been completed is substituted in object management information 110 in the disclosure tray 29, thus ending the processing.

<Accessing Data of Another User>

An operation and processing executed when a user accesses data of another user will be described below. When a user opens the exit 25 in his or her own room 13, doors 31 representing rooms 13 of other users in his or her office 14, another office 14, and the library 17 managed by his or her office 14 are displayed. When the user opens the other office 14, doors 31 of users and the library 17 in the opened office 14 are displayed again. When the user opens the door 31 of a desired user, disclosure objects 30, which are disclosed to him or her by the User of the opened room 13, are displayed. The operation for the displayed disclosure objects 30 is the same as that for operation objects in his or her own room. However, when a disclosure copy limitation is set for the disclosure object 30, the content of the disclosure object 30 is prohibited from being copied. When a disclosure period is set for the disclosure object 30, the disclosure object 30, the disclosure period of which has expired, is not displayed on the window.

Figure 51:
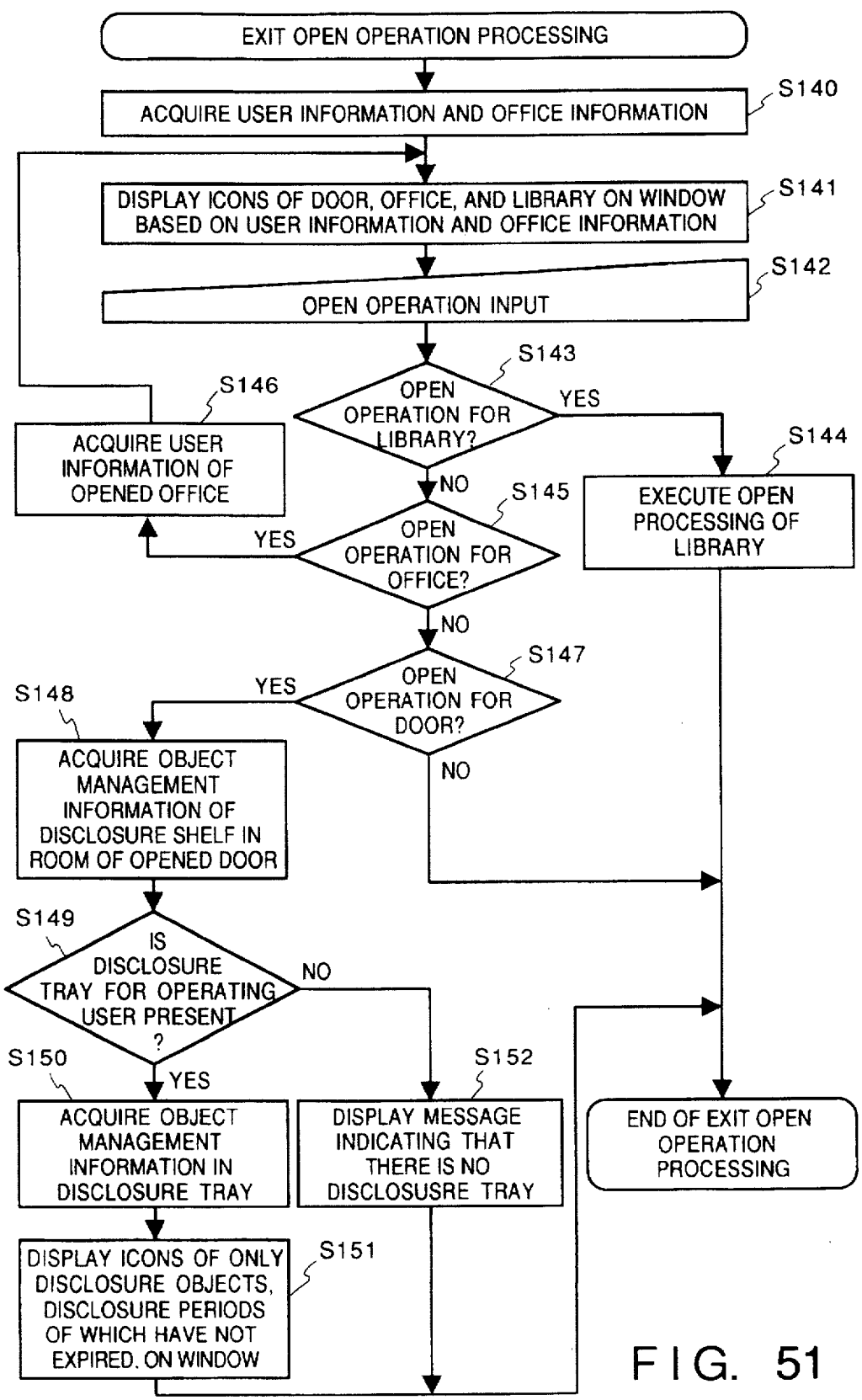
FIG. 51 is a flow chart showing an exit open operation processing sequence.

The open processing of the exit 25 in the desktop management system will be described below with reference to FIGS. 3, 11, 12, and 13, and the flow chart of FIG. 51. When the exit object G09 is opened, the exit window G30 is displayed. In step S140, the names of another user and another office 14 are acquired from the user information 80 and the office information 90. In step S141, the door object G31 representing the door 31, the office object G32 representing the office 14, and the library object G33 representing the library 17 are displayed. In step S142, the control waits for the input of the open operation.

If it is determined in step S143 that the open operation is performed for the library object G33, open processing of the library 17 (to be described later) is performed in step S144, and the processing is ended.

Figure 12:
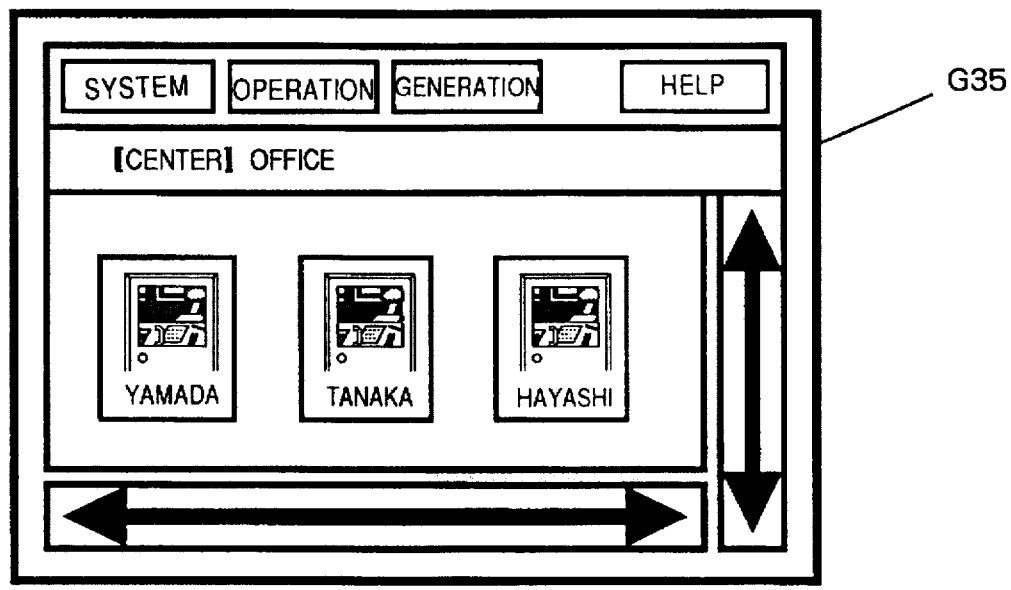
FIG. 12 is a view showing a display state of an office window.

If it is determined in step S145 that the open operation is performed for the office object G32, the flow advances to step S146. In step S146, the host name 92 is acquired from the office information 90, and user information 80 is requested to the opened host. After the user information 80 is acquired, the flow returns to step S141. As shown in FIG. 12, door objects G31 of doors 31 representing entries to the rooms of the users included in the corresponding office are displayed on an office window G35, and the control waits for the input of the open operation in step S142.

If it is determined in step S147 that the open operation is performed for the door object G31, the flow advances to step S148. In step S148, the object management information 110 of the disclosure shelf 22 of a user corresponding to the opened door 31 is acquired. In step S149, a disclosure tray 29 for the operating user is searched. If a disclosure tray 29 for the operating user is present, the flow advances to step S150. In step S150, the object management information 110 of the corresponding disclosure tray 29 is acquired. In step S151, only disclosure objects 30, the disclosure periods of which have not expired, are displayed on a room window G36 shown in FIG. 13. If it is determined in step S149 that no disclosure tray 29 is found, a message indicating this is displayed in step S152, and the processing is ended.

<Tag>

The tag 21 is an object which allows to operate a target binder 20 or data 18 in a central hierarchical level without executing open operations of binders 20 in intermediate hierarchical levels. Methods of generating and processing the tag 21 will be described below.

When the tag tray object G05 indicating the tag tray 19 (FIG. 3) is opened, the tag tray window G24 on which tag objects G25 are displayed is displayed, as shown in FIG. 8. The substances of the displayed tag objects G25 are a binder 20 and data 18 present under the "cabinet". In response to an operation for the tag 21 indicated by the displayed tag object G25, the same processing as that for the binder 20 or data 18 as the substance is executed. However, in response to a delete operation, the tag 21 itself is deleted, and the binder 20 or data 18 as the substance is not deleted.

A method of generating a new tag 21 is the same as the copy operation of data 18 between binders 20, and is achieved by dragging the binder object G17 of the binder 20 or the data object G18 of the data 18 as a substance of the tag 21 to be generated, and dropping the dragged object on the tag tray window G24. With this operation, a tag object G25 representing icon data of the dragged binder object G17 or data object G18 is displayed on the tag tray window G24, thus showing that the new tag 21 is generated.

Figure 52:
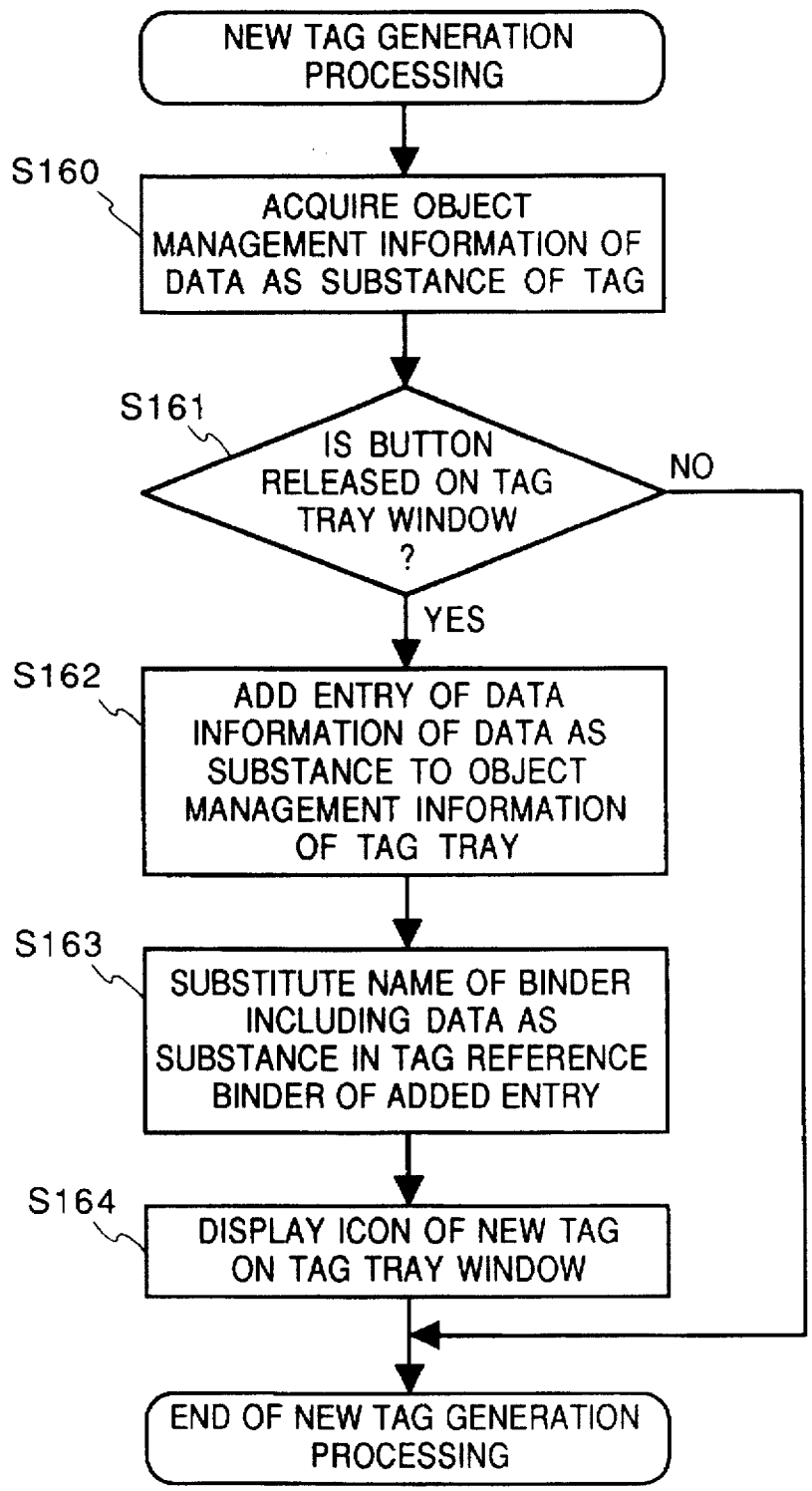
FIG. 52 is a flow chart showing a new tag creation processing sequence.

The processing for generating the new tag 21 will be described below with reference to the flow chart of FIG. 52. When a binder object G17 or data object G18 is dragged, object management information 110 of a binder 20 indicated by the binder object G17 or a binder 20 including data 18 indicated by the data object G18 is acquired in step S160. In step S161, it is checked if the button of the mouse is released on the tag tray window G24. If YES in step S161, the flow advances to step S162. In step S162, the entry of the object management information 110 already acquired in step S160 is added to object management information 110 of a tag tray 19 indicated by the tag tray window G24. Furthermore, in step S163, a name of the binder 20 or the binder to which the data 18 belongs is substituted in a tag reference target 131 in the object management information 110. In step S164, an icon of the generated tag object G25 is displayed on the tag tray window G24, and the processing is ended.

Figure 53:
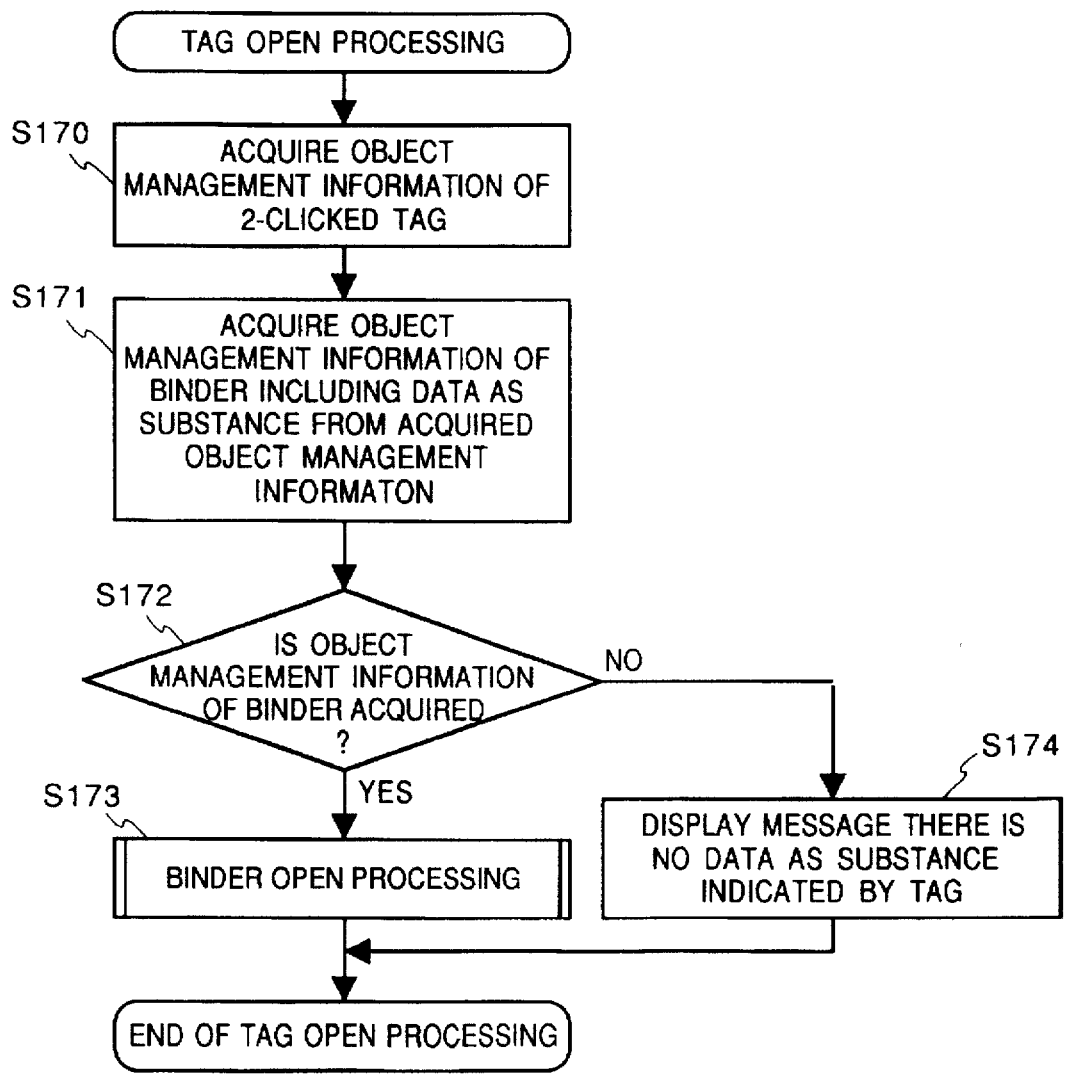
FIG. 53 is a flow chart showing a tag open operation processing sequence.

Open operation processing of a tag object G25 will be described below with reference to the flow chart shown in FIG. 53. When the open operation is performed for a tag object G25, object management information 110 of a tag 21 indicated by the operated tag object G25 present in the tag tray 19 is acquired in step S170. In step S171, a binder name 72 of the binder to which the binder 20 or the data 18 as the substance belongs, and object management information 110 of the binder 20 or data 18 are acquired. In step S172, it is checked if the above-mentioned object management information is acquired. If YES in step S172, the flow advances to step S173, and the same processing as the open processing operation for the binder 20 or data 18 is executed. Since the open processing operation has already been described, a detailed description thereof will be omitted here. On the other hand, if NO in step S172, a message indicating that no data or binder indicated by the tag is present is displayed in step S174, and the processing is ended.

<Discarding Data>

In order to discard a generated binder 20 or data 18, the same operation as the copy operation of data 18 between binders 20 is performed. A binder object G17 of a binder 20 to be discarded or a data object G18 of data 18 to be discarded is dragged/dropped in a trash can window G59 (FIG. 54) displayed upon execution of an open operation of the trash can object G07 displayed on the room window G01 (FIG. 3). In this manner, the binder object G17 or data object G18 to be discarded is moved to the trash can window. In the desktop management system, a process for monitoring a data discard operation is always in operation, and the moved binder object G17 and a binder 20 indicated by the object or the moved data object G18 and data 18 indicated by the object are deleted after they are preserved in the trash can window for a predetermined period of time.

Figure 54:
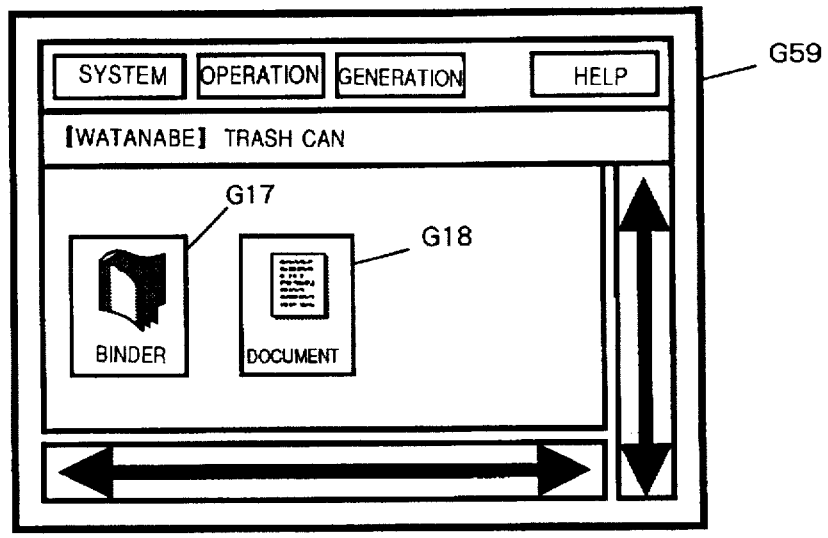
FIG. 54 is a view showing a display state of a trash can window.
Figure 55:
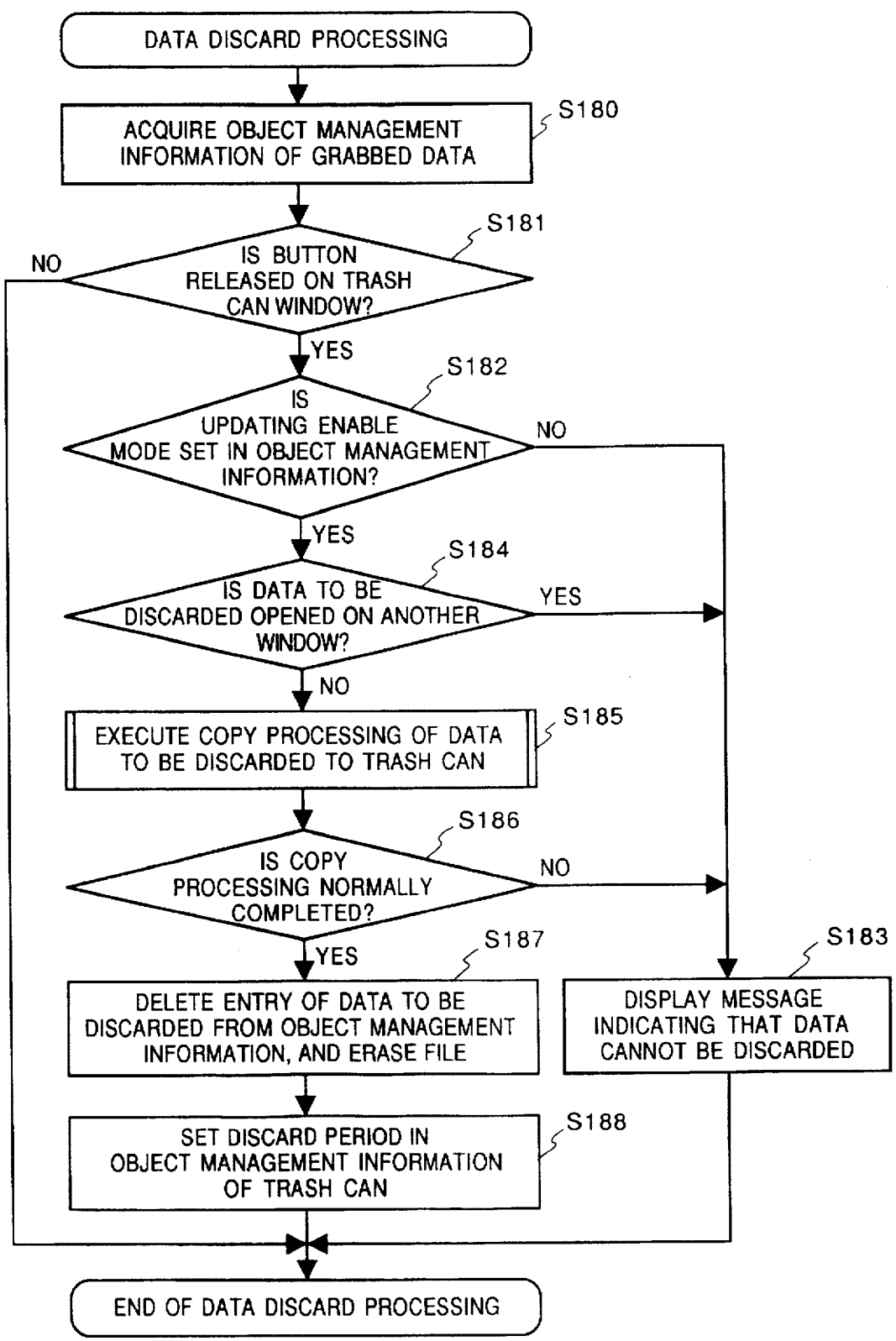
FIG. 55 is a flow chart showing a data discard processing sequence.

The above-mentioned data discard processing will be described below with reference to FIGS. 5 and 54, and the flow chart shown in FIG. 55. When a data object G18 of data 18 is grabbed, object management information 110 of a binder 20 including the grabbed data object G18 is acquired in step S180. In step S181, it is checked if the button of the mouse is released (the dragged object is dropped) on the trash can window G59. If YES in step S181, the flow advances to step S182. In step S182, it is checked based on the object management information 110 acquired in step S180 if an updating operation is enabled. If it is determined in step S182 that the updating operation is disabled, a message indicating that the data cannot be discarded is displayed in step S183, and the processing is ended. On the other hand, if it is determined in step S182 that the updating operation is enabled, the flow advances to step S184, and open object management information is searched to check if the data 18 to be discarded is opened on another window. As a result of checking, if it is determined that the data 18 to be discarded is opened on another window, a message indicating that the data cannot be discarded is displayed in step S183, and the processing is ended. Otherwise, the flow advances to step S185.

In step S185, the data 18 grabbed by the above-mentioned copy processing is copied to the trash can 23. In step S186, it is checked if this copy processing is normally completed. If YES in step S186, the flow advances to step S187. If NO in step S186, the flow advances to step S183 to display an error message. In step S187, the entry of the data 18 to be discarded is deleted from the object management information 110 of the binder 20 including the data 18 to be discarded, and the file of this data 18 is also deleted. Finally, in step S188, a date after a predetermined period of time from the current time is substituted in a data discard time limit 130 in the entry of the data 18, which is added to object management information 110 of the trash can 23, and the processing is ended.

Figure 56:
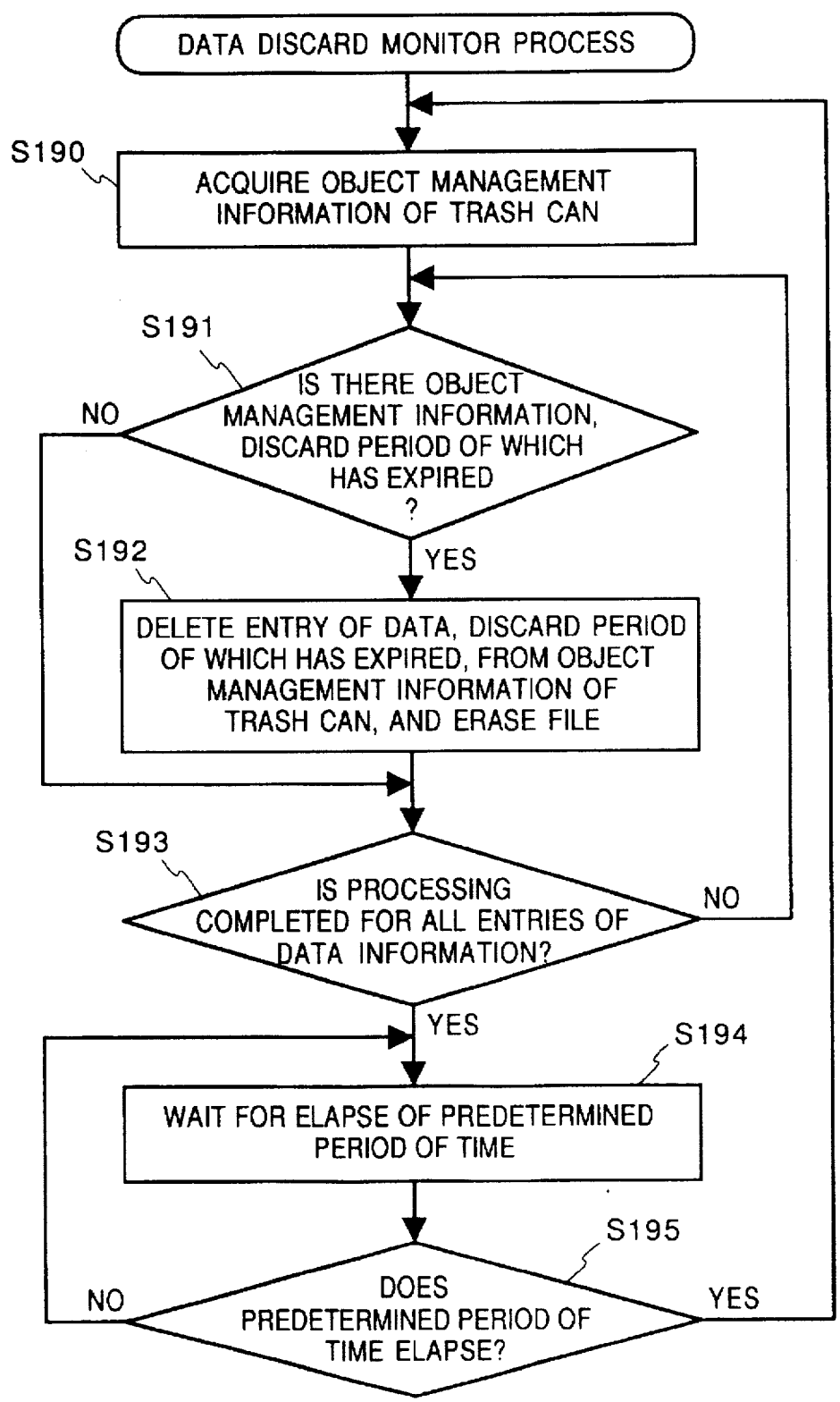
FIG. 56 is a flow chart showing a processing sequence in a data discard monitor process.

A processing method of a data discard monitoring process will be described below with reference to the flow chart shown in FIG. 56. In step S190, object management information 110 of the trash can 23 is acquired. In step S191, entries, the data discard time limits of which have expired, in the object management information 110 are searched. As a result of searching if an entry, the data discard time limit of which has expired, is found, the flow advances to step S192. In step S192, the entry searched in step S191 and a file represented by a file name in the entry are deleted. In this manner, data 18 or a binder 20 indicated by the deleted entry is deleted, and the corresponding data object G18 or binder object G17 is no longer displayed on the trash can window G59. In step S193, it is checked if the above-mentioned processing is executed for all the entries in the object management information 110 of the trash can. If YES in step S193, the control waits for an elapse of a predetermined period of time in steps S194 and S195, and the flow then returns to step S190 to repeat the same processing. However, if NO in step S193, the flow returns to step S191 to repeat the same processing.

<Library Management>

Data to be managed in a library is auxiliary data which is commonly referred to by an application program and other applications so as to process data. For example, in an application program for processing document data, the document data includes character data and commands for formatting a document using the character data. Furthermore, in the document data, format data having information for interpreting the commands to format a document and font data for displaying character data are managed as independent data called library data. When the application program processes one document data, and displays it on the CRT 1 or prints it out, the style of the document data can be easily changed by switching the library data such as font data, format data, and the like used as auxiliary data without modifying the document data. When single format data is commonly used by a plurality of document data, since the format data need not be included in each document data, an increase in volume of each document data can be prevented.

These data managed by the library are recognized using a concept of library data 28. Data 18 is added with information for specifying necessary library data 28, and necessary library data 28 is determined and requested by an application 26 and data 18 to be processed. The application 26 can utilize existing library data 28 when it creates new data 18. Library management will be described hereinafter with reference the drawings.

As shown in FIG. 7, library data 28 indicated by library data objects G23 displayed in the library binder window G22 have object management information 110 having the same format as that of data 18 managed under the cabinet 16. Therefore, these library data can be managed as normal data 18 under the cabinet 16. In the desktop management system, data 18 managed under the cabinet 16 may be managed as library data 28 as follows. More specifically, library data 28 are managed by holding only their names (given by a user), and when library data 28 is required, data 18 as its substance under the cabinet 16 may be referred to.

As shown in FIGS. 3 and 11, the libraries 17 managed by the desktop management system include a library displayed in the room window G01 of a user and a library displayed in the exit window G30. The library represented by a library object G33 displayed on the exit window G30 is one belonging to the office 14 to which the rooms 13 belong. The library represented by a library object G04 displayed in the room window G01 of each user is one belonging to the corresponding room 13. In this manner, the libraries 17 are classified into two types according to their management modes. These libraries will be described below.

(1) Library Belonging to Room

The library belonging to each room is a personal library 17 registered as an object of the room 13, and its effective range corresponds to one user. When the same processing as the above-mentioned disclosure operation of data 18 is performed for this library 17, the effective range of the library 17 can be extended to a set of a plurality of arbitrarily designated users.

(2) Library Belonging to Office

The library belonging to each office is a library 17 registered as an object of the office 14, and can be commonly accessed by only users of the rooms 13 included in the office 14. The effective range of this library 17 corresponds to a set of a plurality of users, who are permanently designated by the system. With the above-mentioned disclosure operation, the effective range of the library 17 can be extended to all users. The library 17 manages library binders 27 for each library information (type of library data 28) shown in FIG. 16. When the library 17 is opened, the library window G19 is displayed, as shown in FIG. 6. One library binder 27 stores only library data 28 having the same format ID 51. A library ID 71 as an attribute of each library binder 27 is the same as a library ID 54 of data information 50 of the stored library data 28.

<Creating Library Binder>

Figure 57:
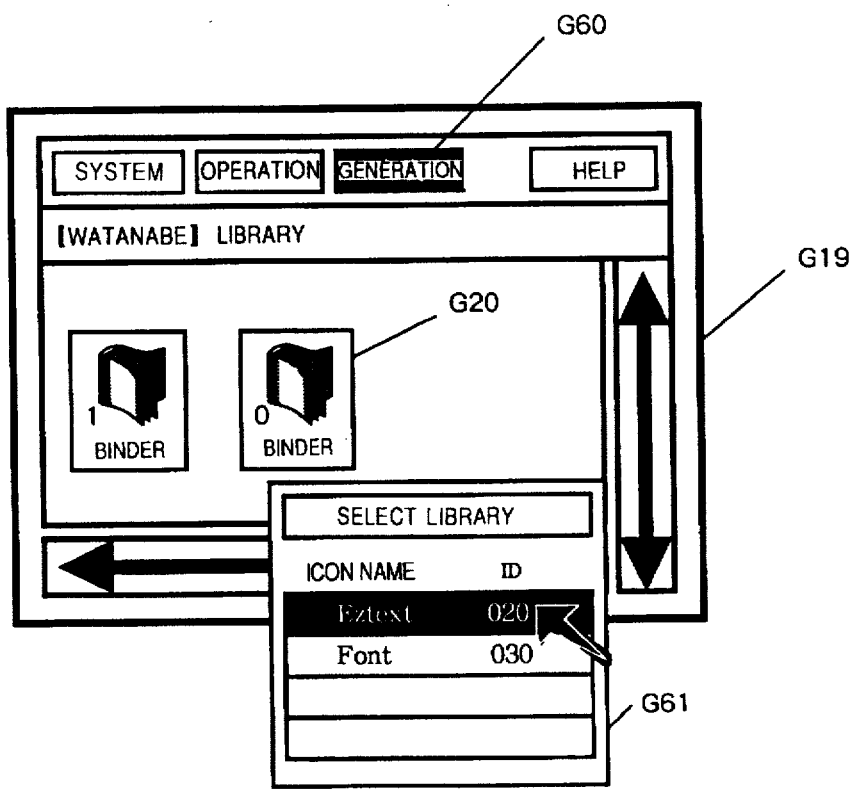
FIG. 57 is a view for explaining a method of creating a library binder.
Figure 58:
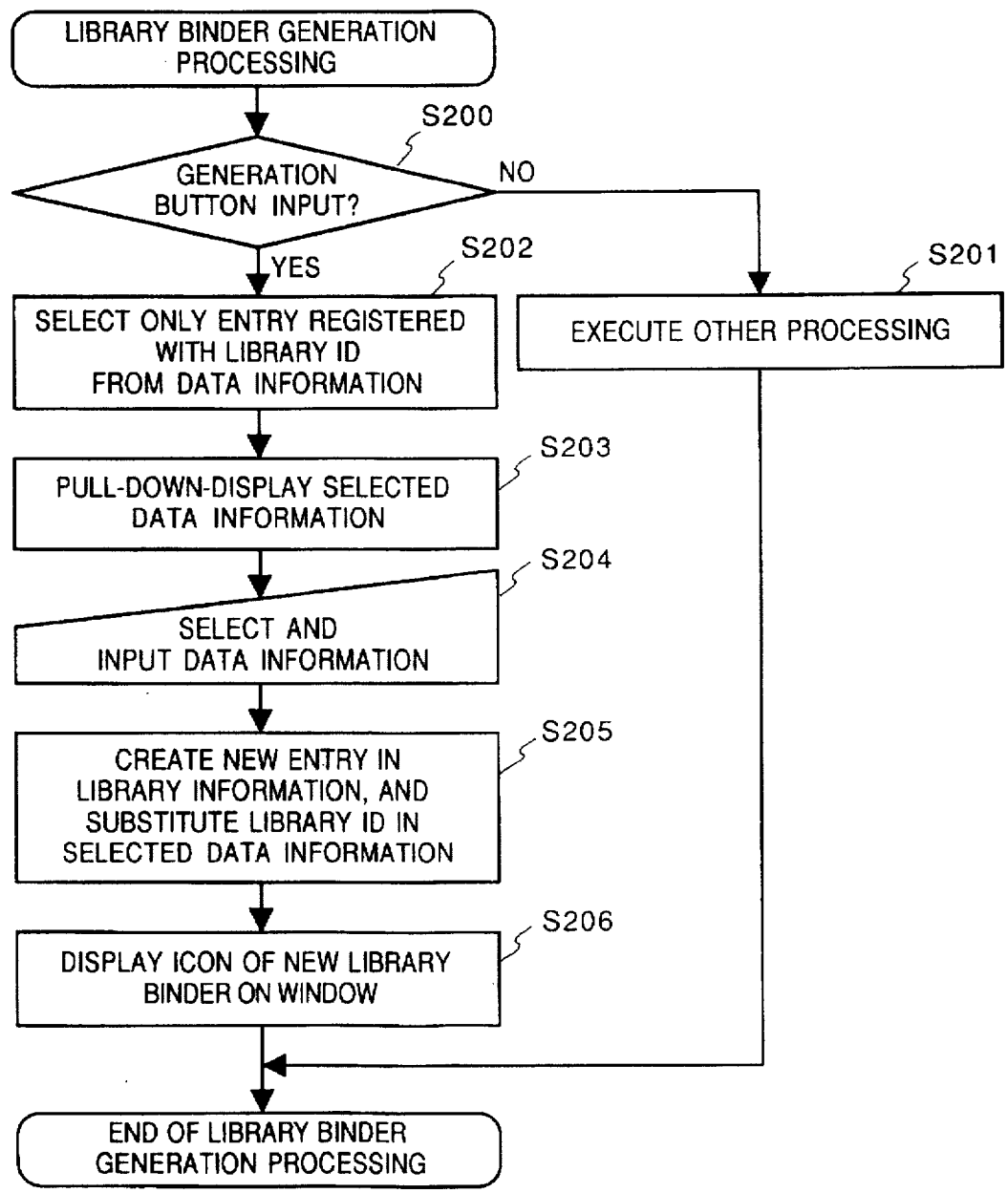
FIG. 58 is a flow chart showing a library binder creation processing sequence.

A sequence and processing for creating a new library binder 27 in the library 17 in the room 13 by a user will be described below with reference to FIG. 57 and the flow chart of FIG. 58. When a user creates a new library binder 27 in the library 17 in his or her room 13, he or she selects a generation button G60 of a library binder of the library window G19 in step S200. When the generation button G60 is selected, the flow advances to step S202. The desktop management system acquires only entries registered with library IDs 54 from data information 50 in step S202. In step S203, a library selection window G61, which displays a list of the data information 50 acquired in step S202, is displayed. In step S204, the user selects one of the displayed information, thereby executing processing in step S205.

In step S205, an entry of library information 70 in the library 17 is additionally generated. Then, the new library ID 71 is substituted in the data information 50 selected in step S202. In step S206, a library binder object G20 of the library binder 27 is additionally displayed on the window of the library 17. When a new library is required upon registration of a new application 26, library binders 27 and library data 28 of necessary groups (types of library data 28) may be automatically registered. In this case, upon registration of the new application 26, library information 70 is registered in the desktop management system together with the groups of libraries 17. At this time, default data 18 presented by this application 26 is registered as a library 17 belonging to the office 14. When groups of libraries 17 are registered, library binders 27 are generated in units of groups, and they store data of the corresponding groups. More specifically, the data of the corresponding group are registered and managed as library data 28 in the library binder 27.

<Registering Data to Library>

Figure 59:
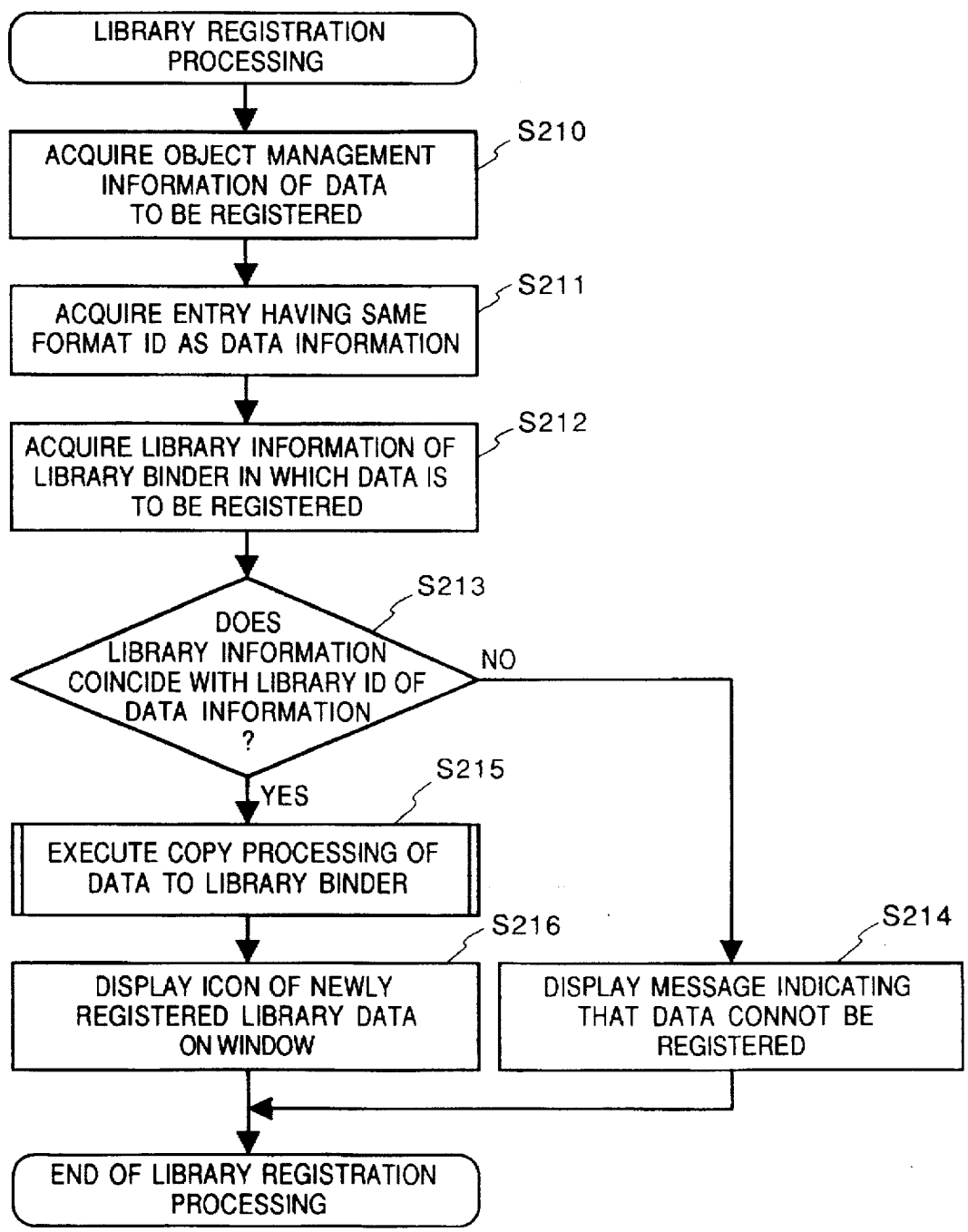
FIG. 59 is a flow chart showing a library registration processing sequence.

An operation and means for registering data 18 under the cabinet 16 as library data 28 will be described below with reference to the flow chart of FIG. 59. When data 18 under the cabinet 16 is to be registered as library data 28, the same operation as the normal copy operation of the data 18 shown in FIG. 25 is performed. A user opens a library binder object G20 representing a library binder 27 of a library 17 as a registration destination to display the library binder window G22. Then, the user drags a data object G18 representing the data 18 to be registered to the library in the binder 20, and drops it in the library binder window G22.

The desktop management system acquires object management information 110 of the binder 20 as a copy source in step S210. In step S211, data information 50 as an entry of a format ID 51 of the object management information 110 acquired in step S210 is acquired. In step S212, a library ID 71 of the library binder 27 indicated by the library binder window G22 where the data object G18 was dropped is acquired from library information 70 of the library 17. In step S213, a library ID 54 is compared with the library ID 71. If the two IDs are different from each other, a message indicating that registration is impossible is displayed in step S214, and the processing is interrupted. If it is determined in step S213 that the library ID 54 coincides with the library ID 71, the above-mentioned copy processing of the data 18 from the binder 20 as the copy source to the library binder 27 is performed in step S215. In step S216, the copied data is displayed as a library data object G23 in the library binder window G22.

<Searching Library>

When an application 26 uses library data 28 managed by the desktop management system, the application 26 sends a message to the desktop management system by utilizing a known arbitrary inter-program communication means. This message includes a "library data request" command, a requested library ID 71, information (e.g., a name of library data 28) for specifying library data 28 when the data 28 can be specified, and information for specifying data 18 using the library data 28.

Figure 60:
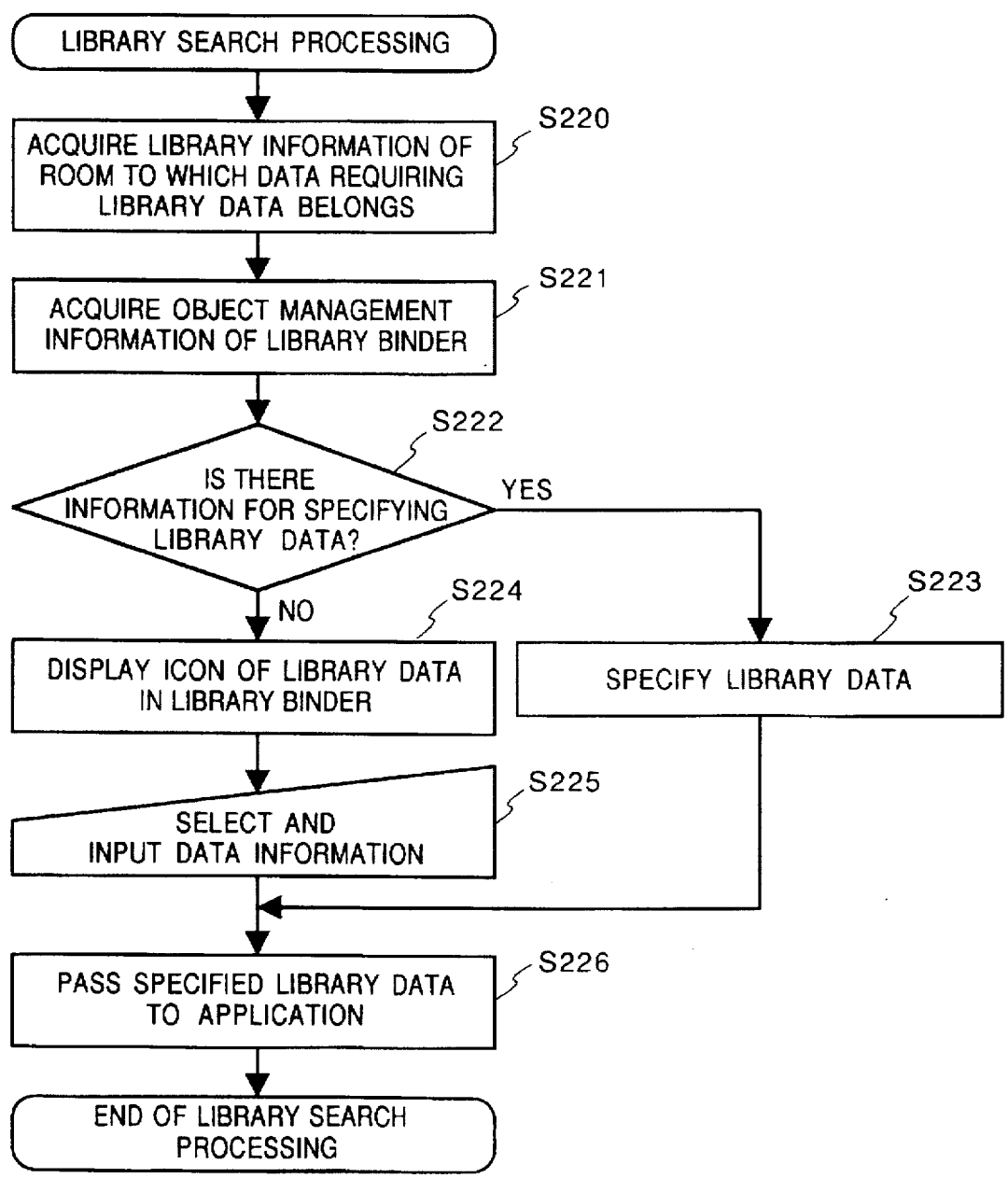
FIG. 60 is a flow chart showing a library search processing sequence.

The search processing of library data 28 will be described below with reference to the flow chart of FIG. 60. Upon reception of the message from the application 26, the desktop management system analyzes the received message in step S220 to acquire information for specifying data 18, which uses library data 28. The system then acquires library information 70 of a room 13 to which the specified data belongs. In step S221, object management information 110 of a library binder specified by the library ID 71 requested by the message is acquired from the library information 70 acquired in step S220. In step S222, it is checked if information for specifying library data 28 is set. If YES in step S222, the desktop management system searches library data 28 from the already acquired object management information 110 of the library binder 27 in step S223. In step S226, the system informs the searched library data 28 to the application 26 via the communication means.

On the other hand, if it is determined in step S222 that no information for specifying library data 28 is set, this case corresponds to a case wherein the application 26 requests new library data 28 selected by a user. The desktop management system opens the window of the above-mentioned library binder 27 on the basis of the object management information 110 of the library binder 27, already acquired in step S221, in step S224. The system then displays library data objects G23 in the library binder 27. In step S225, the system waits for a selection input of library data 28 by the user. When the selection input is executed, the desktop management system informs the selected library data 28 to the application 26 via the communication means in step S226.

<Searching Library Based on Data Request>

When an application 26, which is processing data 18, requests library data 28, the search processing of the library data 28 is started from a library 17 in the room 13 including the data 18 as data to be processed by the application 26. When the requested library data 28 is not present in the searched library 17, it is then searched from a library of the office 14 to which the room belongs. More specifically, when an application 26, which is processing data 18 of another office 14, requests library data 28, the library data 28 is searched in the order of the library 17 of the room 13 of the owner of the data 18 and the library 17 of the office 14 to which the owner's room 13 belongs. When the application 26 opens data 18 copied from another user's room 13 to the own room 13, library data 28 requested for the opened data 18 is searched in the order of the library 17 of the own room 13 and the library 17 of the office 14 including the room.

When a user copies data 18 from another room 13 to his or her own room 13, library data 28 to be referred to can be automatically copied to the library 17 of his or her own room 13. In this case, the library data 28 is copied into a library binder 27 having the same library ID 71 as that of the library data 28 to be copied. As the search order of library data 28 based on data 18, the library 17 of a specific room 13 or office 14 can be designated by acquiring an office ID 91 or a user ID 81 from library search order information 150 shown in FIG. 22. The library search order information 150 is information in units of rooms 13, and the search order can be arbitrarily set by a user. In an example shown in FIG. 22, the number of libraries to be searched is a maximum of 2. However, the search order of an arbitrary number of libraries can be set. When the library search order information 150 is not set, the libraries are searched in the above-mentioned order.

<Updating Library Data>

Updating operations such as a creation operation, an edit operation, a delete operation, and the like of library data 28 can be performed by an application 26 in the same manner as normal data 18. As shown in FIG. 16, the library information 70 includes open count information 74 indicating the number of opened library data 28 in the library binder 27. As shown in FIGS. 17 and 18, the user information 80 and the office information 90 respectively include library updating mode information 84 and library updating mode information 95 (to be collectively referred to as a "library updating mode" hereinafter) indicating if the libraries 17 of the corresponding room 13 and office 14 are opened in the updating mode, and these pieces of information can manage the updating operations of library data 28.

Only a library 17, which is opened in the updating mode for the first time in the room 13 or the office 14, can be opened in the updating mode. When a library 17 is opened in the updating mode, the "library updating mode" is set, and the updating operations of library data 28 are allowed. When an application 26 requests data 18, the data 18 can be opened even in a state wherein the "library updating mode" is set in the library 17 of the room 13 including the corresponding data 18. At this time, a response to the request of library data 28 from the application 26 is that "reference is impossible". More specifically, data 18 from which library data 28 alone is omitted is passed to the application 26. When the application 26 which set the "library updating mode" closes library data 28, the "library updating mode" is canceled, and the reference operation to the library 17 is allowed.

The updating operations for library data 28 in a library binder 27 opened in a reference mode alone and for library data 28 in a plurality of simultaneously opened library binders 27 can be prohibited. If library data 28 is opened, an open count 74 for prohibiting the updating operations can be arbitrarily set, and whether or not the updating operations are prohibited can be determined based on the open count 74. As shown in objects G21 in FIG. 6, the desktop, management system has a function of displaying the open count 74 of each library binder 27, and a user can know the open count 74.

<Clipboard>

An application 26 often copies or moves all or part of data 18 in the application itself or to one or a plurality of other applications. Data created for this purpose, and a location for temporarily storing this data are managed using concepts called clip data and a clipboard, respectively. The clipboard 24 has a window for displaying stored clip data 32. The clip data 32 is managed by object management information 110 shown in FIG. 20 in the same manner as objects in the cabinet 16 or binder 20. The clip data 32 is set with a format ID 113 representing its data type by an application 26, which created this clip data 32. An application 26, which requests clip data 32, specifies the type of data to be requested using the format ID 113 to the desktop management system.

The following description will be made with reference to the corresponding drawings. As shown in FIGS. 3 and 11, clipboards 24 managed by the desktop management system include a clipboard displayed in the room window G01 of the user, and a clipboard displayed in the exit window G30. A clipboard represented by a clipboard object G34 displayed in the exit window G30 is one belonging to the office 14 to which the room 13 belongs. A clipboard represented by a clipboard object G08 displayed in the room window G01 of the user is one belonging to the room 13. In this manner, the clipboards 24 are classified into the following two types according to their management modes.

(1) Clipboard 24 Belonging to Room 13

This clipboard 24 is a personal one registered as an object of the room 13, and its effective range corresponds to one user. The same processing as the above-mentioned disclosure operation of data 18 is performed for the clipboard 24, so that the clipboard 24 can be accessed by other users. In this manner, the effective range of the clipboard 24 can be extended to a set of a plurality of arbitrarily designated users.

(2) Clipboard 24 Belonging to Office 14

This clipboard 24 is one registered as an object of the office 14, and can be commonly accessed by only users of the rooms 13 included in the corresponding office 14. The effective range of this clipboard 24 corresponds to a set of a plurality of users permanently designated by the system..

<Registering Clip Data to Clipboard>

Figure 62:
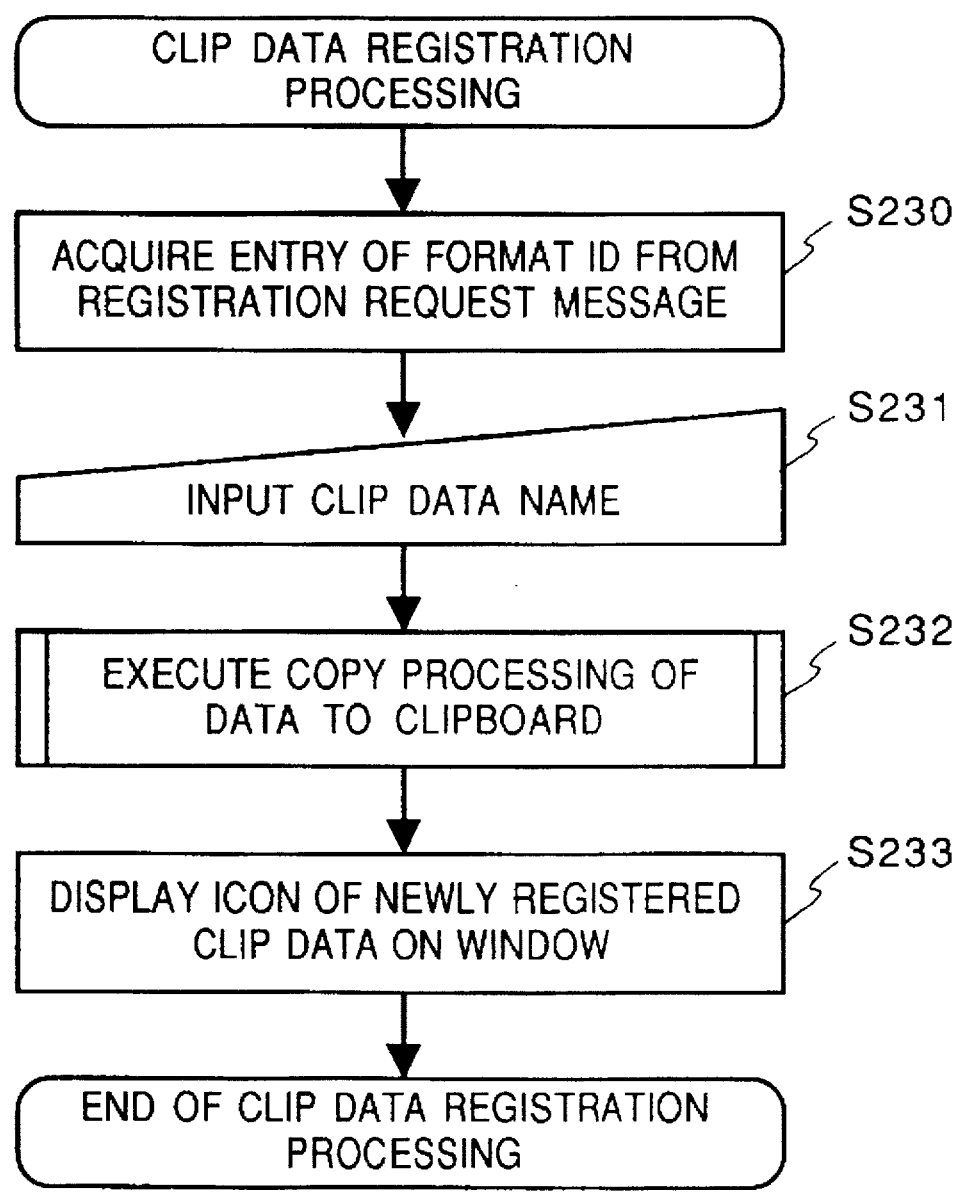
FIG. 62 is a flow chart showing a clip data registration processing sequence.

An operation and means for registering clip data 32 of the desktop management system by an application 26 will be described below with reference to the flow chart of FIG. 62. The application 26 sends a message to the desktop management system using the, known arbitrary inter-program communication means. This message includes a command for "registering clip data 32" and a format ID 113 of the clip data 32 to be registered. Upon reception of the message from the application 26, the desktop management system analyzes the message in step S230 to acquire the format ID 113 of the clip data 32 designated by the application 26. In step S231, the system displays a message for urging a user to input a name of the new clip data 32 to be registered, and acquires the name of the clip data 32 input by the user. In step S232, the system registers the clip data 32 to the clipboard 24 together with the name acquired in step S231 and the format ID 113 designated by the application 26. In step S233, the system displays the new clip data 32 as a clip data object G63 in a clipboard window G62, as shown in FIG. 61.

<Selecting Clip Data>

Figure 63:
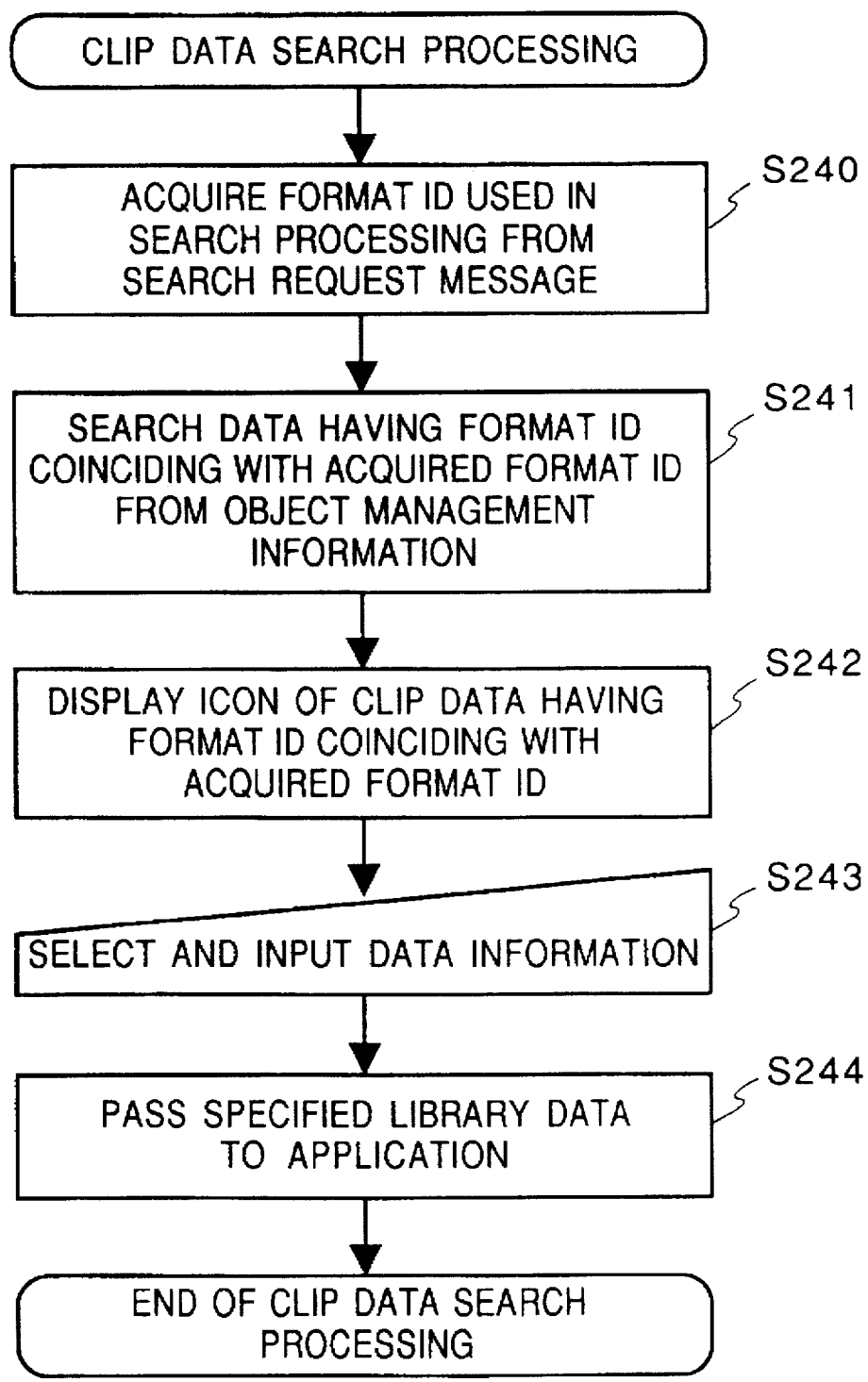
FIG. 63 is a flow chart showing a clip data search sequence.

A sequence for utilizing clip data 32 registered in the clipboard 24 of the desktop management system by an application 26 will be described below with reference to the flow chart of FIG. 63. When the application 26 uses clip data 32 registered in the clipboard 24 of the desktop management system, it sends a message to the desktop management system using the known arbitrary inter-program communication means. This message includes a command for "requesting clip data 32" and one or a plurality of format IDs 113, which can be utilized by the application 26.

Upon reception of the message from the application 26, the desktop management system analyzes the message in step S240 to acquire one or a plurality of requested format IDs 113. In step S241, the system searches one or a plurality of clip data 32 having format IDs coinciding with the format IDs 113 acquired in step S240 from the clip data 32 registered in the clipboard 24. In step S242, the system opens and displays the clipboard window G62, and displays a message for urging the user to select the clip data 32. At this time, one or a plurality of clip data 32 acquired by the search processing in step S242 are displayed as clip data objects G63. When the user selects the clip data 32 in step S243, the desktop management system informs the selected clip data 32 to the application 26 via the communication means in step S244.

<Cut Buffer>

The function of a cut & copy & paste buffer (to be referred to as a "CCP buffer" hereinafter) of the desktop management system will be described below. An application 26 often copies or moves all or part of data 18 in the application itself or to one or a plurality of other applications. Data created for this purpose, and a location for temporarily storing this data are managed using concepts called "CCP data" and a "CCP buffer", respectively. The "CCP buffer" is substantially the same as the above-mentioned clipboard 24, except that it has no means for displaying the stored "CCP data".

FIG. 64 is a table showing CCP data management information 160. The CCP data management information 160 is information with which the desktop management system manages "CCP data", and is present in units of rooms 13. The CCP data management information 160 includes the following items for each "CCP data". Reference numeral 161 denotes a file name representing the content of CCP data. Reference numeral 162 denotes a format ID representing the data type of CCP data. Reference numeral 163 denotes a size representing the data size of CCP data. Reference numeral 164 denotes an owner user ID, which is the user ID of a user who created the CCP data. Reference numeral 165 denotes an owner group ID, which is the group ID of a group to which a user who created the CCP data belongs.

The "CCP buffer" stores one "CCP data" per format ID 162. When an application 26 designates a format ID 162 to register data in the "CCP buffer" if "CCP data" having the designated format ID 162 has already been registered in the "CCP buffer", only the data registered later is stored as effective "CCP data". Since the "CCP buffer" stores only one data per format ID, an application need only designate a format ID 162 to acquire "CCP data" having the designated format ID 162. The above-mentioned clipboard 24 stores a plurality of clip data 32 in correspondence with each format ID 113. For this reason, when an application 26 designates a format ID 113 to request clip data 32, the clipboard window G62 for displaying clip data objects G63 representing the clip data 32 having the designated format ID 113 must be displayed to urge a user to select the clip data. However, since this "CCP buffer" stores only one "CCP data" of each format ID designated by an application, data need not be selected by a user unlike in the clipboard 24.

"CCP data" stored in the "CCP buffer" cannot be visually observed by a user unlike normal data in the cabinet 16, which are managed by the desktop management system. "CCP data" is created by an application 26, and a format ID 162 representing the data type of the created data is set by the application. The "CCP data" created by the application 26 is stored in the "CCP buffer" belonging to the room of a user who operates the application 26. Each "CCP data" in the "CCP buffer" has a unique format ID 162. When the application 26 requests "CCP data" having a specific format ID 162 to the desktop management system, the desktop management system specifies "CCP data" having the designated format ID 162 in the "CCP buffer" belonging to the room 13 of the user, and can pass it to the application. Such operations will be described below with reference to the flow charts.

<Registering in CCP Buffer>

Figure 65:
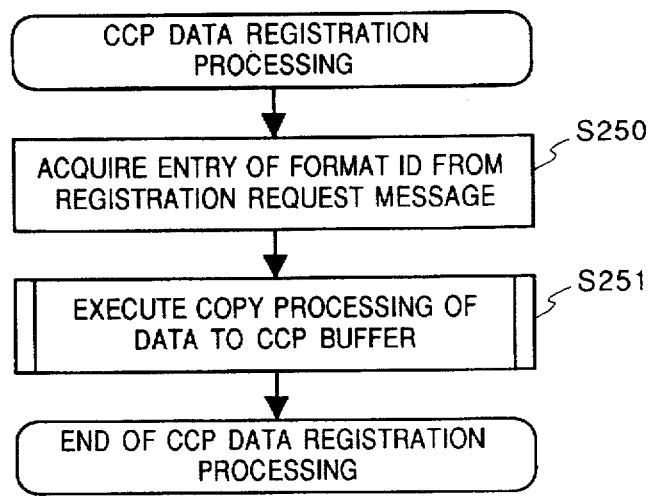
FIG. 65 is a flow chart showing a CCP data registration processing sequence.

A sequence for registering "CCP data" in the "CCP buffer" managed by the desktop management system by an application 26 will be described below with reference to the flow chart of FIG. 65. The application 26 sends a message to the desktop management system using the known arbitrary inter-program communication means. This message includes a command for "registering CCP data", and a format ID 162 of "CCP data" designated by the application which registers the data. Upon reception of the message from the application 26, the desktop management system analyzes the message in step S250 to acquire the format ID 162 of the "CCP data" designated by the application 26. In step S251, the system registers "CCP data" in the "CCP buffer" together with the format ID 162 designated by the application 26.

<Acquiring CCP Data>

Figure 66:
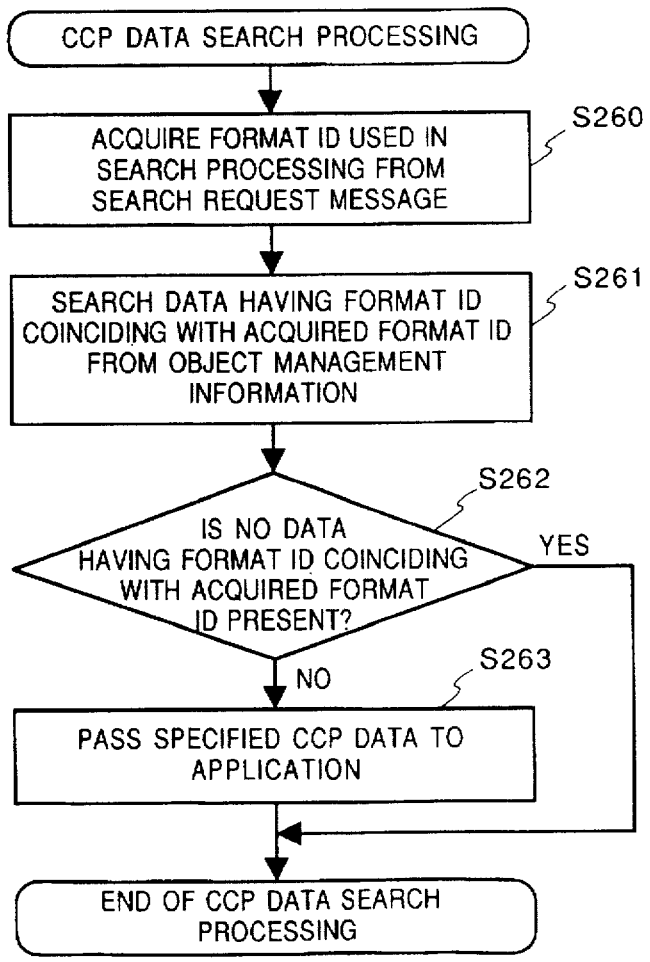
FIG. 66 is a flow chart showing a CCP data search processing sequence.

A sequence for utilizing "CCP data" registered in the "CCP buffer" managed by the desktop management system by an application 26 will be described below with reference to the flow chart shown in FIG. 66. When the application 26 uses "CCP data" in the "CCP buffer" of the desktop management system, it sends a message to the desktop management system using the known arbitrary inter-program communication means. This message includes a command for "requesting CCP data" and a format ID 162 for specifying "CCP data". Upon reception of the message from the application 26, the desktop management system analyzes the message in step S260 to acquire the requested format ID 162. In step S261, the system searches "CCP data" having a format ID coinciding with the requested format ID 162. It is checked in step S262 if "CCP data" having the specific format ID 162 designated by the application 26 is present as a result of this search processing. If NO in step S262, the processing is ended. If it is determined in step S262 that "CCP data" having the specific format ID 162 designated by the application 26 is acquired, the system informs the one and only "CCP data" in the "CCP buffer" to the application 26 via the communication means.

<Searching>

In searching processing, binders 20, library binders 27, and data 18 under the cabinet 16 are determined as search targets, search conditions are set for these targets, and binders 20, library binders 27, and data 18, which satisfy the search conditions, are displayed on a window. In this case, the search conditions include information attached to binders 20, library binders 27, and data 18 as search targets. In this embodiment, the conditions include items such as the registration date 117, updating date 118, kanji name 115, owner user ID 120, owner group ID 121, object type 111, and the like of the object management information 110 shown in FIG. 20, and their logical combinations. The search conditions may be set in such a manner that all possible search conditions are presented to a user as possible choices, and the user selects preferred conditions therefrom, or that a user is caused to sequentially input search conditions.

As methods for presenting a search result to a user, for example, the following methods are available:

(a) a method which assigns a specific area in a window to a search result display only during a specific period from the beginning to the end of search processing, and has no special search result display means;

(b) a method which has a search result display means for generating, e.g., a new special-purpose window for displaying only data satisfying the search conditions; and (c) a method of combining the methods (a) and (b) as needed.

The search processing and an embodiment of the method for presenting a search result of the search processing to a user will be described below. Each of the above-mentioned search result presentation methods for search processing of binders 20 present in a hierarchical level immediately under the cabinet 16 will be described below. In this embodiment, a method utilizing object management information 110 of the cabinet 16 in the search processing will be described. Alternatively, the search processing may be executed by creating a data architecture for the search processing. For the sake of simplicity, simple conditions such as the content of the object type 111 of the object management information 110 are set as the search conditions. However, as described above, the search conditions are not limited to these.

Figure 67:
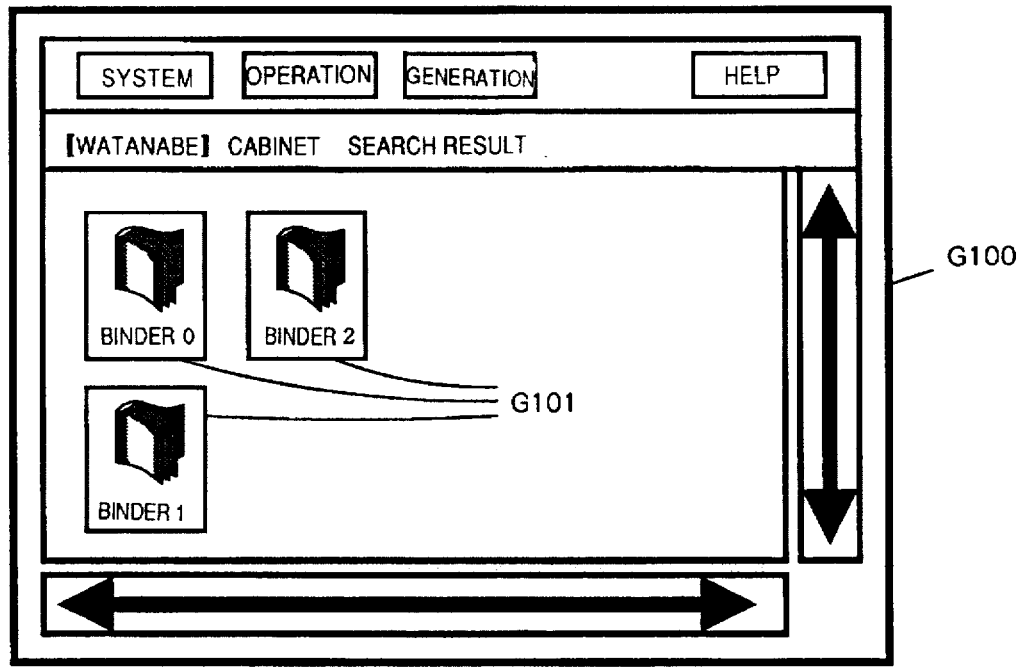
FIG. 67 is a view showing a state wherein a search result is displayed using a cabinet window.
Figure 68:
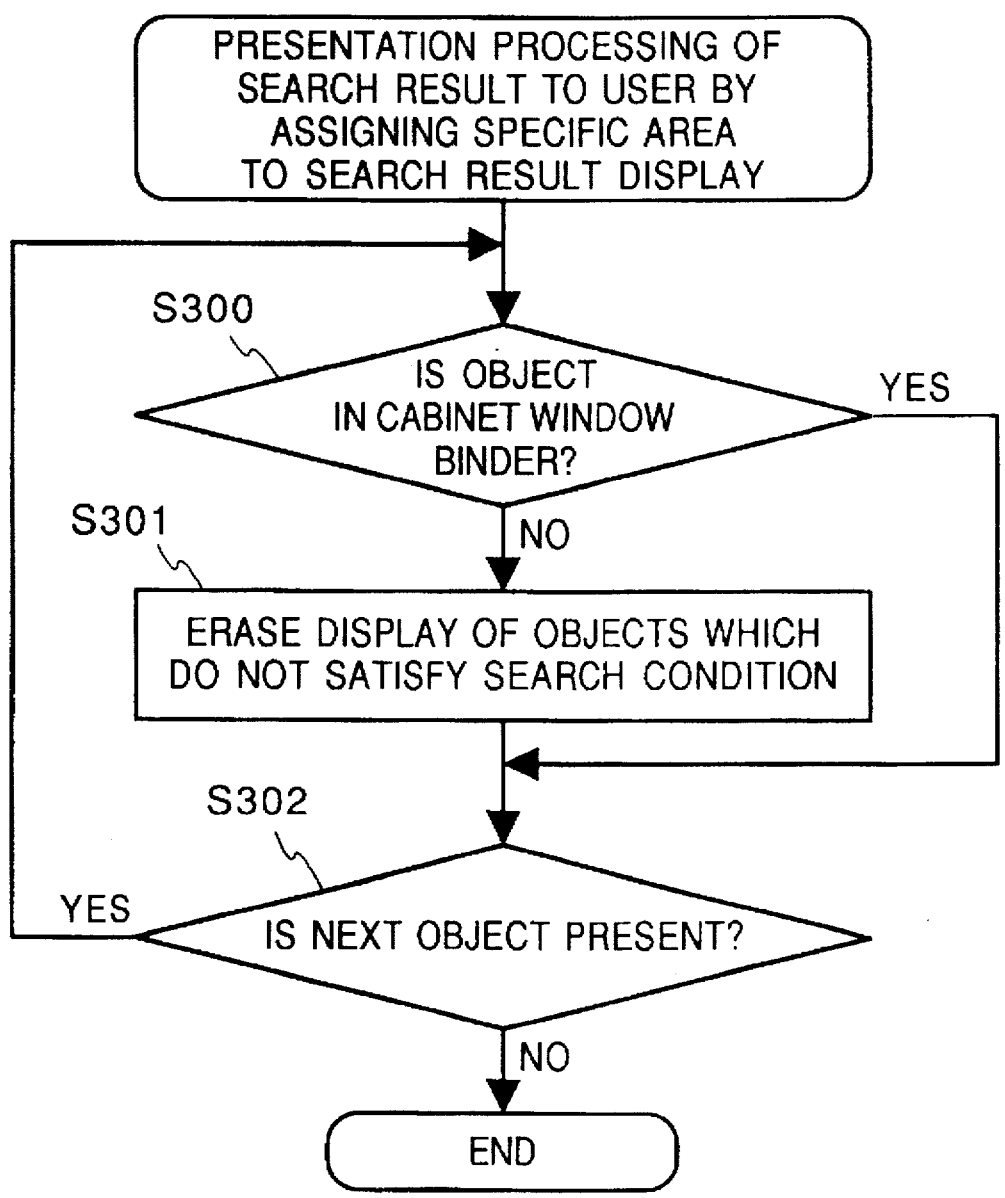
FIG. 68 is a flow chart showing a search processing sequence executed when the search result is displayed using the cabinet window.

An embodiment of the search result presentation method (a) will be described below with reference to FIGS. 5 and 67 showing display examples, and the flow chart of FIG. 68.

In this embodiment, a window for displaying a list of objects in the cabinet 16 is assigned to a search result display. Initially, a list of all objects in the cabinet 16 is displayed in the cabinet window G16, as shown in FIG. 5. A case will be exemplified below wherein the search processing is executed for these objects to have a search condition "to search binders 20 in the cabinet 16". In step S300, it is checked if an object type 111 of each object registered in the object management information 110 of the cabinet 16 indicates "binder". If NO in step S300, the flow advances to step S301. In step S301, the icon of this object is deleted from the cabinet window G16, and the flow advances to step S302.

On the other hand, if YES in step S300, the flow advances to step S302. In step S302, it is checked if this processing is executed for all entries (objects) in the cabinet 16. If YES in step S302, this processing is ended. If objects to be processed still remains, the flow returns to step S300 to repeat the above-mentioned processing.

As a result, as shown in FIG. 67, only binder objects G101 representing binders 20 satisfying the search condition are displayed in a cabinet window G100, and objects which do not satisfy the condition (i.e., data 18) are not displayed.

Figure 69:
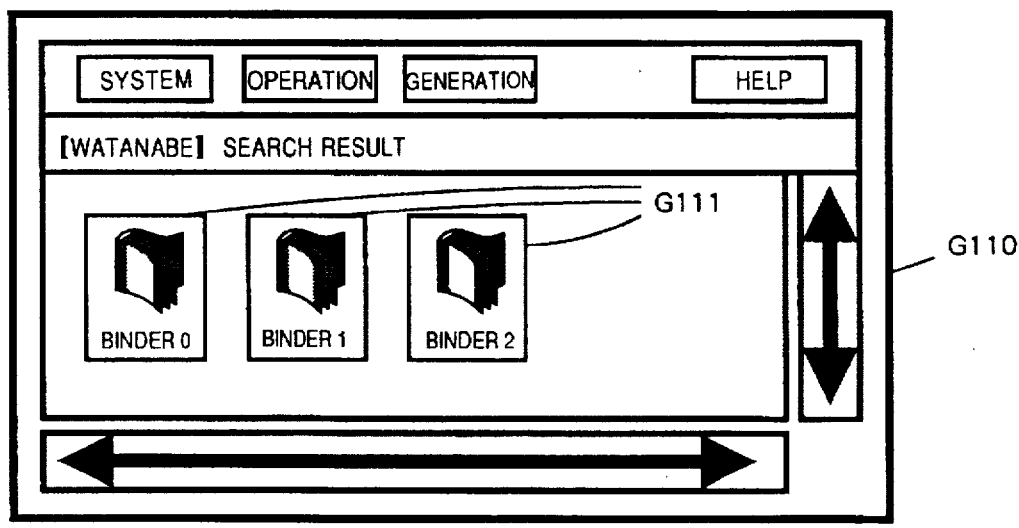
FIG. 69 is a view showing a state wherein a search result is displayed using a search result window.
Figure 70:
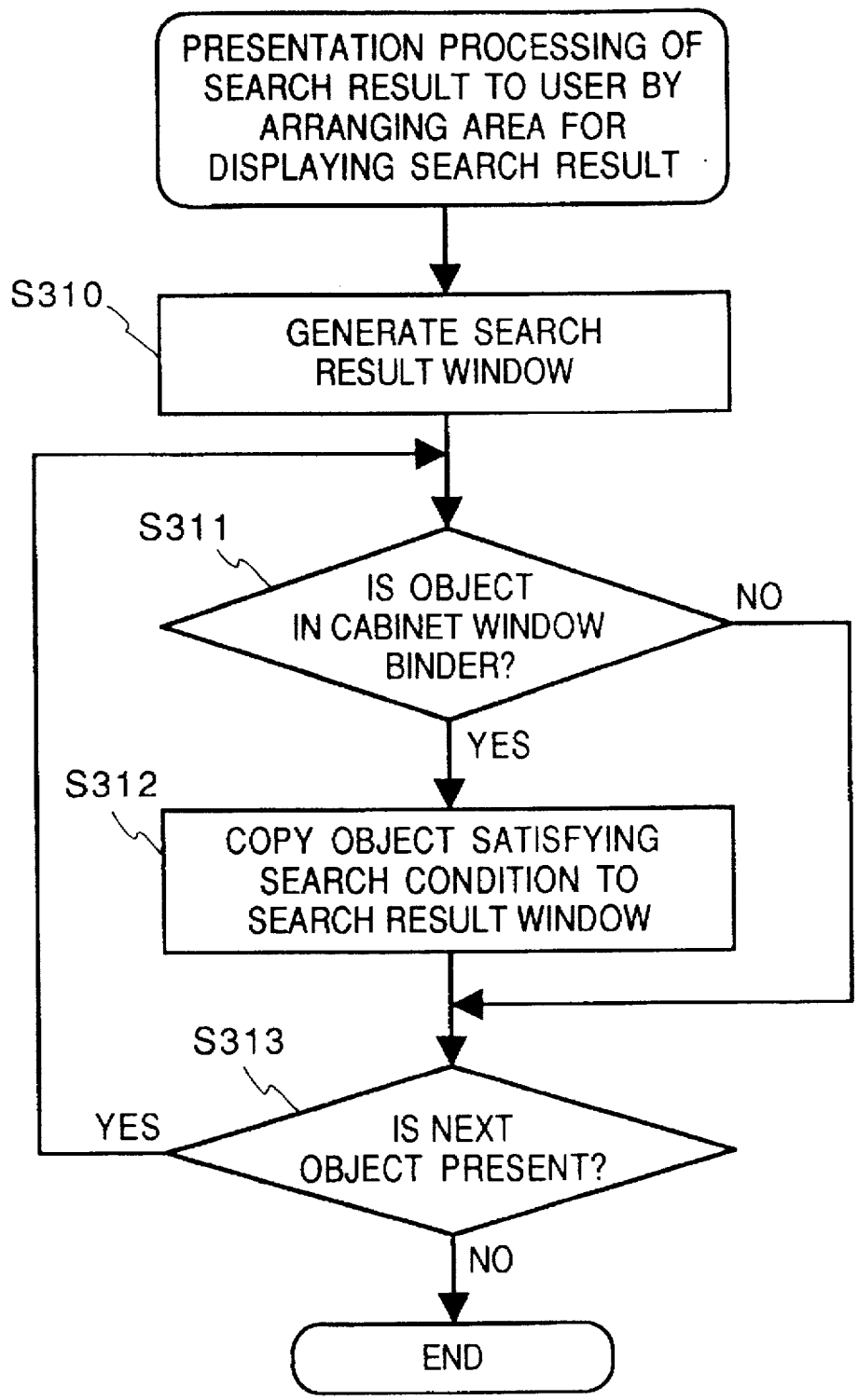
FIG. 70 is a flow chart showing a search processing sequence executed when the search result is displayed using the search result window.

An embodiment of the search result presentation method (b) will be described below with reference to FIGS. 5, 69, and 70.

Initially, a list of all objects in the cabinet 16 is displayed in the cabinet window G16, as shown in FIG. 5. A case will be exemplified below wherein the search processing is executed for these objects to have a search condition "to search binders 20 in the cabinet 16". First, in step S310, a search result display window G110 is generated, as shown in FIG. 69. In step S311, it is checked if each object satisfies the search condition. In this embodiment, since the search condition is "to search binders 20 in the cabinet 16", it is checked if an object type 111 of each object registered in the object management information 110 of the cabinet 16 indicates "binder". If YES in step S311, the flow advances to step S312. In step S312, the corresponding object is displayed as a search result object G111 in a search result display window G110. The flow then advances to step S313.

On the other hand, if NO in step S311, the flow jumps to step S313. In step S313, it is checked if the above-mentioned processing is executed for all objects. If YES in step 313, this processing is ended. If objects to be processed still remain, the flow returns to step S311 to repeat the above-mentioned processing. As described above, this processing is performed for all entries (objects) in the cabinet 16. As a result, although the display state of the cabinet window G16 is left unchanged, only binders 20 satisfying the conditions are displayed as new search result objects 111 in the search result display window G110, as shown in FIG. 69.

Figure 73:
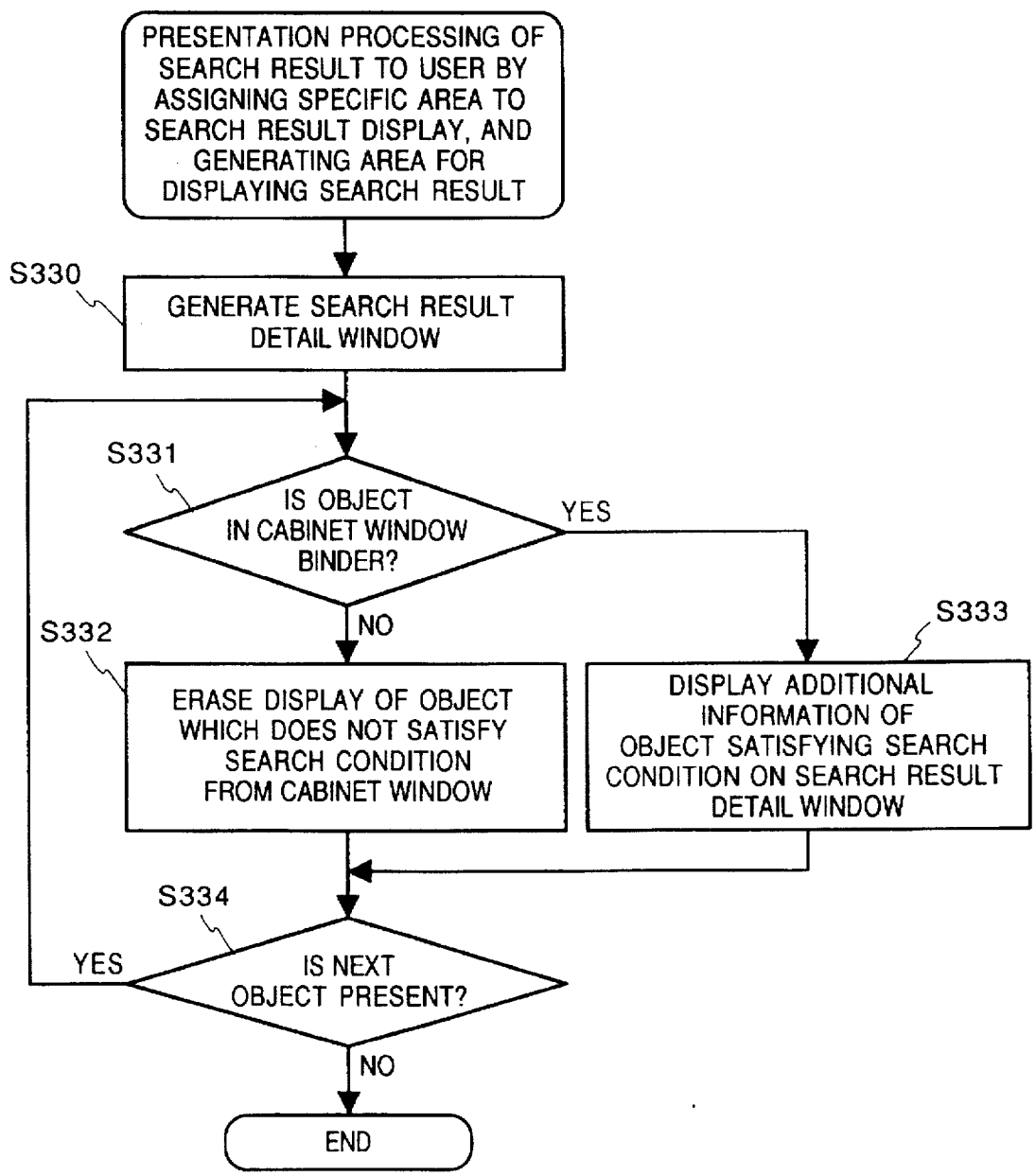
FIG. 73 is a flow chart showing a search processing sequence executed when a search result is displayed using both the detailed search result display window and the cabinet window.

The search result presentation method (c) will be described below with reference to FIGS. 5, 67, and 71, and the flow chart of FIG. 73.

Initially, a list of all objects in the cabinet 16 is displayed in the cabinet window G16, as shown in FIG. 5. A case will be exemplified below wherein the search processing is executed for these objects to have a search condition "to search binders 20 in the cabinet 16". In step S330, a search result detail window G120 is generated, as shown in FIG. 71. In step S331, it is checked if each object in the cabinet 16 satisfies the search condition. More specifically, it is checked if an object type 111 of each object registered in the object management information 110 of the cabinet 16 indicates "binder".

If NO in step S331, the flow advances to step S332, and the icon of the corresponding object is deleted from the cabinet window G16. However, if YES in step S331, the flow advances to step S333 to display attached information of the corresponding object on the search result detail window G120. In step S334, it is checked if the above-mentioned processing is executed for all objects. If YES in step S334, this processing is ended. If objects to be processed still remain, the flow returns to step S331 to repeat the above-mentioned processing. As described above, this processing is executed for all entries (objects) in the cabinet 16.

As a result of the above-mentioned processing, as shown in FIG. 67, only binder objects G17 representing binders 20 satisfying the search condition are displayed in the cabinet window G16, and objects which do not satisfy the condition (i.e., data 18) are not displayed. Furthermore, as shown in FIG. 71, detailed information attached to each of the binders 20 displayed in the cabinet window G16 is displayed on the search result detail window G120.

According to substantially the same processing sequence as the above-mentioned search processing sequence of binders 20 present in a hierarchical level immediately under the cabinet 16, search processing of data 18 in a hierarchical level immediately under the cabinet 16, search processing of library binders 27 in a hierarchical level immediately under the cabinet 16, search processing of library data 28 in a hierarchical level immediately under the cabinet 16, search processing of binders 20 in a hierarchical level immediately under another binder 20, search processing of data 18 in a hierarchical level immediately under a binder 20, search processing of library binders 27 in a hierarchical level immediately under another library binder 27, search processing of library data 28 in a hierarchical level immediately under a library binder 27, search processing of disclosure trays 29 in a hierarchical level immediately under the disclosure shelf 22, search processing of data 18 and binders 20 in a hierarchical level immediately under the tag tray 19, and the like can be realized by setting the object type 111 as the search condition. The following descriptions of embodiments of the search processing will be made according to the embodiment of the method (b) for generating the special-purpose search result window G110 for displaying search results.

Figure 72:
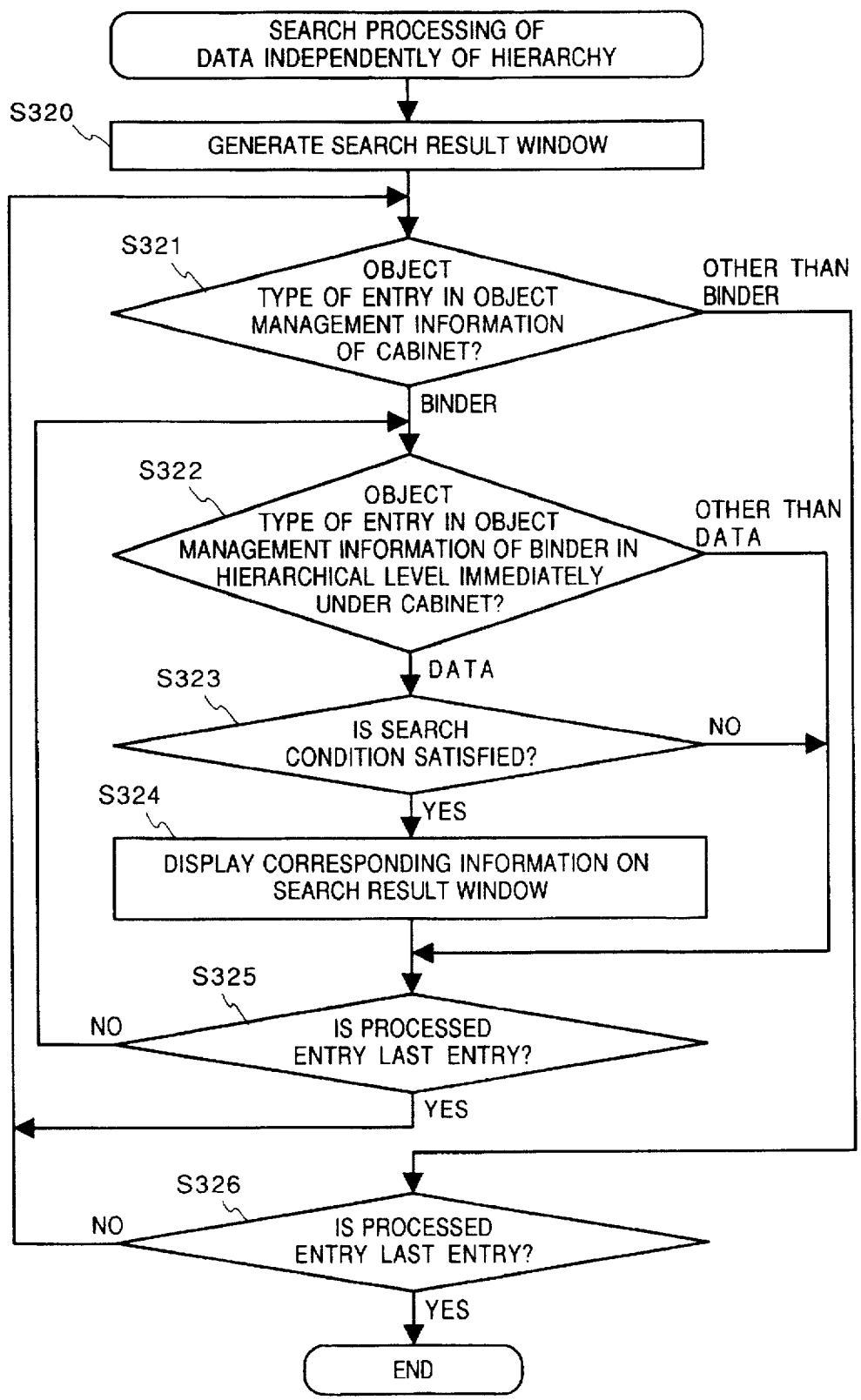
FIG. 72 is a flow chart showing a search processing sequence of data independent from hierarchy.

The search processing of objects present in a hierarchical level two hierarchical levels below the cabinet 26 will be described below with reference to the flow chart of FIG. 72.

Objects present in a hierarchical level two hierarchical levels below the cabinet 16 indicate objects in a hierarchical level immediately below a certain binder 20 present in a hierarchical level immediately below the cabinet 16. When a search condition "data present in a hierarchical level two hierarchical levels below the cabinet 16" is set, and the search processing is executed, the search result window G110 for displaying search results is generated in step S320. In step S321, an entry having the object type 111="binder" is selected from the object management information 110 of the cabinet 16. In steps S322 and S323, object management information 110 of the binder 20 is read based on the information of the selected entry. It is then checked if each object belonging to the binder 20 satisfies the search condition. More specifically, it is checked based on the object management information of the binder 20 if an object type 111 of each object (entry) indicates "data 18". If it is determined in step S323 that the entry satisfies the search condition, the flow advances to step S324. In step S324, an icon file is read out based on a format ID 113 and data information 50 of the entry satisfying the search condition, and is displayed as a search result object G111 in the search result window G110.

In order to execute this processing for all entries of the object management information 110 of the binder 20, it is checked in step S325 if entries to be processed remain. If YES in step S325, the flow returns to the processing for selecting an entry having the object type 111="binder 20" from the object management information 110 of the cabinet 16 (step S321), and the subsequent processing is repeated. If it is determined in step S325 that the processing is completed for all the entries in the binder 20, the flow returns to step S321. It is checked in step S326 if the processing is executed for all entries in the cabinet 16. If entries to be processed still remain, the flow returns to step S321 to repeat the above-mentioned processing. If the processing for all the entries is completed, this processing is ended. As described above, the processing is performed for all the entries of the object management information 110 of the cabinet 16. Note that search processing can be executed independently of the number of hierarchical levels by executing the above-mentioned processing recursively.

Figure 74:
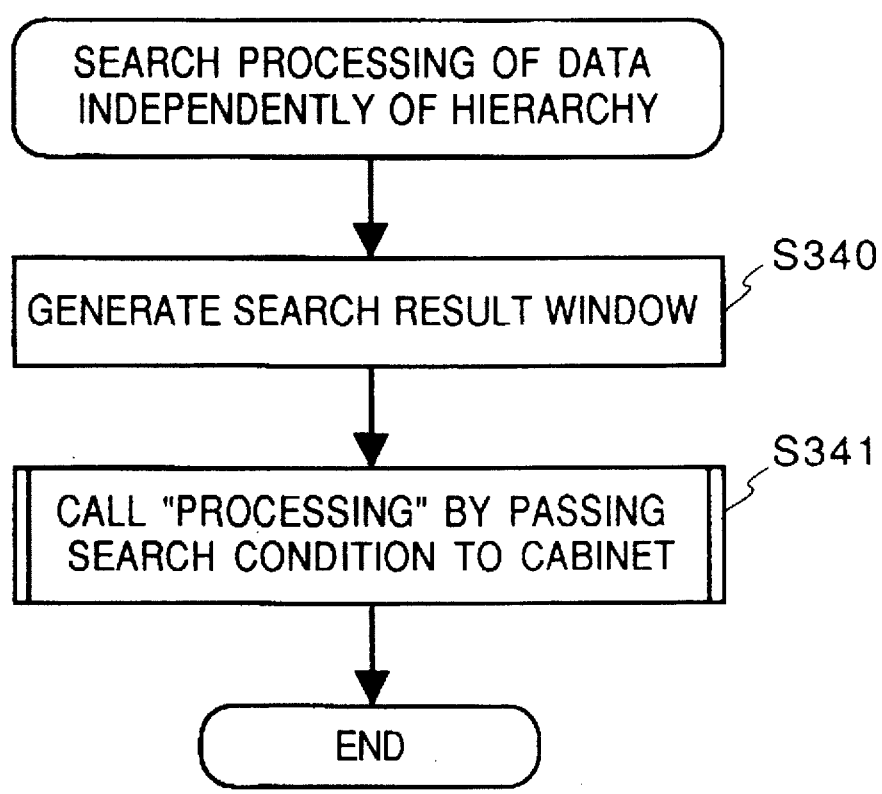
FIG. 74 is a flow chart showing a search processing sequence of data independent from hierarchy.

When search conditions are set for objects present in different hierarchical levels as search targets, search processing can be realized by changing a recursive execution count of the search processing. This processing will be described below with reference to the flow chart of FIG. 74. In this case, objects present below the cabinet 16 independently of hierarchical levels are determined as search targets, and search processing is executed under search conditions "an object having the object type 111=data and having the creator ID 114=012 in object management information 110". In this embodiment, assume that data 18 can be present immediately under the cabinet 16 or a binder 20, for the sake of simplicity.

When the above-mentioned search conditions are set for objects present in arbitrary hierarchical levels below the cabinet 16 as search targets, and the search processing is started, the search result window G110 for displaying search results is generated in step S340. In step S341, the search conditions are passed to the cabinet 16 as a search target, and "processing" to be described below as routine processing is executed, thus ending this processing.

Figure 75:
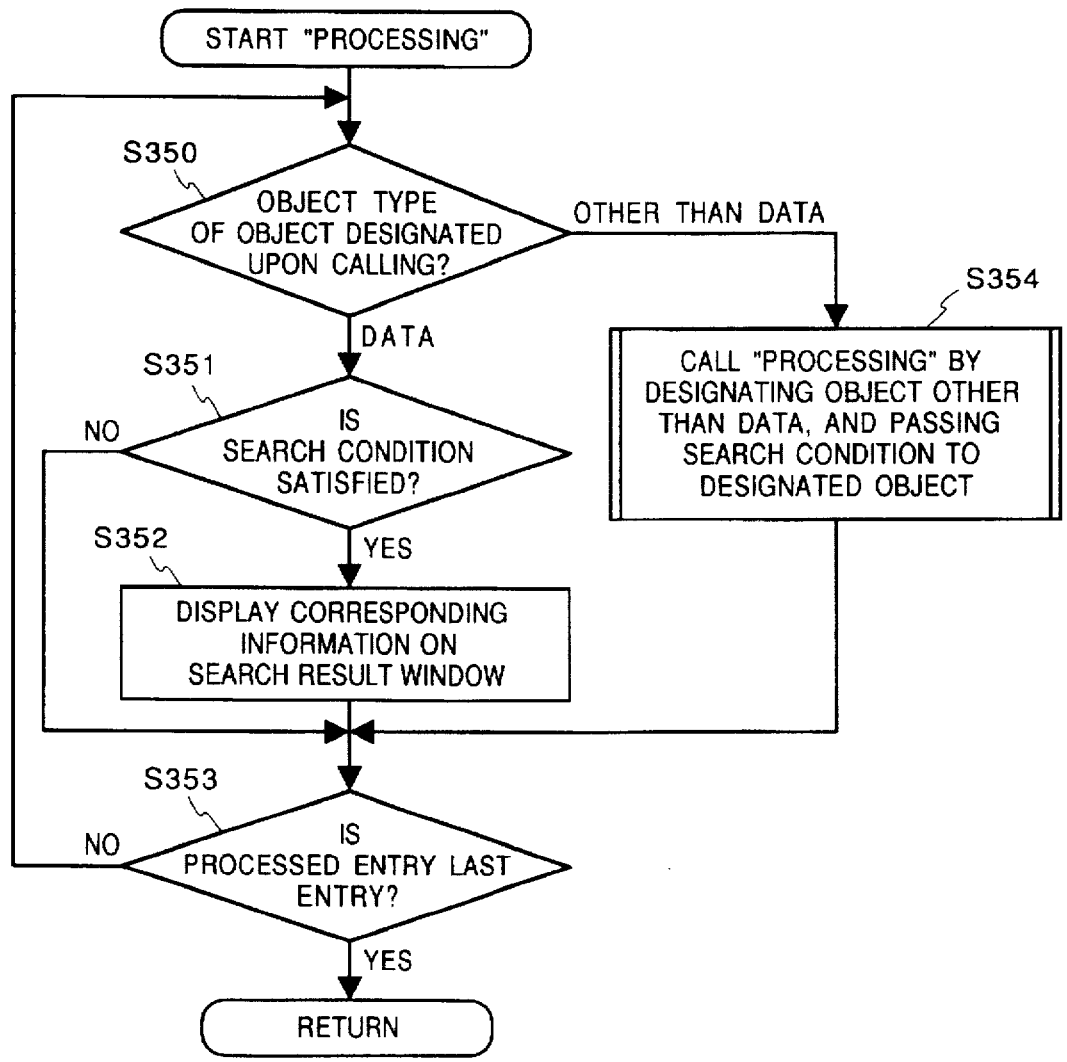
FIG. 75 is a flow chart showing a processing sequence of a routine processing portion in the search processing.

The "processing" will be described below with reference to the flow chart of FIG. 75. The "processing" is a module for realizing a function of recursively searching and extracting data 18 from not only the cabinet 16 but also objects, which can have other lower hierarchical levels, such as binders 20, library binders 27, disclosure shelf 22, disclosure tray 29, tag tray 19, and the like, and displaying information of data 18 satisfying the search conditions on the search result window G110.

When the "processing" is called, an entry having the object type 111=data 18 is selected from object management information 110 of an object designated upon calling of the "processing" in step S350. In step S351, it is checked if the selected entry satisfies the search conditions ("an object having the object type 111=data and having the creator ID 114=012 in object management information 110"). In step S352, an icon file is read out based on a format ID 113 and data information 50 of the entry satisfying the search conditions, and is displayed as a search result object G111 in the search result window G110 together with necessary information.

If it is determined based on the object management information 110 of the object designated upon calling of the "processing" that an entry has the object type 111=binder, the "processing" is recursively called by passing the search conditions and the search target to the entry in step S354. In step S353, it is checked if the processing is completed for all entries. If NO in step S353, the flow returns to step S350. If YES in step S353, this processing is ended. As described above, this processing is executed for all entries of the object management information 110 of the object designated upon calling of the "processing", and the control returns from the "processing".

<Reaching Search Result>

Processing for reaching an object satisfying search conditions based on a search result without tracing the management architecture of data will be described below. In this embodiment, assume that search targets are data 18 and binders 20 under the cabinet 16.

Figure 76:
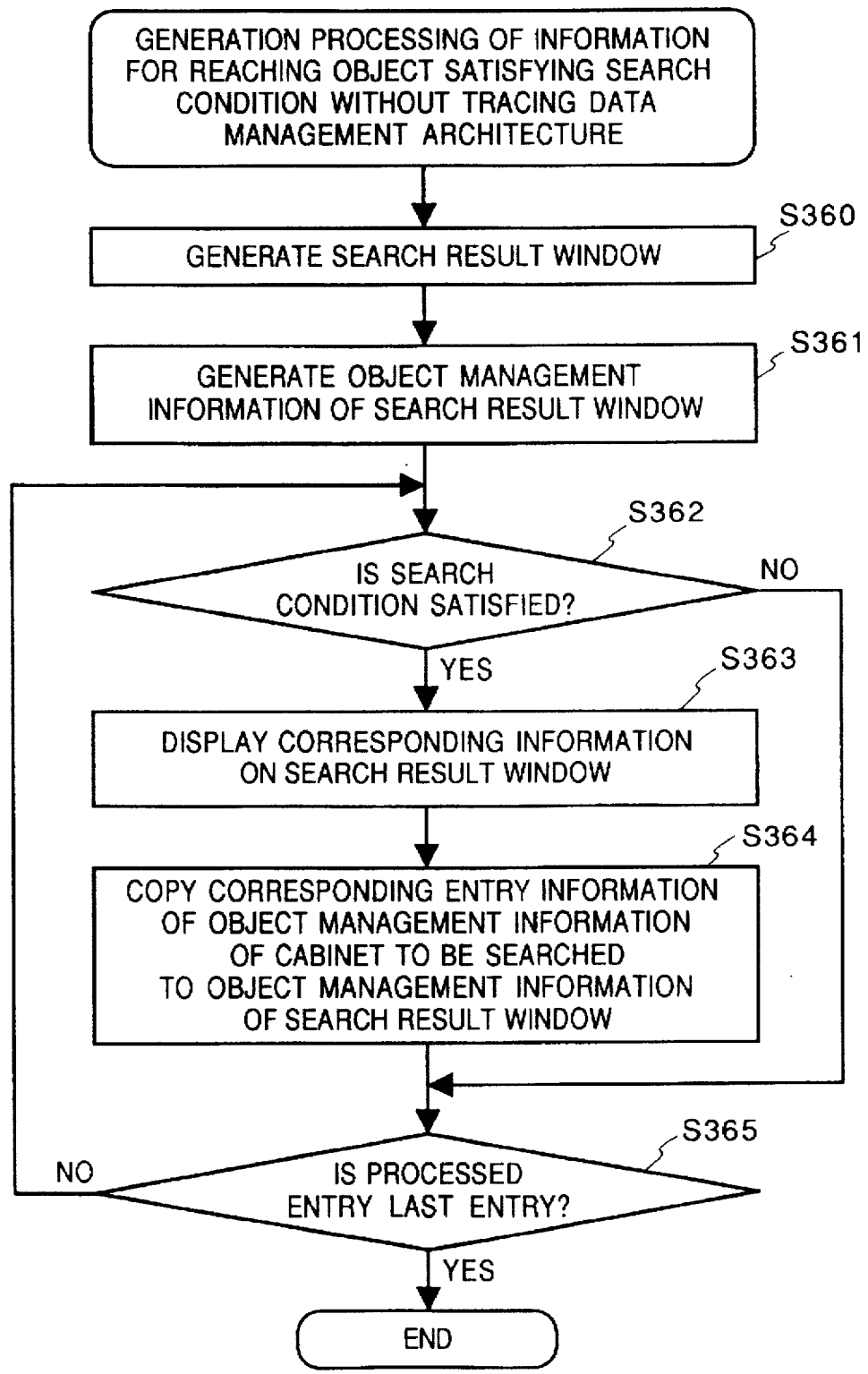
FIG. 76 is a flow chart showing a sequence of processing for reaching an object satisfying a search condition on the basis of a search result without following any data management architecture.

Processing for generating information for reaching an object satisfying search condition based on a search result without tracing the data management architecture will be described below with reference to FIG. 76.

When the search processing is executed, the search result window G110 is generated in step S360. In step S361, object management information 110 of the search result window is generated. This object management information 110 stores information about search result objects in the search result window G110 as objects such as the cabinet 16 or binders 20 having a hierarchical structure therebelow. In step S362, the search processing is executed, and an object satisfying the search conditions upon execution of the search processing is displayed in the search result window G110 in step S363. In step S364, entry information satisfying the search condition in object management information 110 of the cabinet 16 as a search target, which is used for determining if an object satisfies the search conditions, is copied to an entry of the newly generated object management information 110 of the search result window G110. In step S365, it is checked if entries to be processed remain. If YES in step S365, the flow returns to step S362 to repeat the above-mentioned processing. In this manner, this processing is executed for all search targets.

Figure 77:
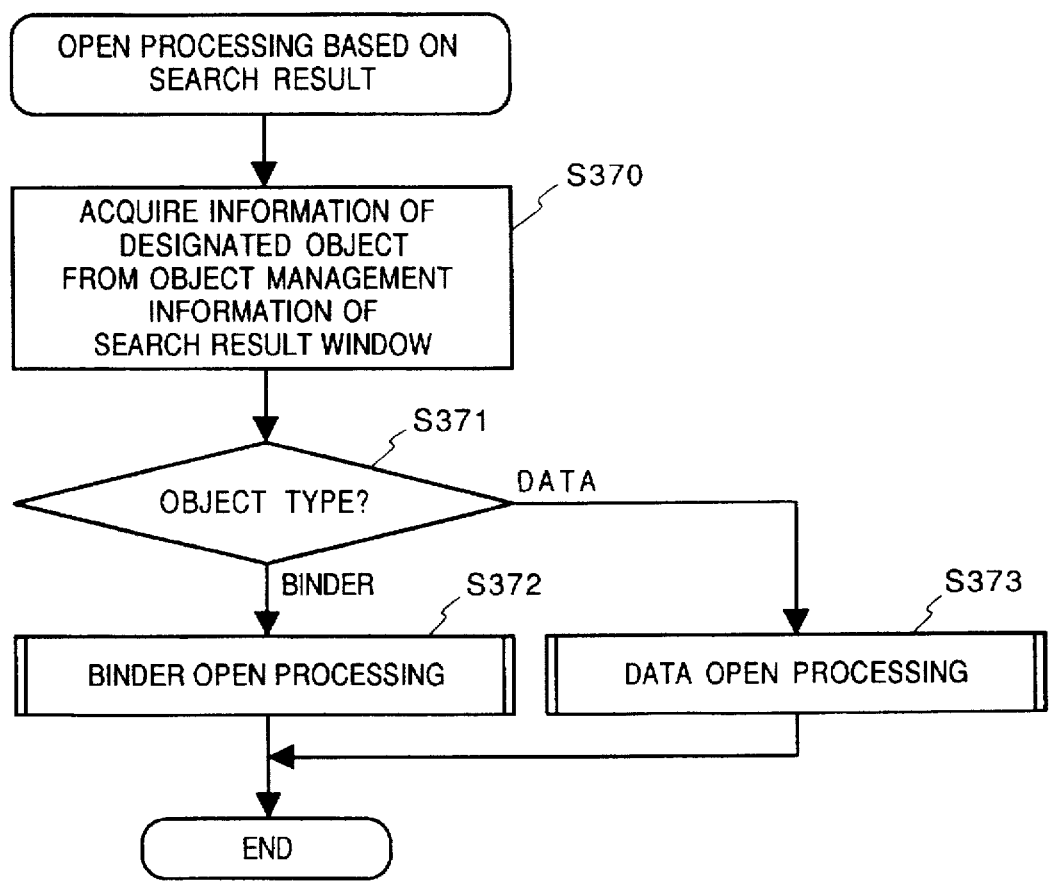
FIG. 77 is a flow chart showing a processing sequence executed when an open operation is performed on the basis of a search result.
Figure 78:
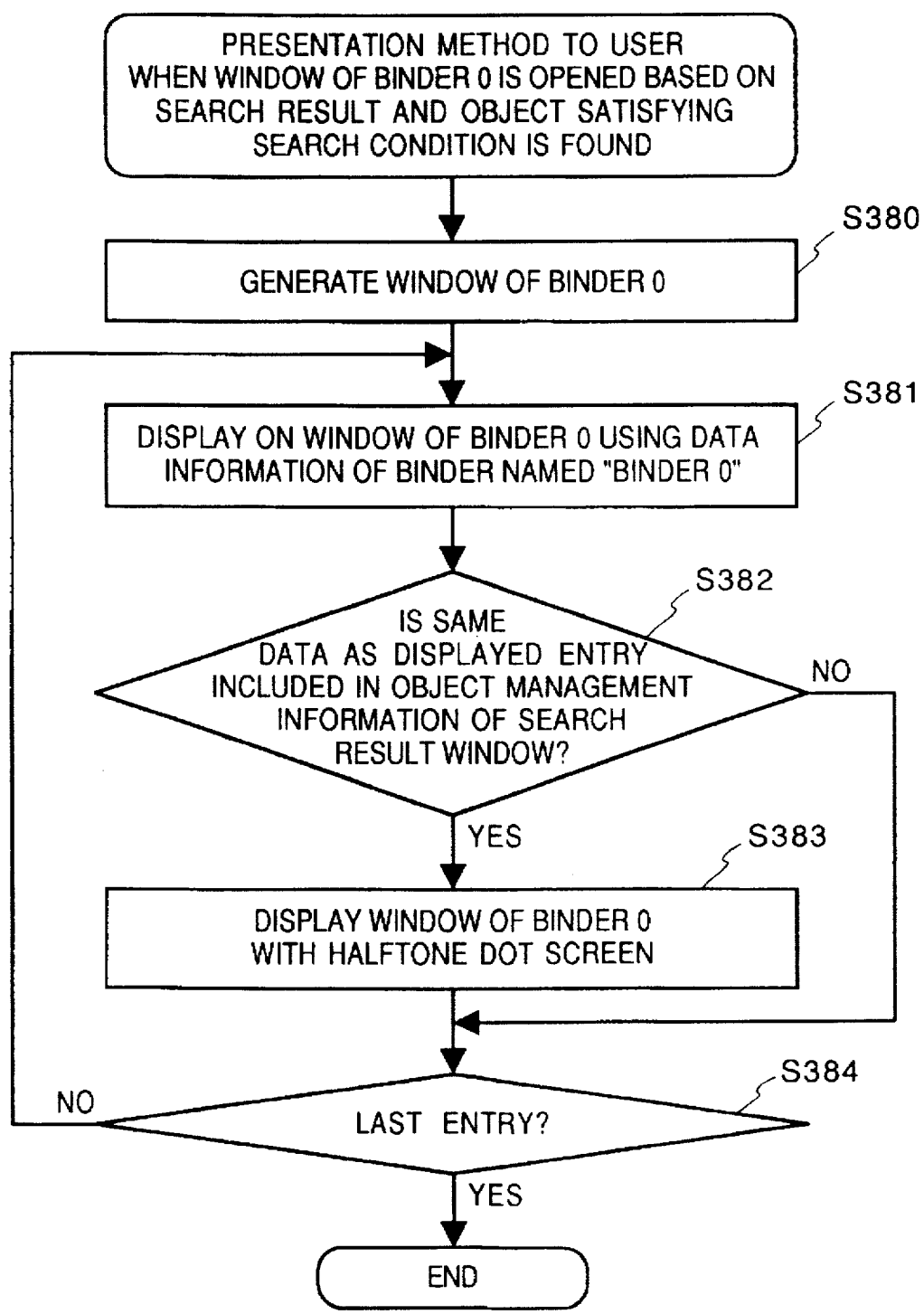
FIG. 78 is a flow chart showing a processing sequence executed when an object satisfying a search condition is clearly displayed.

Processing executed when an open operation is performed for the search result window G110 with the above arrangement will be described below with reference to FIG. 77. Note that search result objects G111 representing binders 20 and data 18, which satisfy the search conditions, are displayed on the search result window G110. In response to an operation for each search result object G111 in the search result window G110, the same processing as that for a binder object G17 or data object G18 representing a binder 20 or data 18 as a substance is performed.

When an open operation is performed for a search result object G111 on the search result window G110, entry information corresponding to the designated object is acquired from the object management information 110 of the search result window G110 in step S370. In step S371, open processing of a binder 20 or data 18 is executed according to the type of the designated object (step S372 or S373).

A delete operation for a search result may be prohibited or may be set to delete only a reaching index to data 18 or a binder 20 indicated by a search result object and not to delete the binder 20 or data 18 as a substance.

<Presentation of Search Result to User in Consideration of Hierarchical Structure>

Figure 79A:
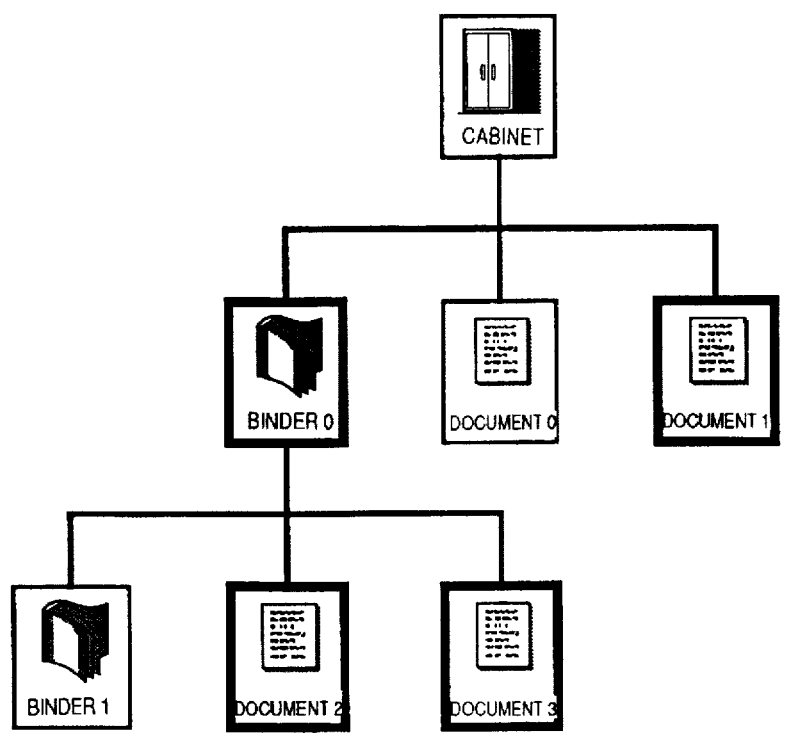
FIGS. 79A and 79B are views respectively showing a hierarchical structure of an object satisfying a search condition, and the search result window.
Figure 79B:
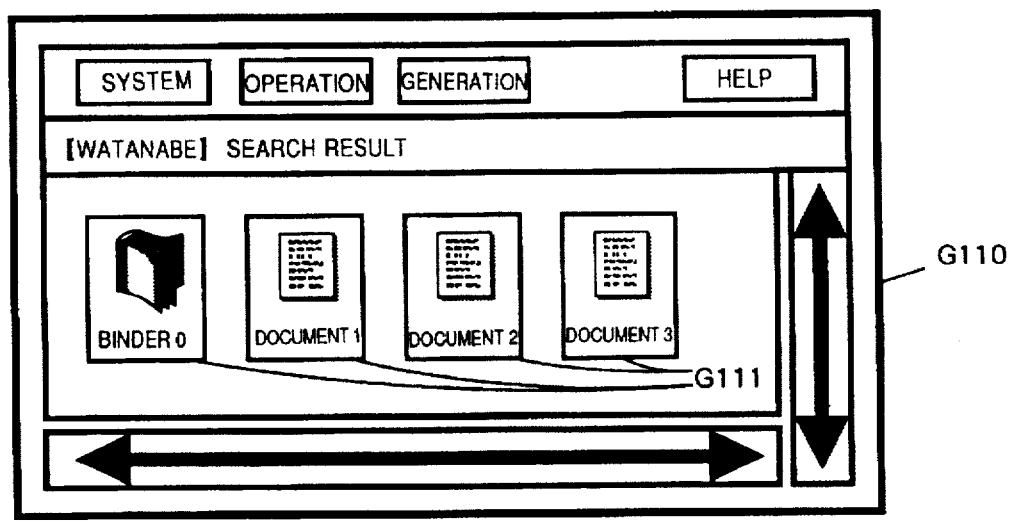

An embodiment of a method of presenting search results to a user in consideration of the hierarchical structure when objects such as data 18 and a binder 20 constituting the hierarchical structure simultaneously satisfy search conditions will be described below with reference to the flow chart of FIG. 78, and FIGS. 2, 79A and 79B, and 80. In this embodiment, assume that search conditions are set for data 18 and binders 20 present in arbitrary hierarchical levels below the cabinet 16 as search targets, and as a result of the above-mentioned search processing, data 18 and a binder 20 constituting a hierarchical structure, as indicated by bold frames in FIG. 79A, satisfy the search conditions. Also, assume that the search results are displayed in the search result window G110 as search result objects G111 regardless of the actual data hierarchical structure, as shown in FIG. 79B.

Figure 80:
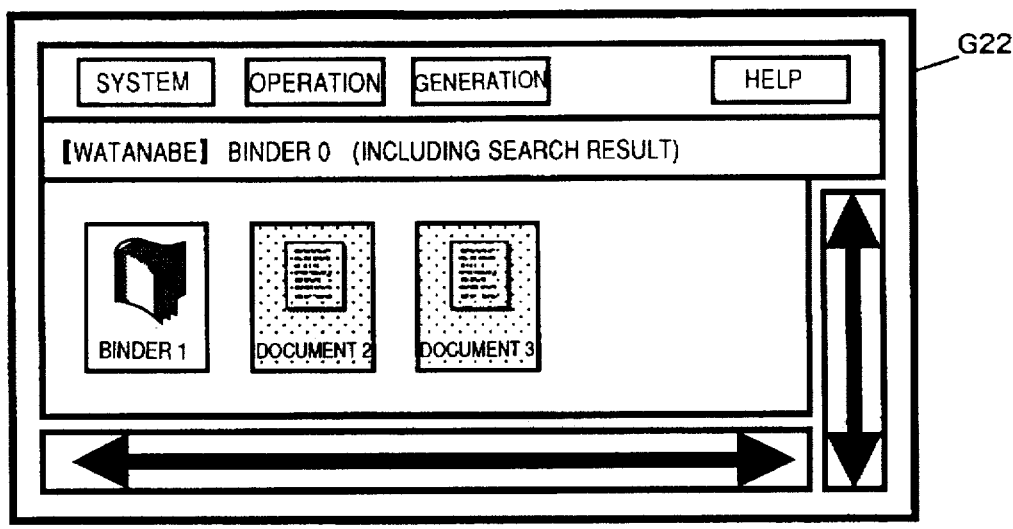
FIG. 80 is a view showing a state wherein an object satisfying a search condition is clearly displayed on the binder window.

When a search result object representing a binder 20 having a name="binder 0" is opened from the search result window G110, the binder 20 is opened as an operation for the binder 20 indicated by the search result object, and the binder window G22 is displayed. In the binder window G22 displayed at that time, a binder object G20 (representing a binder 20) indicated by the search result object G111 displayed in the search result window G110, or a data object G18 (representing data 18) is displayed. When the displayed object is one satisfying the search conditions in the above-mentioned search processing, the display state of its icon is changed (e.g., halftone dot screen), as shown in FIG. 80, so as to clearly show that the object satisfies the search conditions. Processing for executing such a display operation will be described below with reference to the flow chart of FIG. 78.

When the search result object G111 representing a binder 20 named "binder 0" (FIG. 79) is opened by 2-clicking the button of the mouse, the binder window G22 is generated (step S380). Data information 50 of "binder 0" is acquired based on a format ID 113 and data information 36 of each entry of object management information 110 of the binder 20 indicated by the search result object G111. Based on the data information 50 of "binder 0", an icon file of each entry is read out, and an object is displayed in the window together with necessary information (step S381). Then, it is checked if the same information as this entry is included in an entry of the object management information 110 of the search result window G110 (step S382). If YES in step S382, halftone dot screen processing shown in, e.g., FIG. 80 is performed to be superposed on the icon displayed on the window, thus allowing easy identification for a user (step S383). The above-mentioned processing is performed for all entries of the object management information 110 of the binder 20 named "binder 0" (step S384), and is ended.

Figure 81:
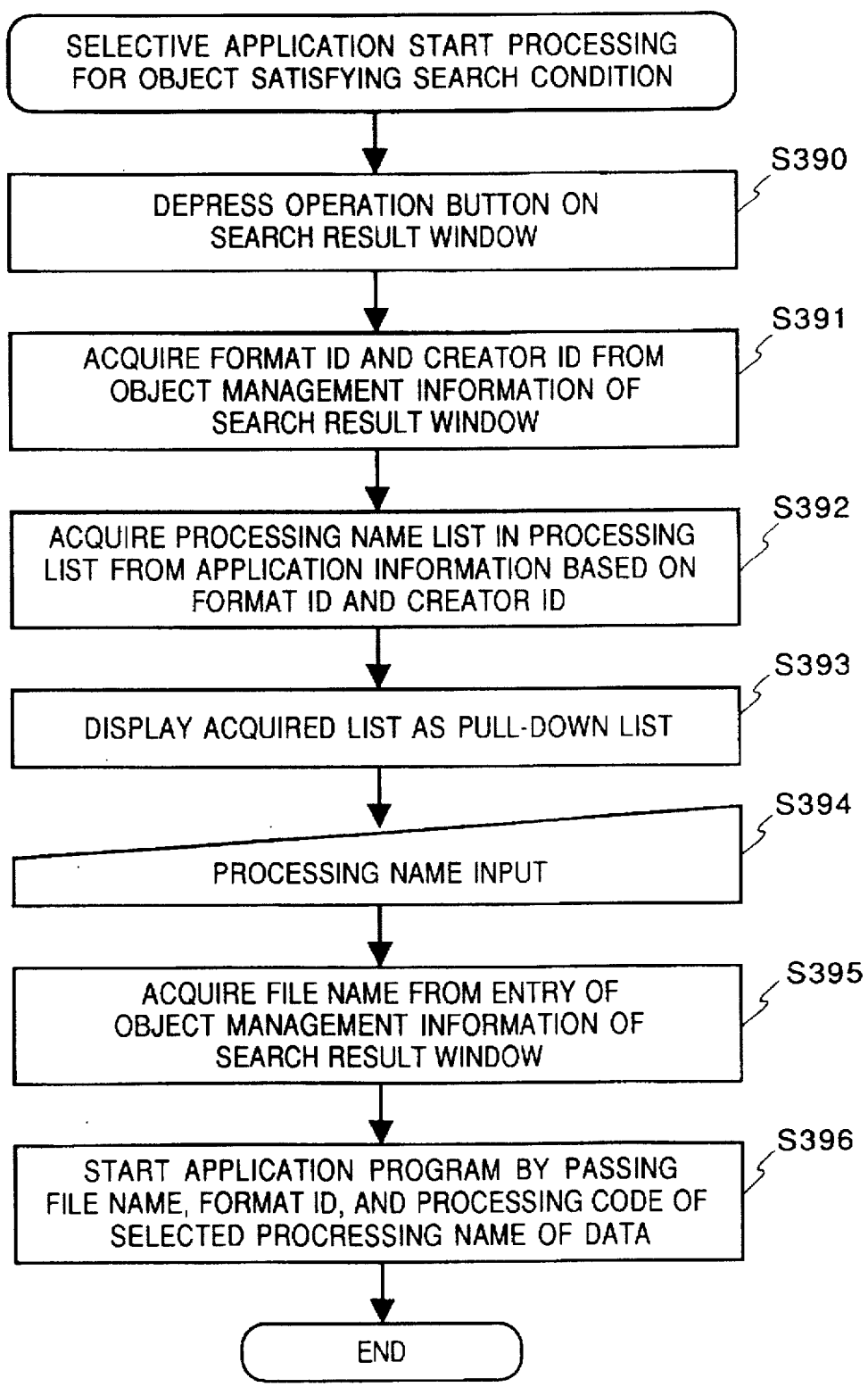
FIG. 81 is a view for explaining a method of starting an application from an object displayed on the search result window.

A processing sequence upon execution of desired processing by starting an application program with respect to a search result will be described below with reference to the flow chart of FIG. 81 and FIG. 82.

Figure 82:
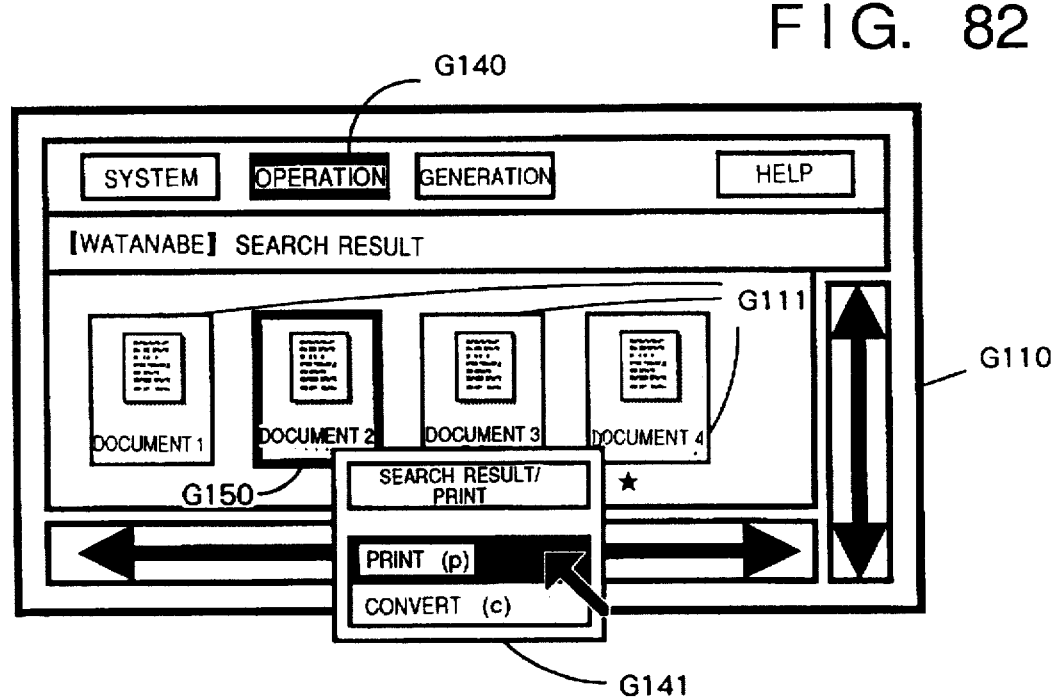
FIG. 82 is a flow chart showing a processing sequence for starting an application from an object displayed on the search result window.

FIG. 82 shows the search result window G110, and search result objects G111 representing data 18 satisfying the search conditions are displayed on the window G110. As processing for these search results, a large number of processing operations such as edit processing, print processing, and the like are available. In this embodiment, for example, assume that an application program for executing print processing is started to execute the print processing. The application program for executing print processing is started by selecting the processing from, e.g., a list.

In step S390, a search result object G150 representing data 18 is selected (by, e.g., 1-clocking the button of the mouse), and an operation button G140 on the search result window G110 is selected. In step S391, a format ID 51 and a creator ID 114 are acquired from an entry of the data 18 represented by the selected search result object G150 in object management information 110 of the search result window G110. In step S392, processing names of processing corresponding to the format ID 51 are acquired from the processing list 65 in an entry having the same application ID 61 as the creator ID 114 with reference to application information 60. These processing names are displayed as a list G141 in step S393.

When one of items in the list G141 is selected by a user in step S394, a file name 112 is acquired from an entry of the object management information 110 of the search result window G110 in step S395. In step S396, this file name 112, the already acquired format ID 51, and a processing code corresponding to the item selected from the list G141 are passed to the application program, and the application program is started according to an execution module name 62 corresponding to the application ID 61. When a plurality of data are selected, a series of processing operations need only be repeated.

<Execution of Search Processing in Consideration of Disclosure Information>

Figure 83:
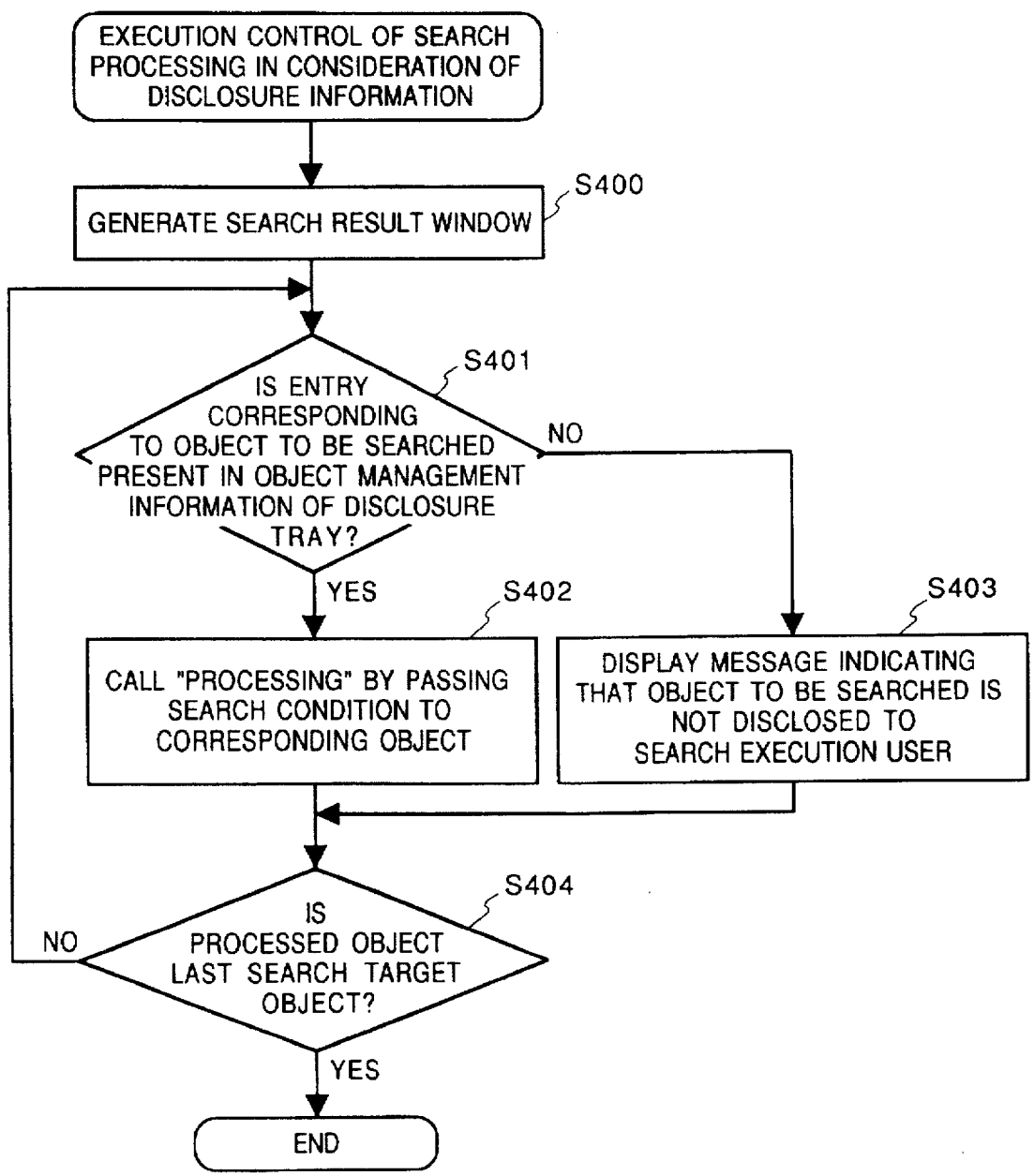
FIG. 83 is a flow chart showing a search processing sequence for an object possessed by another user.

Processing executed when search processing is executed for objects possessed by another user will be described below with reference to the flow chart of FIG. 83. In this embodiment, assume that a user A sets search conditions for data 18 under the cabinet 16 of a user B and data 18 under the cabinet 16 of a user C as search targets, and executes search processing. Assume also that the cabinet 16 of the user B is disclosed to the user A as an execution user of the search processing by the method according to the above-mentioned disclosure operation (this state will be referred to as "the user A is a disclosure user of the user B in association with the corresponding objects" hereinafter), and the cabinet 16 of the user C is not disclosed to the user A at all (this state will be referred to as "the user A is a non-disclosure user of the user C in association with the corresponding objects" hereinafter).

When the user A sets search conditions for the cabinets 16 of the users B and C as search targets, and executes the search processing, the search result window G110 is generated (step S400). When the search processing of, e.g., the cabinet 16 of another user is to be executed, an entry corresponding to the cabinet 16 to be searched is searched from object management information 110 of the disclosure tray 29 (step S401). When an object (cabinet in this case) is present in the disclosure tray, the "processing" shown in the flow chart of FIG. 75 is executed for this cabinet 16. In this case, the search conditions have already been set upon execution of this processing (step S402). On the other hand, if the corresponding entry is not found in step S401, a message indicating that the object designated as a search target by the user A is not disclosed to the user A is displayed (step S403). This processing is repeated for all objects possessed by another user (step S404). In this manner, the search processing for objects possessed by another user is ended.

Figure 84:
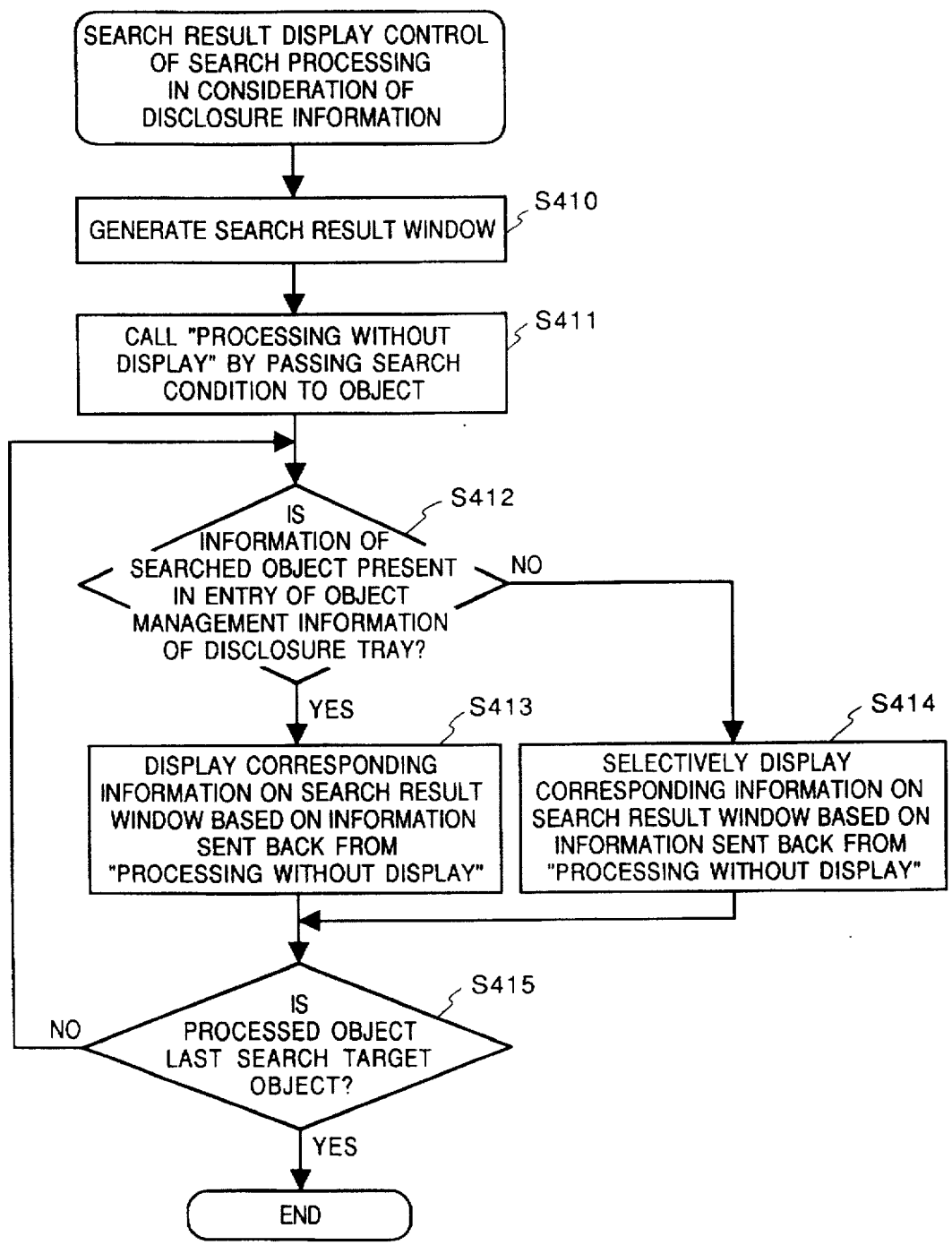
FIG. 84 is a flow chart showing display processing of a search result in consideration of disclosure information.
Figure 85:
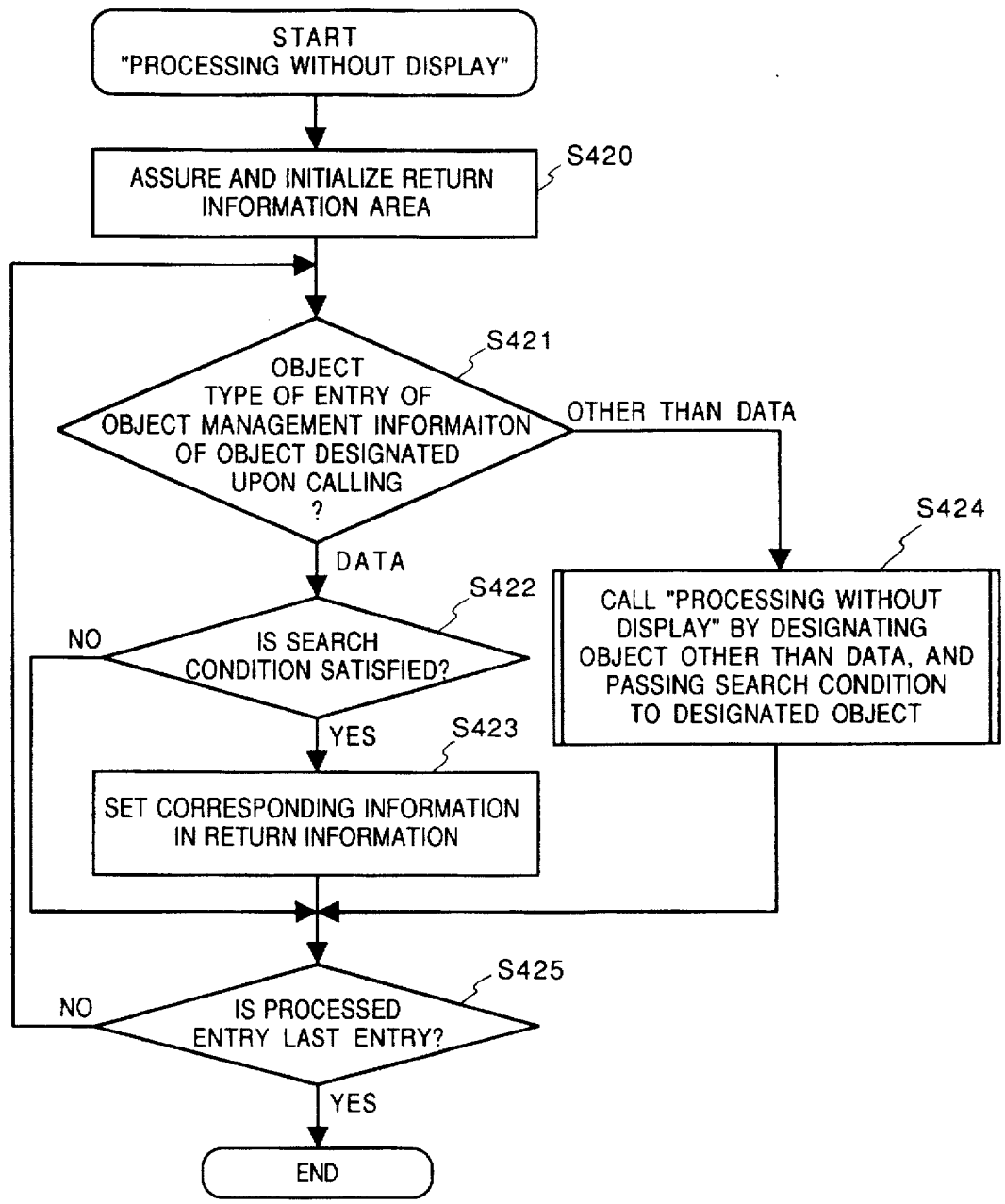
FIG. 85 is a flow chart showing a processing sequence of processing without executing any display operations.

Processing for prohibiting presentation of search results to a user according to disclosure information upon execution of search processing for objects possessed by another user will be described below with reference to the flow charts of FIGS. 84 and 85.

In this embodiment, assume that a user A sets search conditions for data 18 under the cabinet 16 of a user B and data 18 under the cabinet 16 of a user C as search targets, and executes search processing. Assume also that the cabinet 16 of the user B is disclosed to the user A as an execution user of the search processing by the method according to the <disclosure operation>, and the cabinet 16 of the user C is not disclosed to the user A at all.

When the user A sets search conditions for the cabinets 16 of the users B and C as search targets, and executes the search processing, the search result window G110 is generated (step S410). Then, "processing without display" (to be described later) is called by passing the search conditions to the designated cabinet 16 (step S411). An entry corresponding to the searched cabinet 16 is searched from object management information of the disclosure tray 29 (step S412). If the entry is found, search results are displayed on the search result window G110 on the basis of information returned from the "processing without display" (step S413). If the corresponding entry is not found, information, which does not cause an inconvenience to an owner user even if it is known by a non-disclosure user group user, information for which necessity of knowing is granted even for a non-disclosure user group user for a reason associated with system management, and the like are selectively displayed on the search result window G110 on the basis of information returned from the "processing without display" (step S414).

This processing is repeated for all objects designated as search targets and possessed by another user (step S415), and the search processing for objects possessed by another user is ended. The information, which does not cause an inconvenience to an owner user even if it is known by a non-disclosure user, is information indicating the presence/absence of objects satisfying search conditions. The information for which necessity of knowing is granted even for a non-disclosure user group user for a reason associated with system management is information other than information such as object names, which can specify objects, and includes object sizes, registration dates, updating dates, and the like.

The above-mentioned "processing without display" will be described below with reference to the flow chart of FIG. 85. The "processing without display" is a module for realizing a function of recursively searching and extracting data 18 from not only the cabinet 16 but also objects, which can have other lower hierarchical levels, such as binders 20, library binders 27, disclosure shelf 22, disclosure tray 29, tag tray 19, and the like. In this case, information of data 18 satisfying search conditions is not displayed on the search result window G110.

When the "processing without display" is called, a return information area is assured and initialized (step S420). An entry having the object type 111=data 18 is selected from object management information of an object designated upon calling (step S421). It is then checked if the selected entry satisfies search conditions (step S422), and information of the entry satisfying the search conditions is set as return information (step S423). If it is determined based on the object management information 110 of the object designated upon calling that an entry has an object type 111 other than data 18, the "processing without display" is recursively called by passing the search conditions and search targets to the entry (step S424). The above-mentioned processing is executed for all entries of the object management information 110 of the object designated upon calling (step S425), and obtained return information is returned from the "processing without display" to the call source routine.

<Execution of Search Processing in Consideration of Disclosure Information to User Group>

Figure 86:
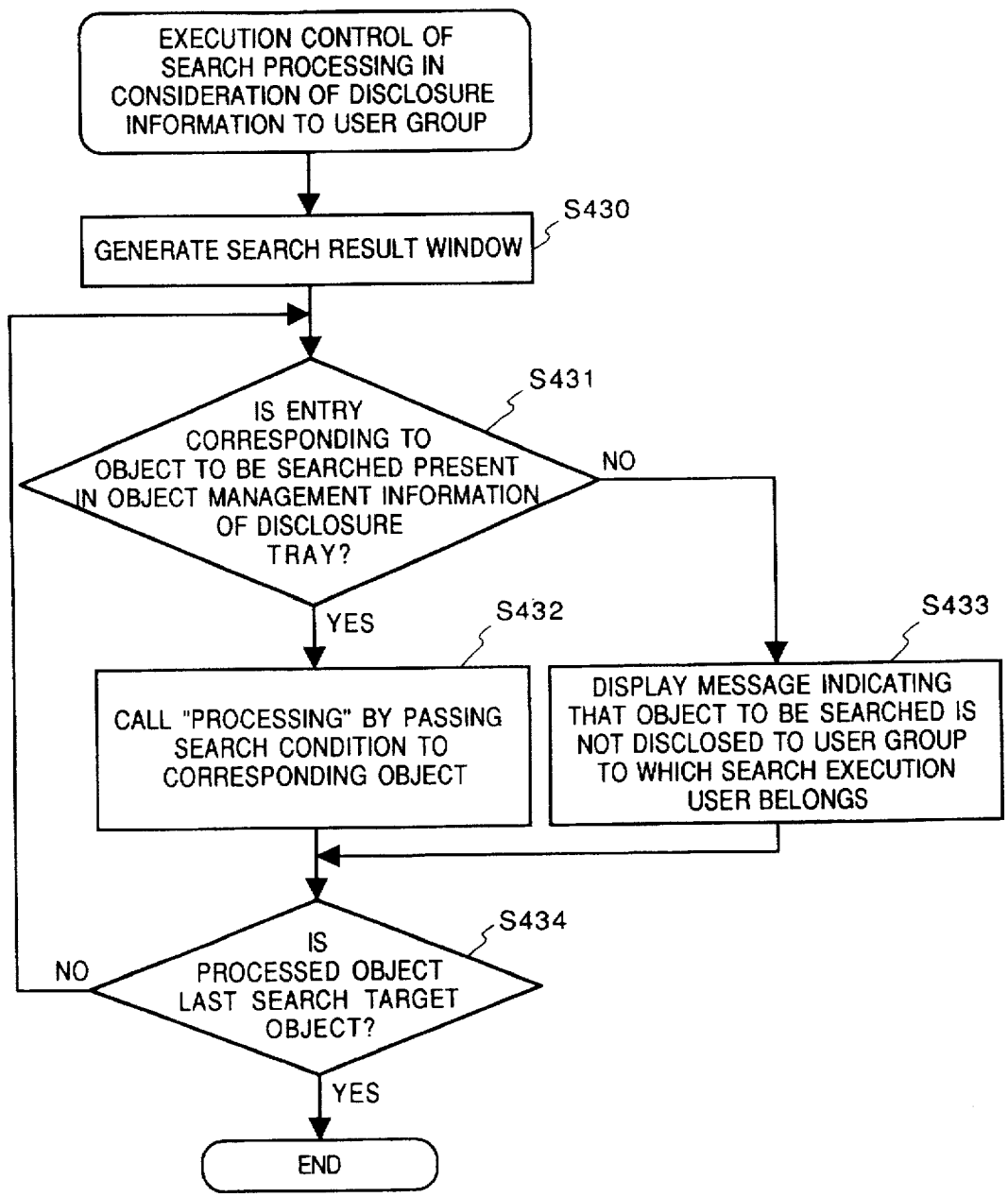
FIG. 86 is a flow chart showing a search processing sequence for an object possessed by a user belonging to another group.

Processing executed when search processing is executed for objects possessed by another user will be described below with reference to the flow chart of FIG. 86.

In this embodiment, assume that a user A sets search conditions for data 18 under the cabinet 16 of a user B and data 18 under the cabinet 16 of a user C as search targets, and executes search processing. Also, assume that the cabinet 16 of the user B is disclosed to a user group to which the user A as an execution user of the search processing belongs by the method according to the <disclosure operation> (this state will be referred to as "the user A is a disclosure user group user of the user B in association with the corresponding objects" hereinafter), and the cabinet 16 of the user C is not disclosed to a user group to which the user A belongs at all (this state will be referred to as "the user A is a non-disclosure user group user of the user C in association with the corresponding objects" hereinafter).

When the user A sets search conditions for the cabinets 16 of the users B and C as search targets, and executes the search processing, the search result window G110 is generated (step S430). When the cabinet 16 of another user is to be searched, an entry corresponding to the cabinet 16 to be searched is searched from object management information 110 of the disclosure tray 29 (step S431). When the corresponding entry is present in the disclosure tray, the "processing" shown in the flow chart of FIG. 75 is executed for the cabinet 16 under the corresponding search conditions (step S432). On the other hand, when the corresponding entry is not found, a message indicating that the object designated as a search target by the user A is not disclosed to a user group to which the user A belongs is displayed (step S433). This processing is repeated for all objects designated as search targets and possessed by another user (step S434), and the search processing for the objects possessed by another user is ended.

Figure 87:
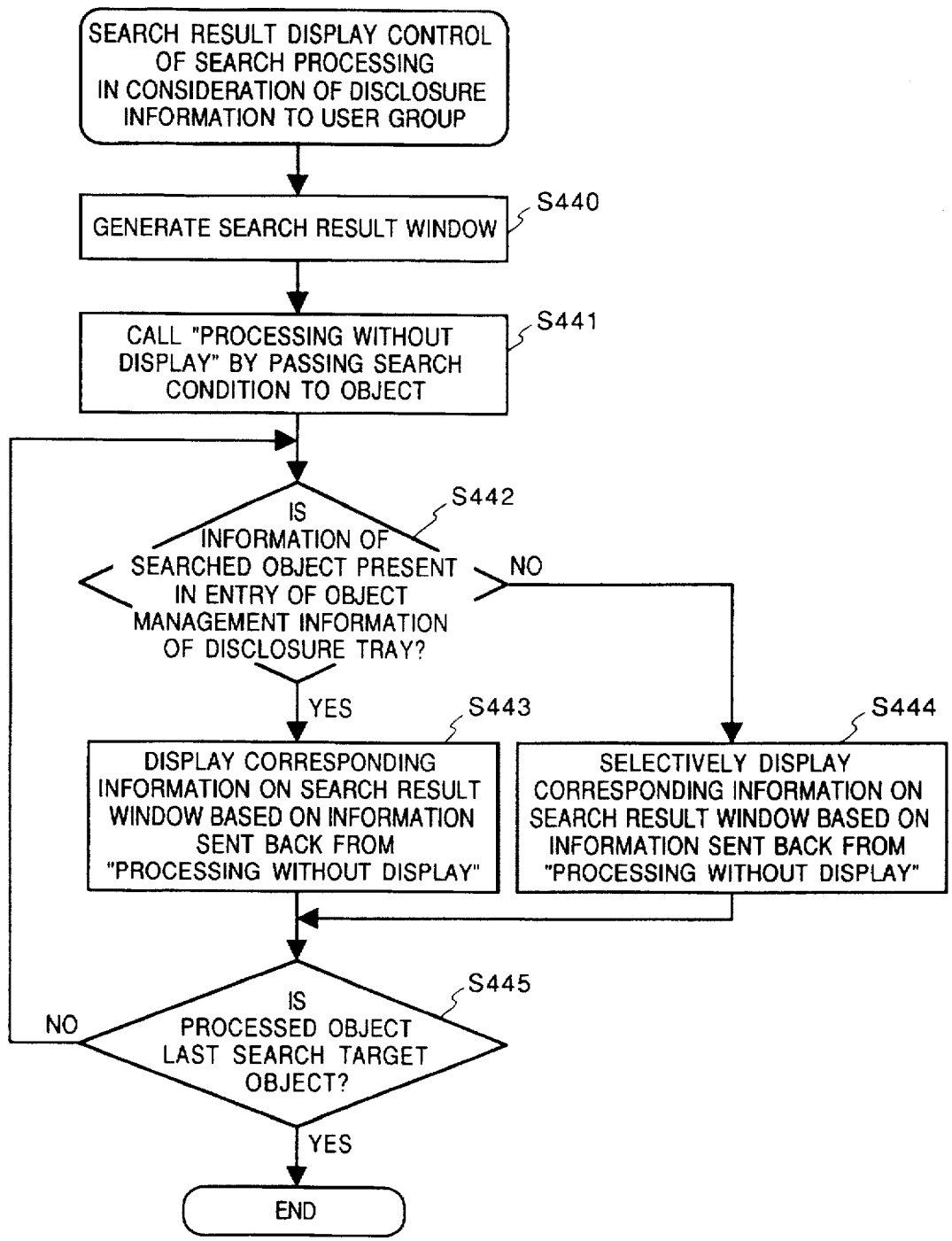
FIG. 87 is a flow chart showing display processing of a search result in consideration of disclosure information.

Processing for prohibiting presentation of search results to a user according to disclosure information upon execution of search processing for objects possessed by another user will be described below with reference to the flow chart of FIG. 87 and FIG. 2.

In this embodiment, assume that a user A sets search conditions for data 18 under the cabinet 16 of a user B and data 18 under the cabinet 16 of a user C as search targets, and executes search processing. Also, assume that the cabinet 16 of the user B is disclosed to a user group to which the user A as an execution user of the search processing belongs by the method according to the <disclosure operation>, and the cabinet 16 of the user C is not disclosed to a user group to which the user A belongs at all.

When the user A sets search conditions for the cabinets 16 of the users B and C as search targets, and executes the search processing, the search result window G110 is generated (step S440). Then, the "processing without display" described above in the paragraphs of <Execution of Search Processing in Consideration of Disclosure Information> is executed for the designated cabinet 16 under the set search conditions (step S441). Then, an entry corresponding to the searched cabinet 16 is searched from object management information 110 of the disclosure tray 29 (step S422). If the corresponding entry is present, a search result is displayed on the search result window G110 on the basis of information returned from the "processing without display" (step S443). If the corresponding entry is not found, information, which does not cause an inconvenience to an owner user even if it is known by a non-disclosure user, information for which necessity of knowing is granted even for a non-disclosure user for a reason associated with system management, and the like are selectively displayed on the search result window G110 on the basis of information returned from the "processing without display" (step S444). This processing is repeated for all objects designated as search targets and possessed by another user (step S445), and the search processing for the objects possessed by another user is ended.

As described above, according to the data processing apparatus of this embodiment, when a user utilizes common data created by himself or herself or by another user, if he or she uses CCP data and a CCP buffer, an efficient operation can be performed since the common data to be referred to can be automatically specified. The CCP buffer is prepared in units of data types such as graphic data, document data, and the like, thus providing great contribution to improvement of workability.

When a user utilizes common data using a clipboard and clip data, since only usable common data are automatically selected and displayed, workability upon selection of data can be greatly improved.

Furthermore, when a certain user makes an access to a data space of another user, he or she exits the room 13 as a work space of the user himself or herself to the office 14 via the exit object 25 to display icons (door objects 31) representing entrances to rooms of other users. In this manner, when a certain user makes an access to a data space of another user, he or she performs the following operations, i.e., exits his or her own room 13 to the office 14 via the exit, and enters the data space of the other user via a door of the room of the other user. Since these operations match well with actions in the real society, the operations are easy to understand and to perform.

As described above, according to the data management method and apparatus of the present invention, operability with respect to common data can be improved, and work efficiency of users of the apparatus can be improved.

In the data management method and apparatus utilized by a plurality of users, a work environment suitable for a certain user to access a data space of another user can be provided.

Furthermore, the present invention can be applied to the system comprising either a plurality of units or a single unit.

It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A data management apparatus comprising:

display means for displaying one or more application icons each of which corresponds to an application program and one or more data icons each of which corresponds to data created by one or more application programs;

designation means for designating a data icon displayed by said display means;

searching means for searching for an application program;

judging means for judging whether or not an application program found by said searching means is capable of processing data corresponding to the data icon designated by said designation means; and display control means for changing display statuses of an application icon corresponding to the application program judged by said judging means as being capable of processing the data and the data icon designated by said designation means so that they are distinguishable from other application icons and other data icons.

2. The apparatus according to claim 1, wherein said display control means displays lines which connect the application icon corresponding to the application program judged by said judging means as being capable of processing the data and the data icon designated by said designation means.

3. The apparatus according to claim 1, wherein the data each have format information representing a data format of those data, each application program has ability information representing a data format processable by that application, and said judging means judges whether or not an application program found by said searching means is capable of processing data corresponding to the data icon designated by said designation means, based on the format information and the ability information.

4. A data management apparatus comprising:

display means for displaying one or more application icons each of which corresponds to an application program and one or more data icons each of which corresponds to data created by one or more application programs;

designation means for designating a data icon displayed by said display means;

searching means for searching for an application program;

judging means for judging whether or not an application program found by said searching means is capable of processing data corresponding to the data icon designated by said designation means; and display control means for changing an application icon corresponding to the application program judged by said judging means as being capable of processing the data so that the application icon is distinguishable from other application icons.

5. The apparatus according to claim 4, wherein said display control means displays the application icon corresponding to the application program judged by said judging means as being capable of processing the data, by highlight-displaying.

6. The apparatus according to claim 4, wherein the data each have format information representing a data format of those data, each application program has ability information representing a data format processable by that application, and said judging means judges whether or not an application program found by said searching means is capable of processing data corresponding to the data icon designated by said designation means, based on the format information and the ability information.

7. A data management method, comprising:

a display step of displaying one or more application icons each of which corresponds to an application program and one or more data icons each of which corresponds to data created by one or more application programs;

a designation step of designating a data icon displayed by said display step;

a searching step of searching for an application program;

a judging step of judging whether or not an application program found in said searching step is capable of processing data corresponding to the data icon designated in said designation step; and a display control step of changing display statuses of an application icon corresponding to the application program judged in said judging step as being capable of processing the data and the data icon designated in said designation step so that they are distinguishable from other application icons and other data icons.

8. The method according to claim 7, wherein said display control step includes displaying lines which connect the application icon corresponding to the application program judged in said judging step as being capable of processing the data and the data icon designated in said designation step.

9. The method according to claim 7, wherein the data each have format information representing a data format of those data, each application program has ability information representing a data format processable by that application, and said judging step includes judging whether or not an application program found in said searching step is capable of processing data corresponding to the data icon designated in said designation step, based on the format information and the ability information.

10. A data management method, comprising:

a display step of displaying one or more application icons each of which corresponds to an application program and one or more data icons each of which corresponds to data created by one or more application programs;

a designation step of designating a data icon displayed in said display step;

a searching step of searching for an application program;

a judging step of judging whether or not an application program is capable of processing data corresponding to the data icon designated in said designation step; and a display control step of changing an application icon corresponding to the application program judged in said judging step as being capable of processing the data so that the application icon is distinguishable from other application icons.

11. The method according to claim 10, wherein said display control step includes displaying the application icon corresponding to the application program judged in said judging step as being capable of processing the data, by highlight-displaying.

12. The method according to claim 10, wherein the data each have format information representing a data format of those data, each application program has ability information representing a data format processable by that application, and said judging step includes judging whether or not an application program found in said searching step is capable of processing data corresponding to the data icon designated in said designation step, based on the format information and the ability information.

13. A data management apparatus comprising:
- display means for displaying one or more application icons each of which corresponds to an application program and one or more data icons each of which corresponds to data created by one or more application programs;
- designation means for designating a data icon displayed by said display means;
- searching means for searching for an application program which is able to process data corresponding to the data icon designated by said designation means;
- decision means for deciding whether or not an application program has been found by said searching means; and
- display control means for changing display statuses of an application icon corresponding to the application program found by said searching means and the data icon designated by said designation means so that they are distinguishable from other application icons and other data icons when said decision means decides an application program has been located by said searching means.

14. A data management apparatus comprising:
- display means for displaying one or more application icons each of which corresponds to an application program and one or more data icons each of which corresponds to data created by one or more application programs;
- designation means for designating movement of a data icon displayed by said display means;
- judging means for judging, when an overlapping area between an application icon and the designated data icon reaches a predetermined amount, by the movement of the designated data icon, whether or not the application program corresponding to the application icon can process data corresponding to the designated data icon; and
- display control means for controlling a display status of both icons so that the overlapping area between the application icon and the designated data icon becomes larger than the predetermined amount when said judging means judges that the application program corresponding to the application icon can process the data corresponding to the designated data icon.

15. A data management apparatus comprising:
- display means for displaying one or more application icons each of which corresponds to an application program and one or more data icons each of which corresponds to data created by one or more application programs;
- designation means for designating movement of a data icon displayed by said display means;
- judging means for judging, when an overlapping area between an application icon and the designated data icon reaches a predetermined amount, by the movement of the designated data icon, whether or not the application program corresponding to the application icon can process data corresponding to the designated data icon; and
- display control means for controlling a display status of both icons so that the overlapping area between the application icon and the designated data icon becomes smaller than the predetermined amount when said judging means judges that the application program corresponding to the application icon cannot process the data corresponding to the designated data icon.

16. A data management method, comprising:
- a display step of displaying one or more application icons each of which corresponds to an application program and one or more data icons each of which corresponds to data created by one or more application programs;
- a designation step of designating a data icon displayed in said display step;
- a searching step of searching for an application program which is able to process data corresponding to the data icon designated in said designation step;
- a decision step of deciding whether or not an application program has been found in said searching step; and
- a display control step of changing display statuses of an application icon corresponding to the application program found in said searching step and the data icon designated in said designation step so that they are distinguishable from other application icons and other data icons when it is decided in said decision step that an application program has been located by said searching step.

17. A data management method, comprising:
- a display step of displaying one or more application icons each of which corresponds to an application program and one or more data icons each of which corresponds to data created by one or more application programs;
- a designation step of designating movement of a data icon displayed in said display step;
- a judging step of judging, when an overlapping area between an application icon and the designated data icon reaches a predetermined amount, by the movement of the designated data icon, whether or not the application program corresponding to the application icon can process data corresponding to the designated data icon; and
- a display control step of controlling a display status of both icons so that the overlapping area between the application icon and the designated data icon becomes larger than the predetermined amount when it is judged in said judging step that the application program corresponding to the application icon can process the data corresponding to the designated data icon.

18. A data management apparatus comprising:
- a display step of displaying one or more application icons each of which corresponds to an application program and one or more data icons each of which corresponds to data created by one or more application programs;
- a designation step of designating movement of a data icon displayed in said display step;
- a judging step of judging, when an overlapping area between an application icon and the designated data icon reaches a predetermined amount, by the movement of the designated data icon, whether or not the application program corresponding to the application icon can process data corresponding to the designated data icon; and
- a display control step of controlling a display state of both icons so that the overlapping area between the application icon and the designated data icon becomes smaller than the predetermined amount when it is judged in said judging step that the application program corresponding to the application icon cannot process the data corresponding to the designated data icon.

* * * * *